US012703405B2

(12) United States Patent
Markelz et al.

(10) Patent No.: US 12,703,405 B2
(45) Date of Patent: Aug. 11, 2026

(54) MOBILE CRANE SYSTEMS AND METHODS

(71) Applicant: Bridge and Track Crane LLC, Cary, IL (US)

(72) Inventors: Paul Markelz, Cary, IL (US); William Kenneth Quast, Cary, IL (US)

( * ) Notice: Subject to any disclaimer, the term of this patent is extended or adjusted under 35 U.S.C. 154(b) by 395 days.

(21) Appl. No.: 18/364,090

(22) Filed: Aug. 2, 2023

(65) Prior Publication Data

US 2024/0140498 A1 May 2, 2024

Related U.S. Application Data

(63) Continuation of application No. 17/542,077, filed on Dec. 3, 2021, now Pat. No. 11,772,688, which is a continuation of application No. 16/477,760, filed as application No. PCT/US2018/013880 on Jan. 16, 2018, now Pat. No. 11,208,120.

(60) Provisional application No. 62/583,658, filed on Nov. 9, 2017, provisional application No. 62/529,899, filed on Jul. 7, 2017, provisional application No. 62/447,766, filed on Jan. 18, 2017, provisional application No. 62/445,968, filed on Jan. 13, 2017.

(51) Int. Cl.

| | |
|---|---|
| ***B61D 15/00*** | (2006.01) |
| ***B66C 5/04*** | (2006.01) |
| ***B66C 19/00*** | (2006.01) |
| *B66C 1/22* | (2006.01) |
| *E01B 29/02* | (2006.01) |

(52) U.S. Cl.

CPC ................ *B61D 15/00* (2013.01); *B66C 5/04* (2013.01); *B66C 19/00* (2013.01); *B66C 1/22* (2013.01); *E01B 29/02* (2013.01)

(58) Field of Classification Search

CPC .. B66C 1/101; B66C 1/22; B66C 1/28; B66C 1/30; B66C 1/422; B66C 1/64; B66C 1/66; B66C 5/02; B66C 5/04; B66C 5/06; B66C 9/10; B66C 3/00; B66C 17/06; E01B 29/02; B61D 15/00

See application file for complete search history.

(56) References Cited

U.S. PATENT DOCUMENTS

| | | |
|---|---|---|
| 2,343,014 A | 2/1944 | Langan |
| 4,282,978 A | 8/1981 | Zambon |

(Continued)

FOREIGN PATENT DOCUMENTS

| | | |
|---|---|---|
| CN | 1090827 A | 8/1994 |
| CN | 2767494 Y | 3/2006 |

(Continued)

OTHER PUBLICATIONS

International Searching Authority, International Search Report and Written Opinion for application PCT/US2018/013880, mailing date of Jun. 27, 2018, 18 pages.

*Primary Examiner* — Emmanuel M Marcelo
(74) *Attorney, Agent, or Firm* — Quarles & Brady LLP

(57) ABSTRACT

Systems and methods for a mobile crane are provided. In particular, systems and methods are provided for a mobile crane that is designed to enable easy transportation on a railcar to and from a job site. The mobile crane facilitates quick changing between a transport configuration and a work configuration to enable increased productivity. The mobile crane is configured to be modular and thereby be configured to include various lifting and object manipulating features, as required by a specific application.

19 Claims, 43 Drawing Sheets

(56) References Cited

U.S. PATENT DOCUMENTS

| | | | | | |
|---|---|---|---|---|---|
| 5,181,756 | A | | 1/1993 | Yurick | |
| 5,511,268 | A | | 4/1996 | Albus | |
| 5,657,888 | A | | 8/1997 | Kroll | |
| 5,921,415 | A | | 7/1999 | Markelz | |
| 5,947,308 | A | | 9/1999 | Markelz | |
| 6,018,921 | A | * | 2/2000 | Lindsay | E04C 3/16 52/693 |
| 6,131,750 | A | | 10/2000 | Harrington | |
| 6,968,963 | B1 | * | 11/2005 | Zakula, Sr. | B66C 19/007 212/270 |
| 7,066,343 | B1 | * | 6/2006 | Khachaturian | B66C 19/02 212/270 |
| 8,671,490 | B1 | | 3/2014 | Carney et al. | |
| 10,421,645 | B2 | | 9/2019 | Givens | |
| 2003/0168872 | A1 | * | 9/2003 | Zakula, Sr. | B66C 1/30 294/81.51 |
| 2005/0055955 | A1 | * | 3/2005 | McAdoo | E04C 3/16 52/633 |
| 2008/0006806 | A1 | * | 1/2008 | Hall | B66C 1/445 254/362 |
| 2009/0315353 | A1 | * | 12/2009 | Bierman | B66C 1/422 294/106 |
| 2011/0247992 | A1 | | 10/2011 | Pech | |
| 2011/0247993 | A1 | * | 10/2011 | Chernyak | B66C 9/08 212/324 |
| 2014/0026335 | A1 | | 1/2014 | Smith | |

FOREIGN PATENT DOCUMENTS

| | | | | | |
|---|---|---|---|---|---|
| CN | 201372163 | Y | | 12/2009 | |
| CN | 104781179 | A | | 7/2015 | |
| CN | 104640793 | B | * | 5/2017 | B65G 63/004 |
| CN | 206720599 | U | | 8/2017 | |
| CN | 106029547 | B | | 2/2018 | |
| CN | 207800068 | U | * | 8/2018 | |
| WO | WO-9901371 | A1 | * | 1/1999 | B66C 23/50 |
| WO | WO-2007076417 | A2 | * | 7/2007 | E01D 19/103 |
| WO | WO-2019237034 | A1 | * | 12/2019 | E04B 2/56 |

* cited by examiner

MOBILE CRANE SYSTEMS AND METHODS

CROSS-REFERENCES TO RELATED APPLICATIONS

The present application is a continuation of U.S. application Ser. No. 17/542,077, filed Dec. 3, 2021, which application is a continuation of U.S. patent application Ser. No. 16/477,760, filed on Jul. 12, 2019, which is now issued as U.S. Pat. No. 11,208,120, issued to patent on Dec. 28, 2021, which application represents the U.S. National Stage of PCT Application No. PCT/US2018/013880 filed on Jan. 16, 2018, which claims priority to U.S. Provisional Patent Application No. 62/445,968, filed Jan. 13, 2017, entitled "Mobile Crane Systems and Methods," U.S. Provisional Patent Application No. 62/447,766, filed Jan. 18, 2017, entitled "Mobile Crane Systems and Methods," U.S. Provisional Patent Application No. 62/529,899, filed Jul. 7, 2017, entitled "Mobile Crane Systems and Methods," and U.S. Provisional Patent Application No. 62/583,658, filed Nov. 9, 2017, entitled "Mobile Crane Systems and Methods." Each of the aforementioned patent applications is incorporated by reference in its entirety for all purposes.

STATEMENT REGARDING FEDERALLY SPONSORED RESEARCH

Not Applicable.

BACKGROUND

The present invention relates generally to mobile cranes and, more specifically, to systems and methods for a mobile crane used in railroad, bridge, and/or track applications.

Gantry cranes and/or level luffing cranes are often used, for example, in erecting and disassembling railroads and bridges. However, both gantry cranes and level luffing cranes are subject to numerous shortcomings. For example, gantry cranes are generally not suitable for on-site construction and require multiple railcars to transport the gantry cranes to the job site. In operation, level luffing cranes are subjected to lateral rotation after loading, which can induce unbalancing forces that can overcome the ballast provided by the carriage and machinery deck of the crane, and can lead to tipping.

SUMMARY OF THE INVENTION

The disclosure provides mobile crane systems and methods of using a mobile crane system. In particular, systems and methods are provided for a mobile crane that is designed to enable easy transportation on a railcar to and from a job site. Additionally, the mobile crane facilitates quick changing between a transport configuration and a work configuration to enable increased productivity. Further, the mobile crane is designed to manipulate objects (e.g., railroad track assemblies, bridge assemblies, etc.) with increased weight and length, which enables the delivery and installation of new objects in limited time and space. Moreover, the mobile crane can be modular and can be configured to include various lifting and object manipulating features, as required by a specific application.

In some embodiments, the disclosure provides a crane apparatus. The crane apparatus can have a first truss assembly comprising a first main truss having a longitudinal axis. The first main truss can be coupled to a first rail car end assembly. The crane apparatus also includes a second truss assembly comprising a second main truss spaced apart from and extending approximately parallel to the longitudinal axis. The second main truss is coupled to the first rail car end assembly, and the first and second main truss are spaced apart from one another to define an interior space. An upper gantry assembly is rotatably coupled to an upper support beam of the first truss assembly and to an upper support beam of the second truss assembly. The upper gantry assembly has a first bridge beam and a second bridge beam spaced apart from one another and extending across the interior space between the first truss assembly and the second truss assembly. The first bridge beam and the second bridge beam are slidable parallel to the longitudinal axis within a guide track formed in the upper support beam of the first truss assembly and a guide track formed in the upper support beam of the second truss assembly.

In other aspects, the disclosure provides a crane apparatus. The crane apparatus comprises a first truss assembly comprising a first main truss having a longitudinal axis. The first main truss is coupled to a rail car end assembly. A second truss assembly comprising a second main truss spaced apart from and extending approximately parallel to the longitudinal axis is coupled to the rail car end assembly as well. The first main truss and the second main truss are spaced apart from one another to define an interior space. A lower gantry assembly coupled to a lower support beam of the first truss assembly and to a lower support beam of the second truss assembly is also included. The lower gantry assembly is slidably adjustable parallel to the longitudinal axis along the lower support beam of the first truss assembly and the lower support beam of the second truss assembly.

In some aspects, a method of replacing a railroad bridge is provided. The method comprises positioning a crane apparatus above an installed railroad bridge track. For example, a crane according to any of the figures within the disclosure can be used. The method includes setting a new railroad bridge track upon the installed railroad bridge track using one or more hoist assemblies coupled to the upper gantry assembly. The hoist assemblies are then uncoupled from the new railroad bridge track, so that they can be coupled to the installed railroad bridge track and the new railroad bridge track laying on the installed railroad bridge track. The method then comprises lifting the installed railroad bridge track and the new railroad bridge track to remove the installed railroad bridge track and the new railroad bridge track from the railroad bridge to create a rail gap within the railroad bridge. The hoist assemblies can then be uncoupled from the installed railroad bridge track, and then used to lift the new railroad bridge track off of the installed bridge track. The new railroad bridge track can then be set within the rail gap within the railroad bridge gap using the hoist assemblies.

A method of replacing a railroad tie using crane apparatuses according to the disclosure are also provided. The method includes coupling a tie grapple assembly of the lower gantry assembly to an installed railroad tie. The tie grapple assembly can then be translated perpendicularly to the longitudinal axis outward from the interior space to withdraw the installed railroad tie from beneath two tracks. The tie grapple assembly can then be coupled to a new railroad tie, and the new railroad tie can be positioned beneath the two tracks by translating the tie grapple assembly perpendicularly to the longitudinal axis inward toward the interior space.

In other aspects of the disclosure, a rail support structure for supporting rails is provided. The rail support structure comprises a main beam having a positioning aperture formed therethrough and arranged along a centerline of the main beam. A first clamp is pivotally coupled to a first end of the main beam, and is rotatable relative to the main beam about a pivot between an unlocked position and a locked position. A second clamp is pivotally coupled to a second end of the main beam opposite the first end, and is rotatable relative to the main beam about a second pivot between an unlocked position and a locked position. The first clamp rotates to the locked position by rotating about the pivot in a first direction and the second clamp rotates to the locked position by rotating about the second pivot in a second direction opposite to the first direction.

In some aspects, a bridge dampening device is provided. The bridge dampening device includes a first ballast retaining flange and a second ballast retaining flange spaced apart from one another and extending away from a wall to define a track surface. The bridge dampening device also includes ground retaining flanges extending away from the wall in an opposite direction to the first ballast retaining flange and the second ballast retaining flange.

Other aspects of the disclosure include a crane apparatus. The crane apparatus can have a first truss assembly comprising a first main truss having a longitudinal axis. The first main truss can be coupled to a first rail car end assembly at a first end of the first main truss. The crane apparatus also includes a second truss assembly comprising a second main truss spaced apart from and extending approximately parallel to the longitudinal axis. The second main truss is coupled to the first rail car end assembly at a first end of the second main truss, and the first and second main truss are spaced apart from one another to define an interior space. A truss extension is pivotally coupled to the first end of the first truss assembly and rotatable between a deployed configuration and a stowed configuration, where the truss extension extends coaxially with the longitudinal axis in the deployed configuration and where the truss extension is contained within the interior space and extends approximately parallel to and spaced apart from the longitudinal axis in the stowed configuration.

In still other aspects, a crane apparatus is disclosed. The crane apparatus can have a first truss assembly comprising a first main truss having a longitudinal axis. The first main truss can be coupled to a first rail car end assembly at a first end of the first main truss. The crane apparatus also includes a second truss assembly comprising a second main truss spaced apart from and extending approximately parallel to the longitudinal axis. The second main truss is coupled to the first rail car end assembly at a first end of the second main truss, and the first and second main truss are spaced apart from one another to define an interior space. The first rail car end assembly includes a lateral extension assembly coupled to the first main truss and the second main truss. The lateral extension assembly is configured to move the first truss assembly and the second truss assembly perpendicular to the longitudinal axis, and a thrust bracket is removably coupled to the first main truss and the lateral extension assembly.

In some aspects, a crane apparatus is disclosed. The crane apparatus can have a first truss assembly comprising a first main truss having a longitudinal axis. The first main truss can be coupled to a support beam of a lateral support assembly. A second truss assembly comprising a second main truss spaced apart from and extending approximately parallel to the longitudinal axis is also included. The first main truss and the second main truss are spaced apart from one another to define an interior space. A thrust block is removably coupled to the lateral support assembly and engages the first main truss and the lateral support assembly to restrict lateral movement of the support beam perpendicular to the longitudinal axis.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DESCRIPTION OF DRAWINGS

The invention will be better understood and features, aspects and advantages other than those set forth above will become apparent when consideration is given to the following detailed description thereof. Such detailed description makes reference to the following drawings

DETAILED DESCRIPTION OF THE INVENTION

The invention will now be described more specifically with reference to the following non-limiting examples. It is to be noted that the following embodiments are presented herein for purpose of illustration and description only. It is not intended to be exhaustive or to be limited to the precise form disclosed.

It is to be understood that the phraseology and terminology used herein is for the purpose of description and should not be regarded as limiting. The use of "including," "comprising," or "having" and variations thereof herein is meant to encompass the items listed thereafter and equivalents thereof, as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
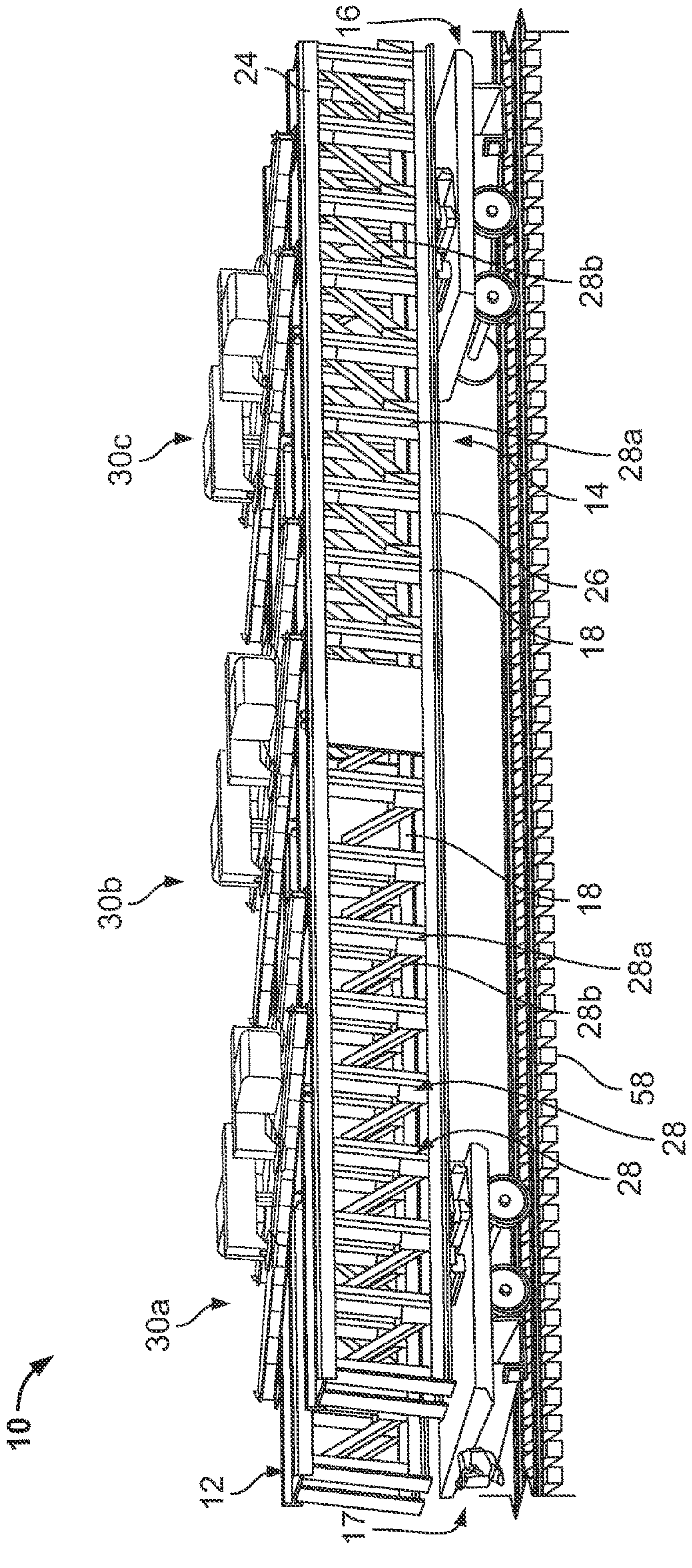
FIG. 1 is a top, front, left, perspective view of a mobile crane in a transportation configuration according to one aspect of the present disclosure.

FIG. 1 illustrates one non-limiting example of a mobile crane 10 according to aspects of the disclosure. The mobile crane 10 includes a first truss assembly 12 and a second truss assembly 14 each coupled to a first and second rail car end assemblies 16, 17 at opposing ends thereof. The first truss assembly 12 and second truss assembly 14 can be spaced apart from one another by a variable distance, depending on the desired operation of the mobile crane 10. For example, the mobile crane 10 can be in a transportation configuration where the mobile crane 10 can be transported on a railroad track 58 to a job site, as shown in FIG. 1. In the transportation configuration, the design and properties of the mobile crane 10 with the rail car end assemblies 16, 17 enable the mobile crane 10 to be transported and act as a single railcar. Transporting the mobile crane 10 as a single railcar provides more available space for new materials to be delivered to the job site, which can reduce transportation costs.

Figure 2:
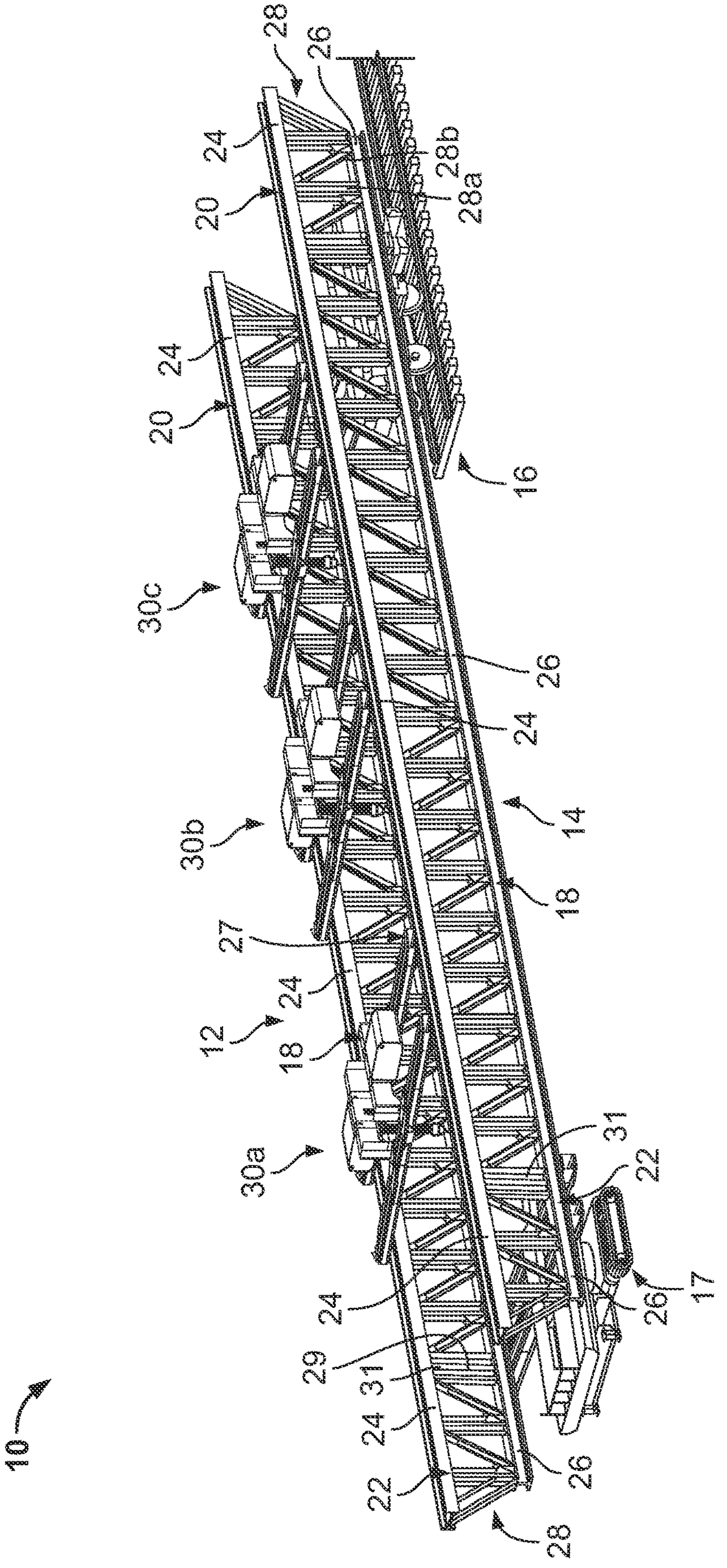
FIG. 2 is a top, front, left perspective view of the mobile crane of FIG. 1 in a work configuration.
Figure 3:
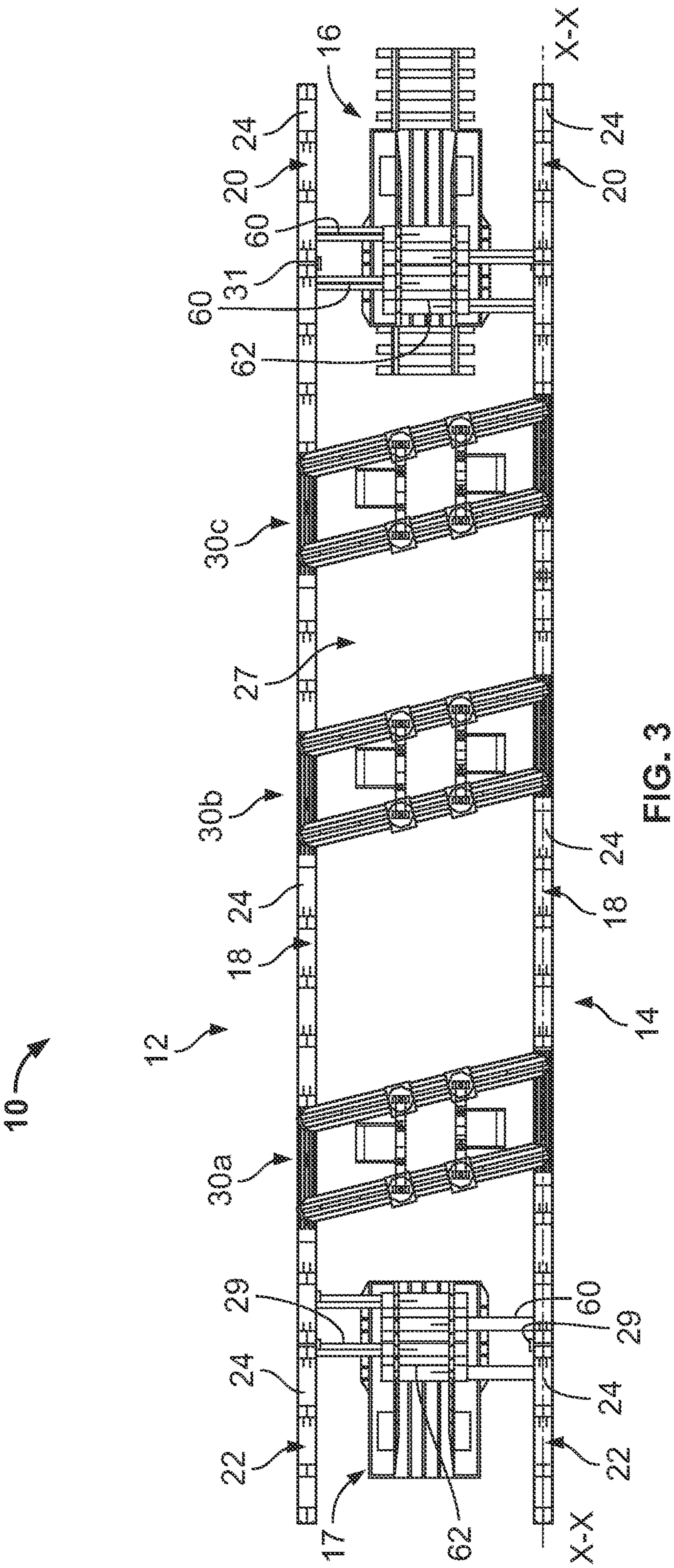
FIG. 3 is a top view of the mobile crane of FIG. 1.
Figure 4:
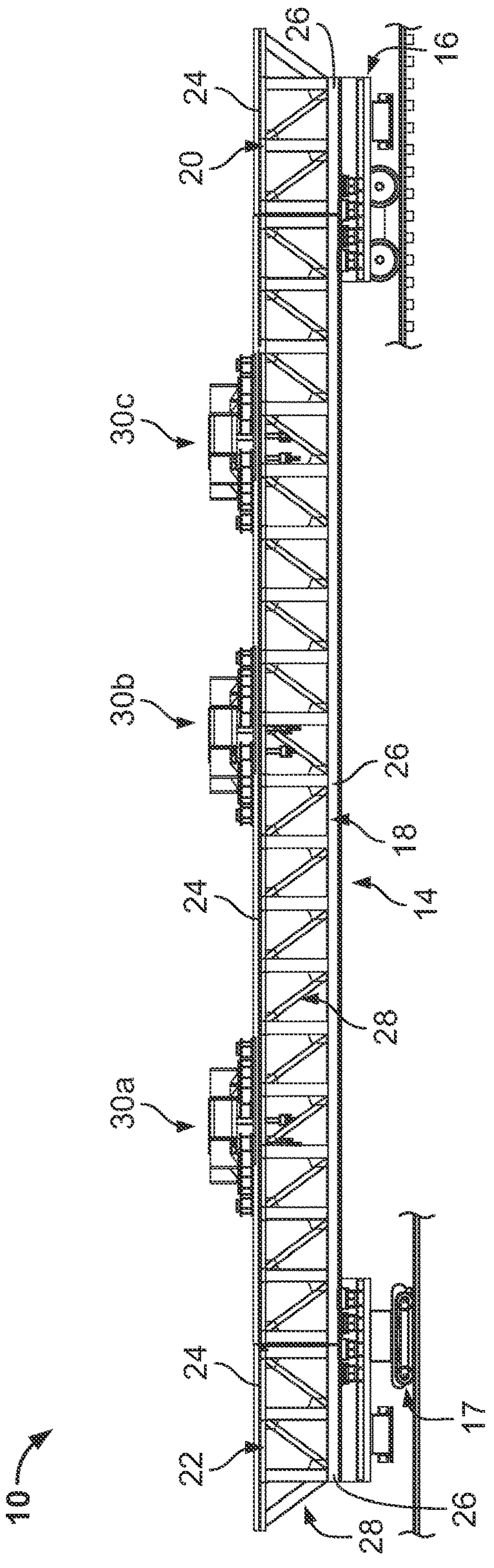
FIG. 4 is a front view of the mobile crane of FIG. 1.
Figure 5:
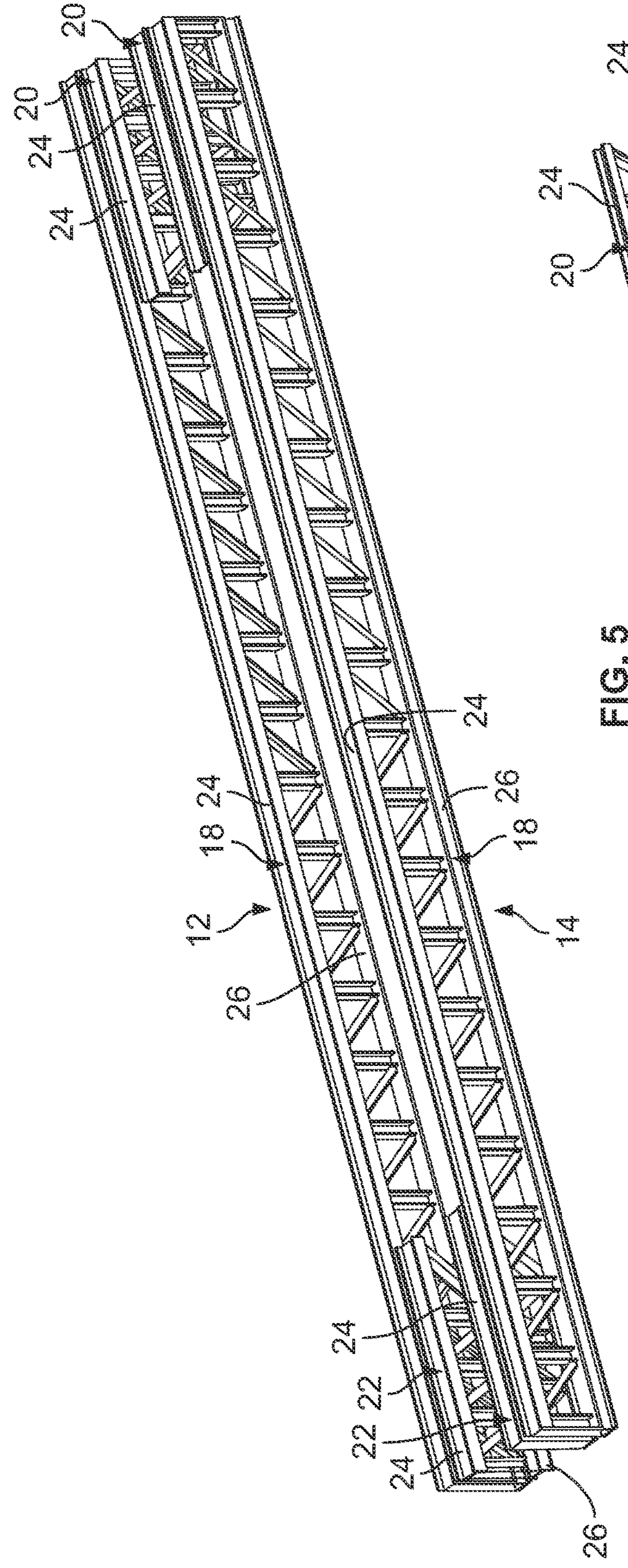
FIG. 5 is a top, front, left perspective view of first and second truss assemblies of the mobile crane of FIG. 1 in a transportation configuration.
Figure 6:
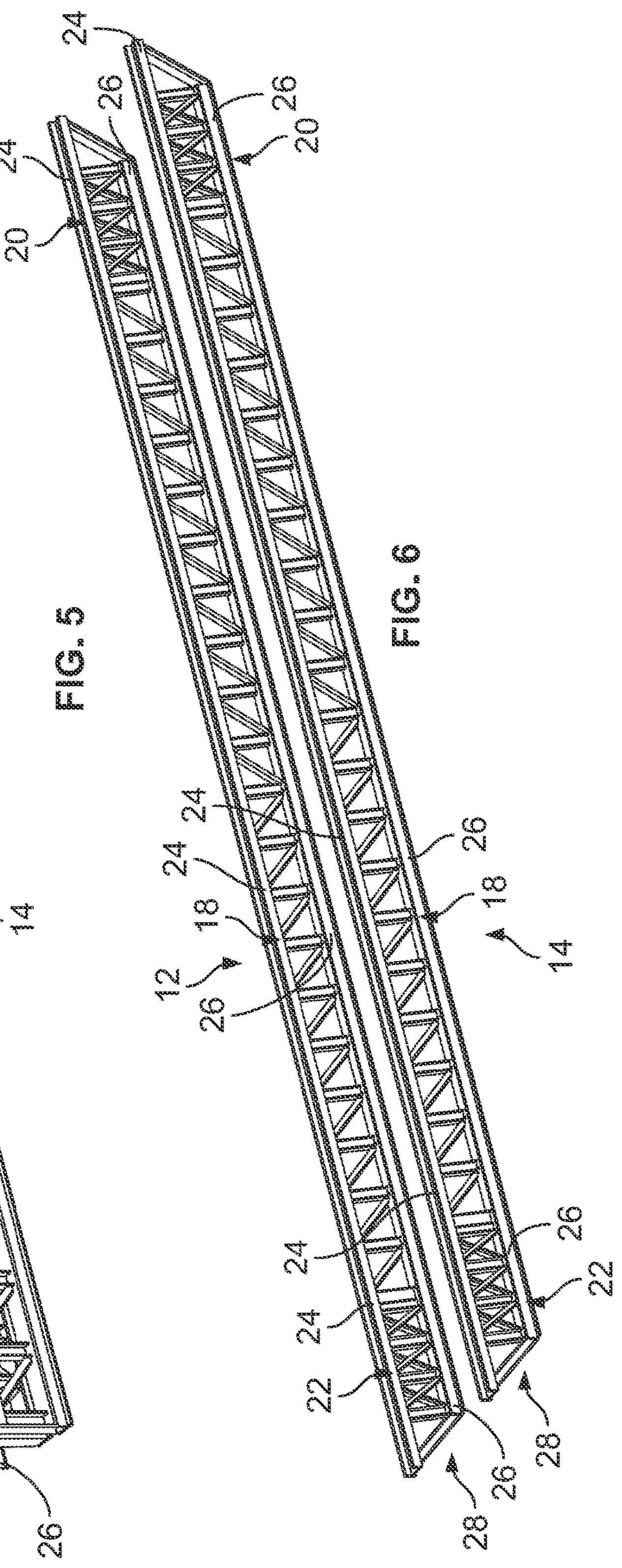
FIG. 6 is a top, front, left perspective view of the first and second truss assemblies of FIG. 5 in a work configuration.
Figure 7:
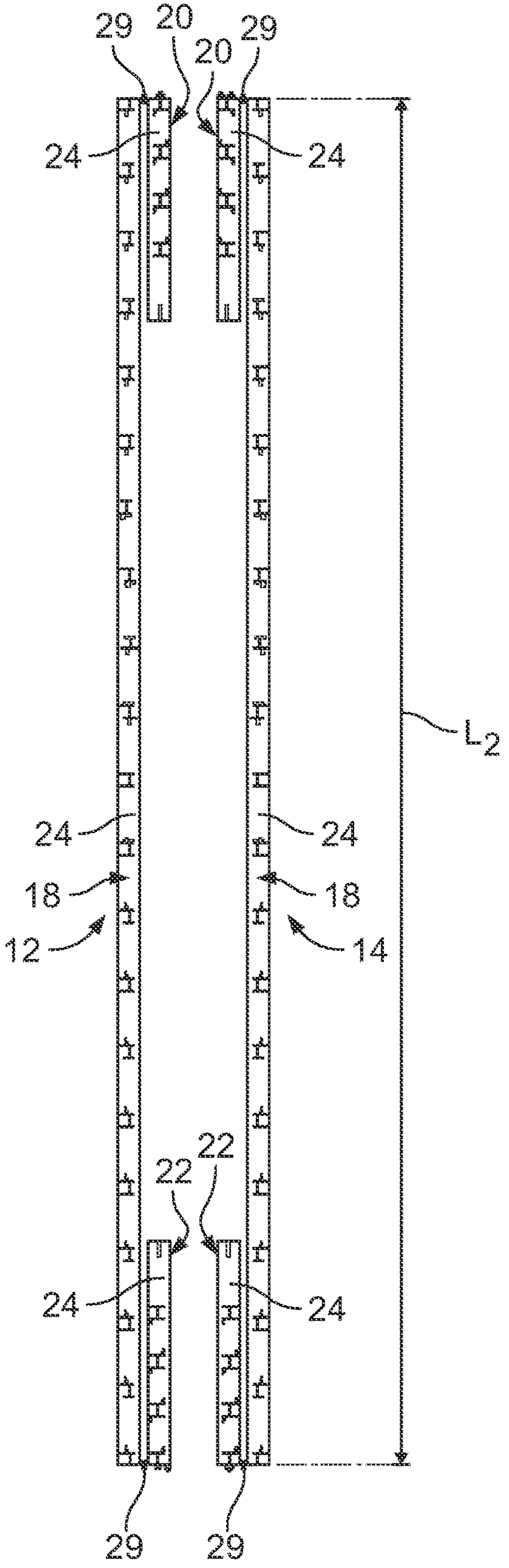
FIG. 7 is a top view of the first and second truss assemblies of FIG. 5.
Figure 8:
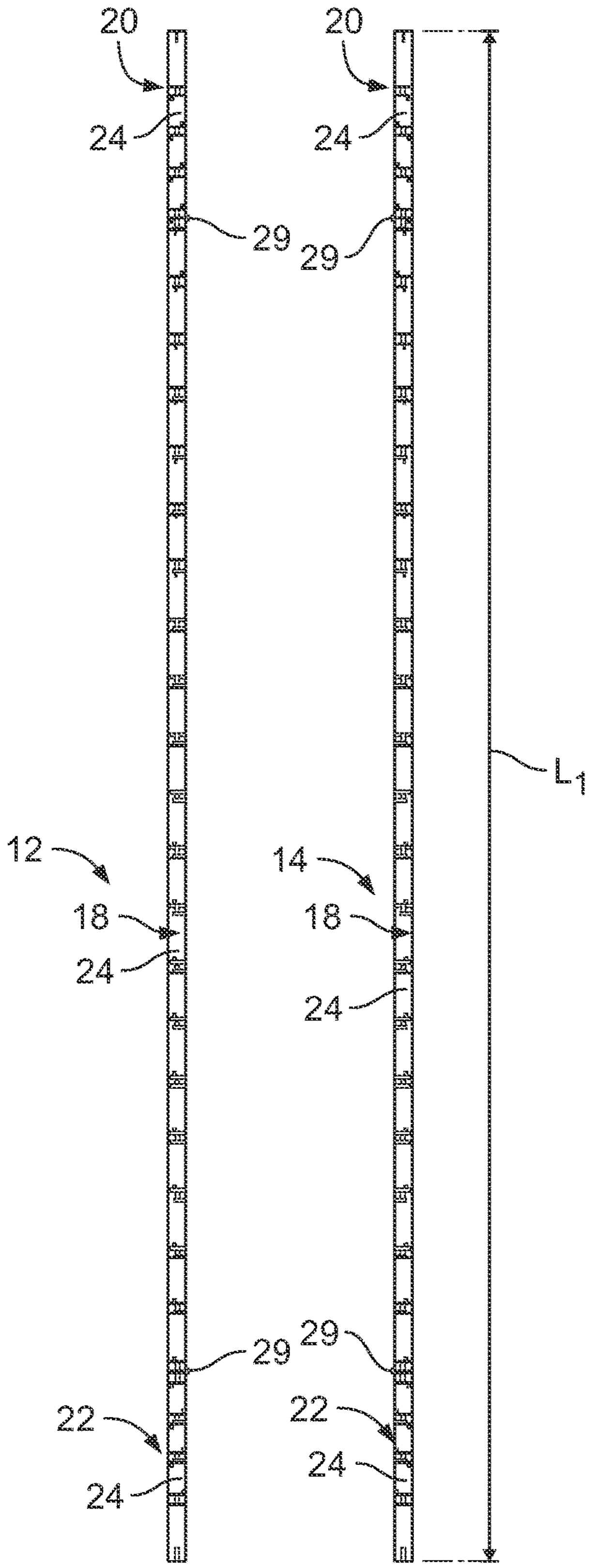
FIG. 8 is a top view of the first and second truss assemblies of FIG. 6.
Figure 9:
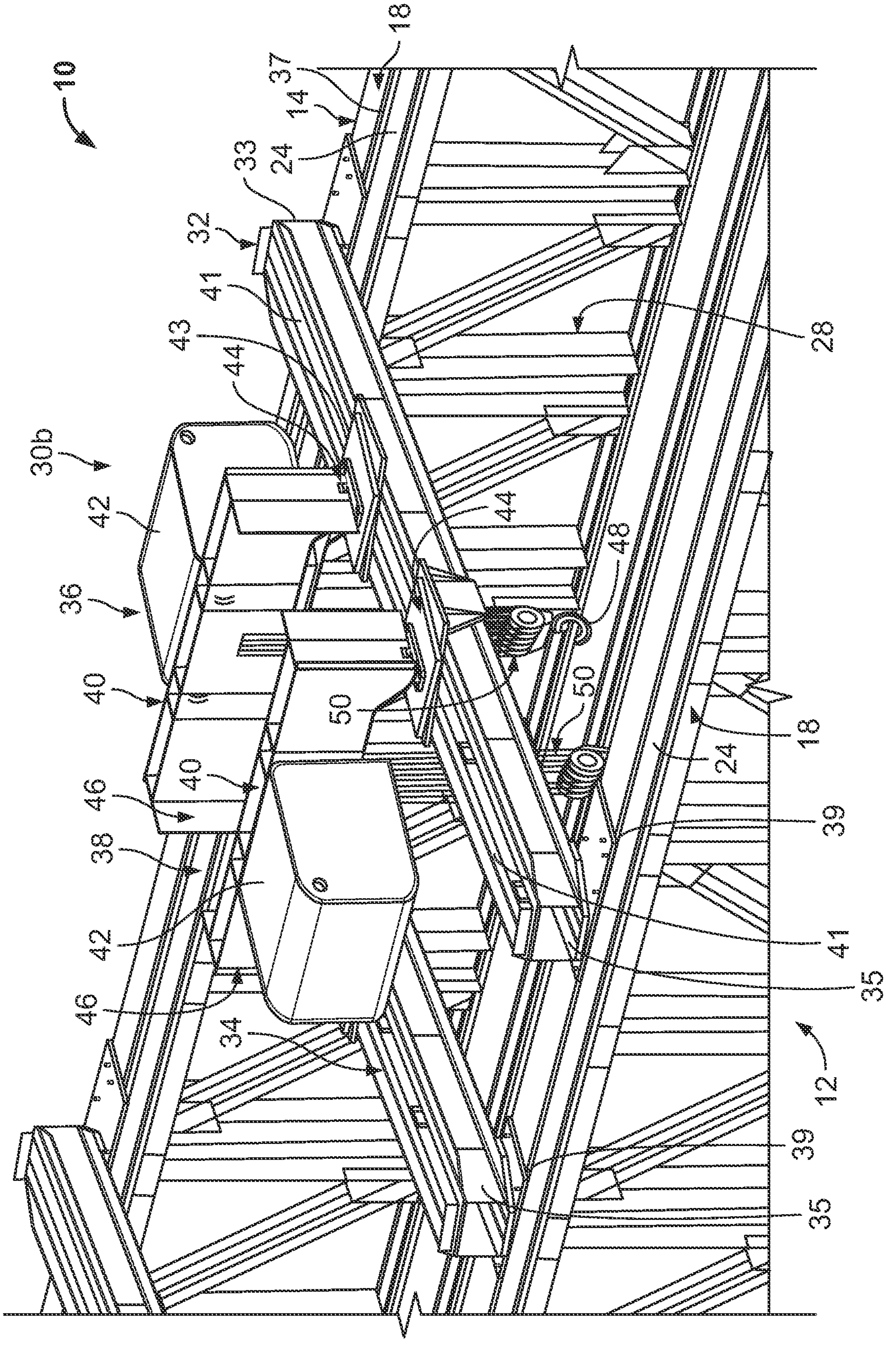
FIG. 9 is a top, back, left, perspective view of an upper gantry assembly of the mobile crane of FIG. 1.
Figure 10:
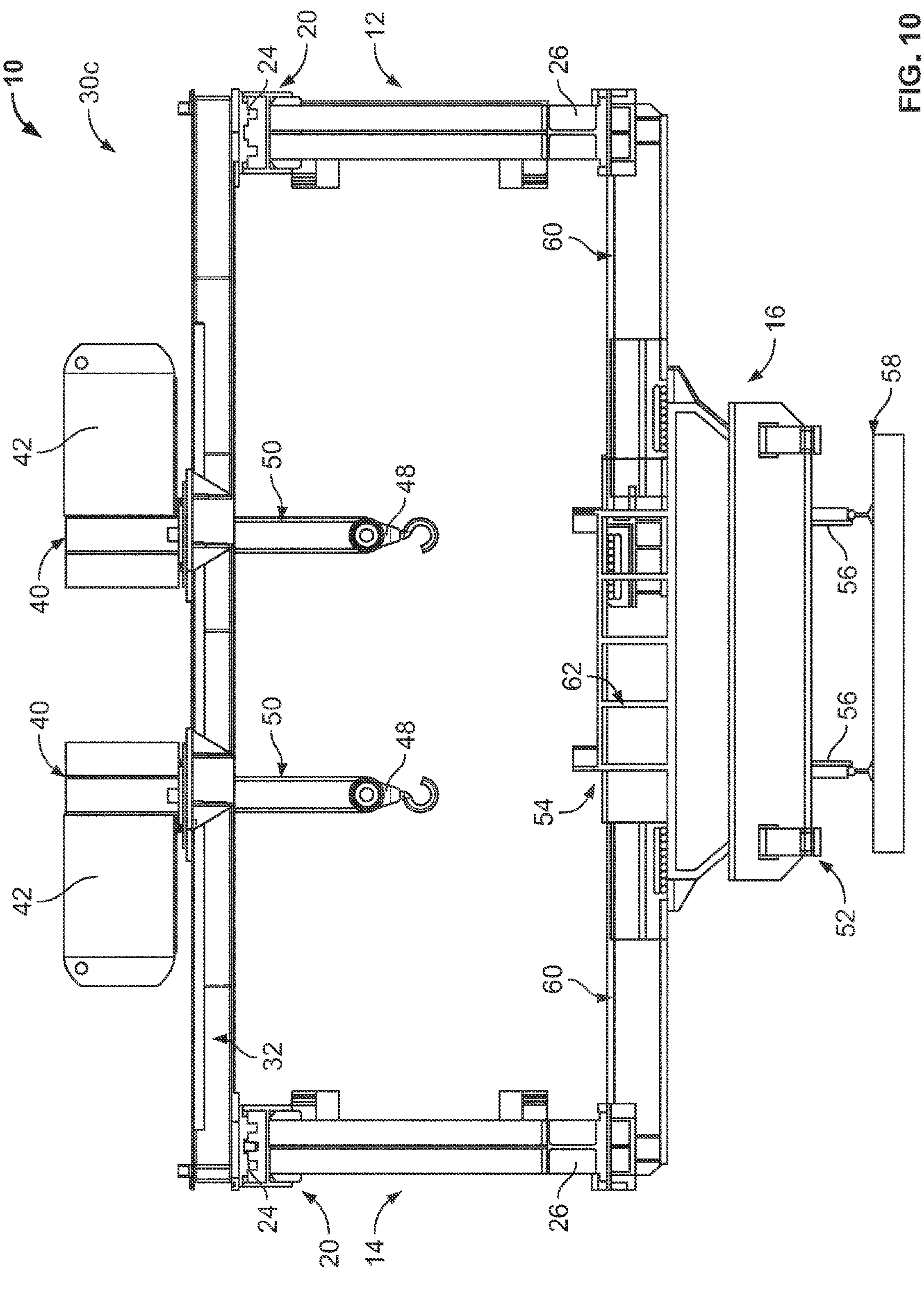
FIG. 10 is an end view of the mobile crane of FIG. 1.
Figure 11:
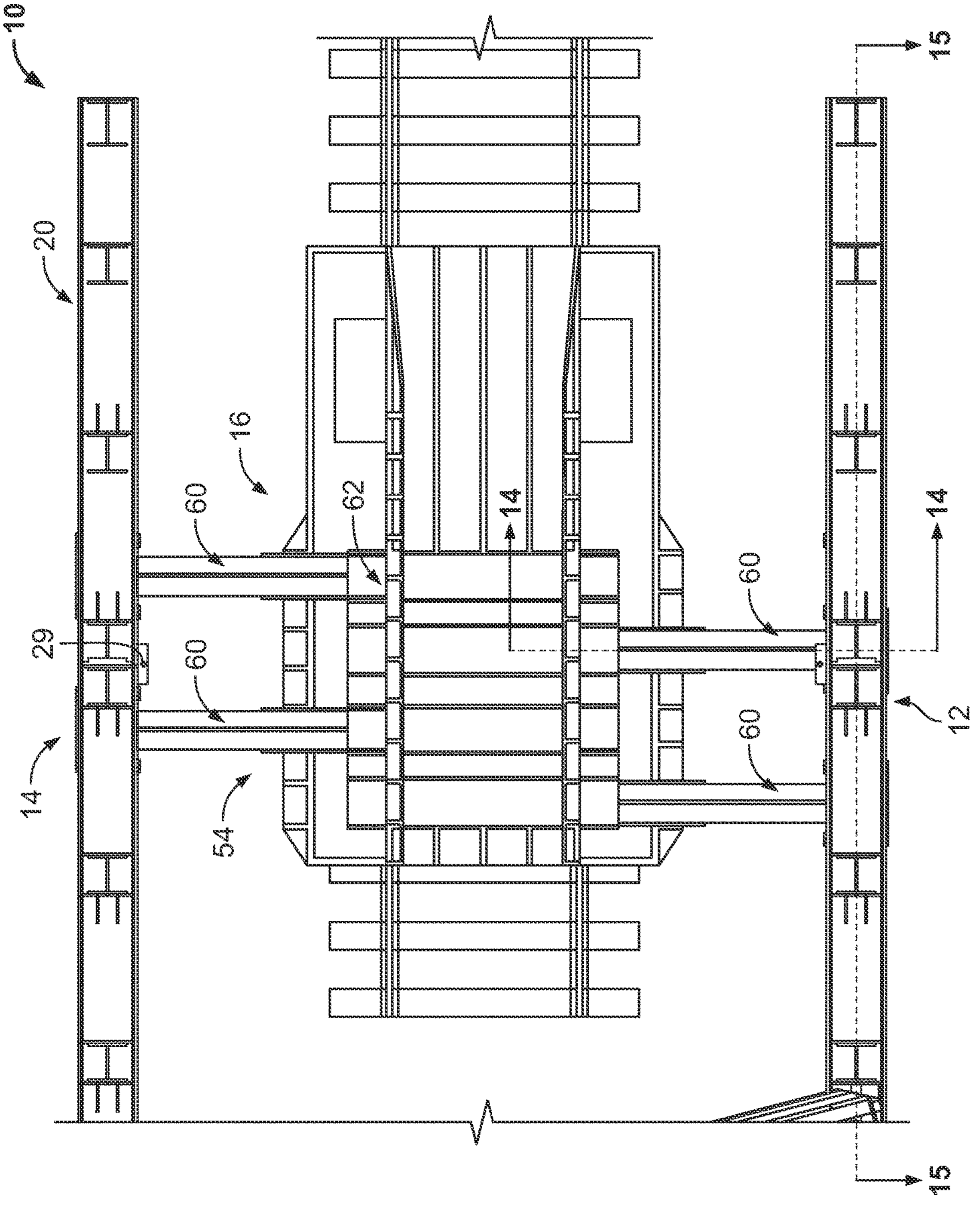
FIG. 11 is a top view of a rail car end assembly of the mobile crane of FIG. 1.
Figure 12:
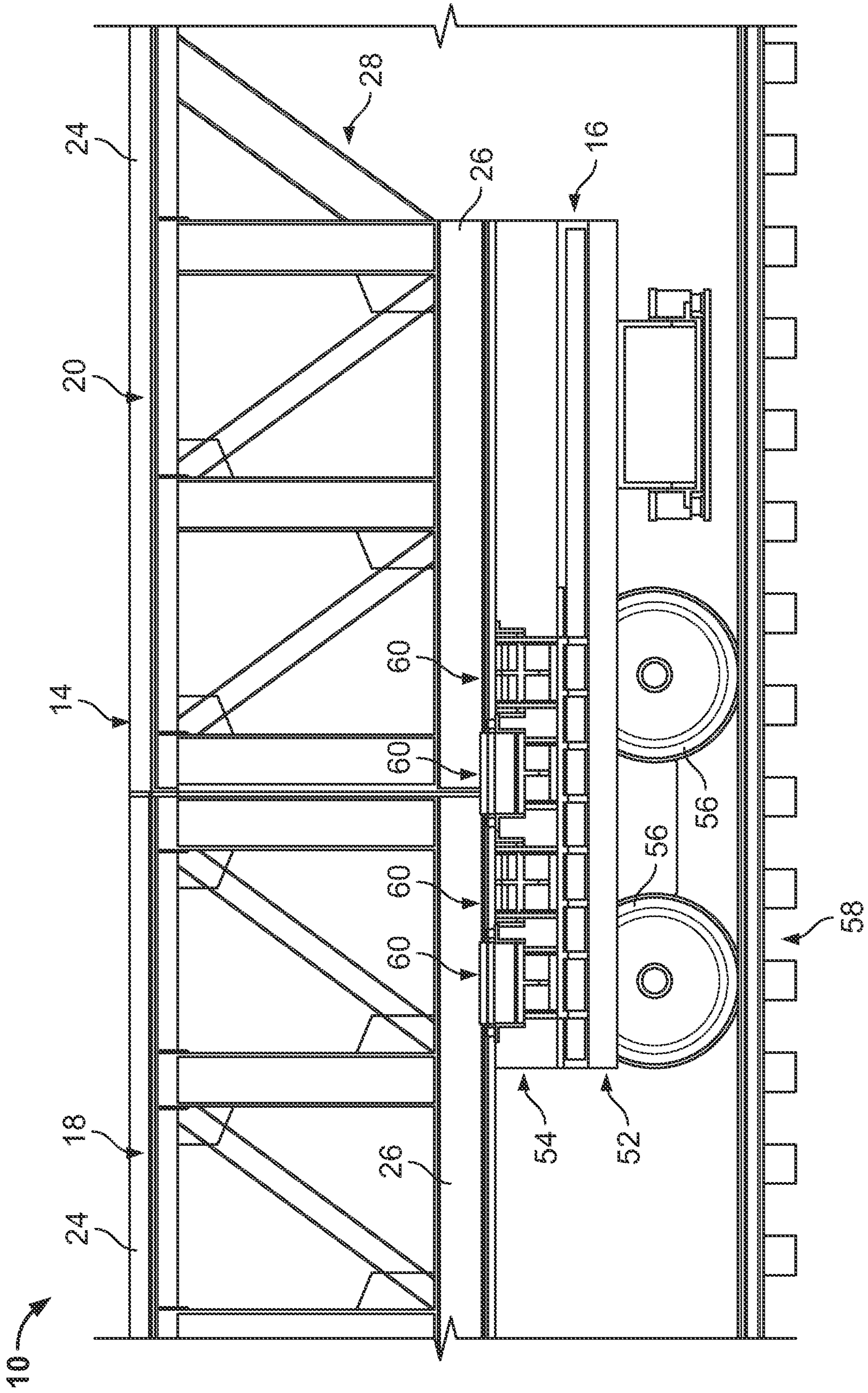
FIG. 12 is a front view of the rail car end assembly of FIG. 10.
Figure 13:
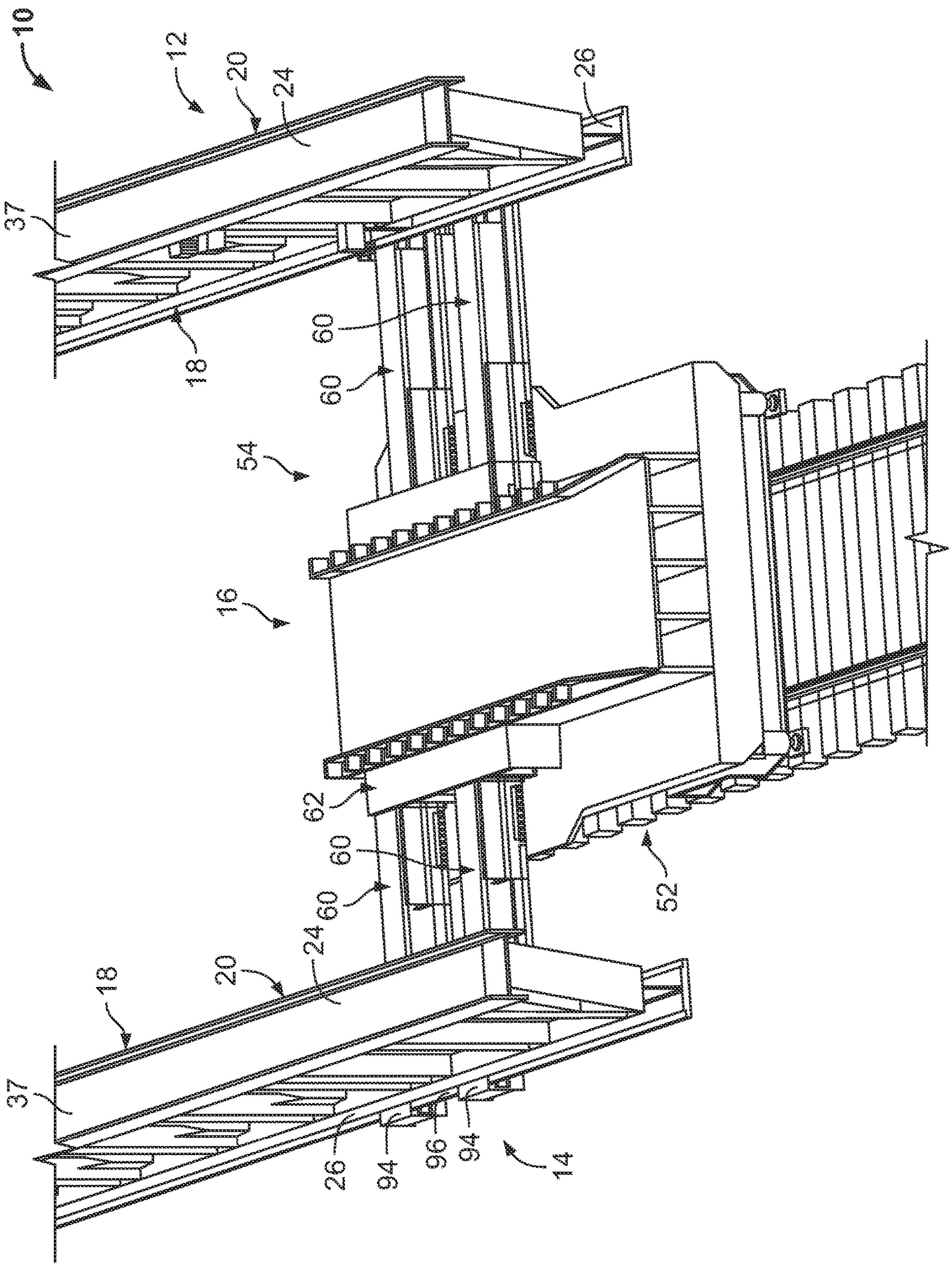
FIG. 13 is a top, front, right perspective view of the rail car end assembly of FIG. 10.
Figure 14:
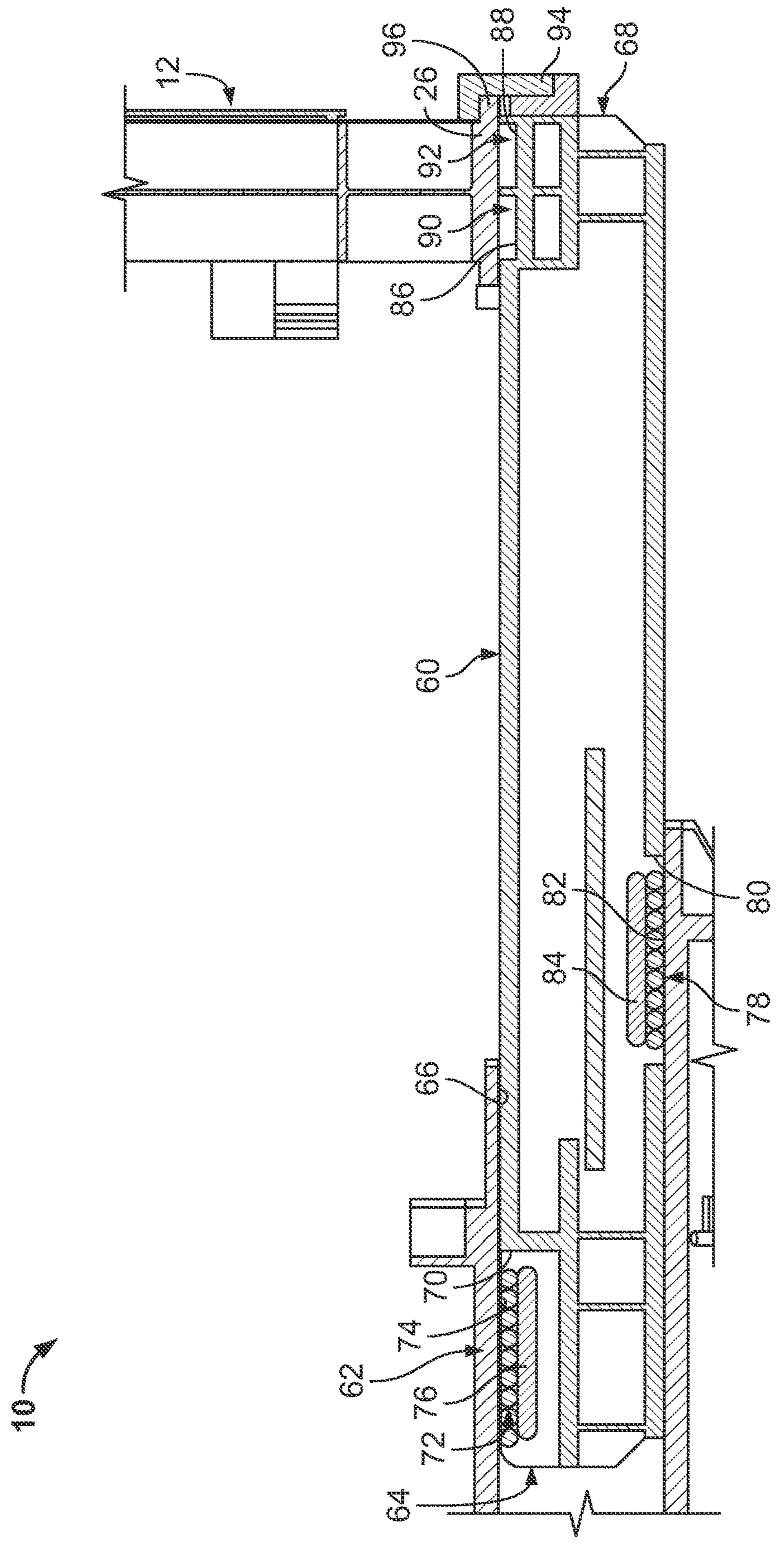
FIG. 14 is a cross-sectional view taken along line 14-14 in FIG. 11.
Figure 15:
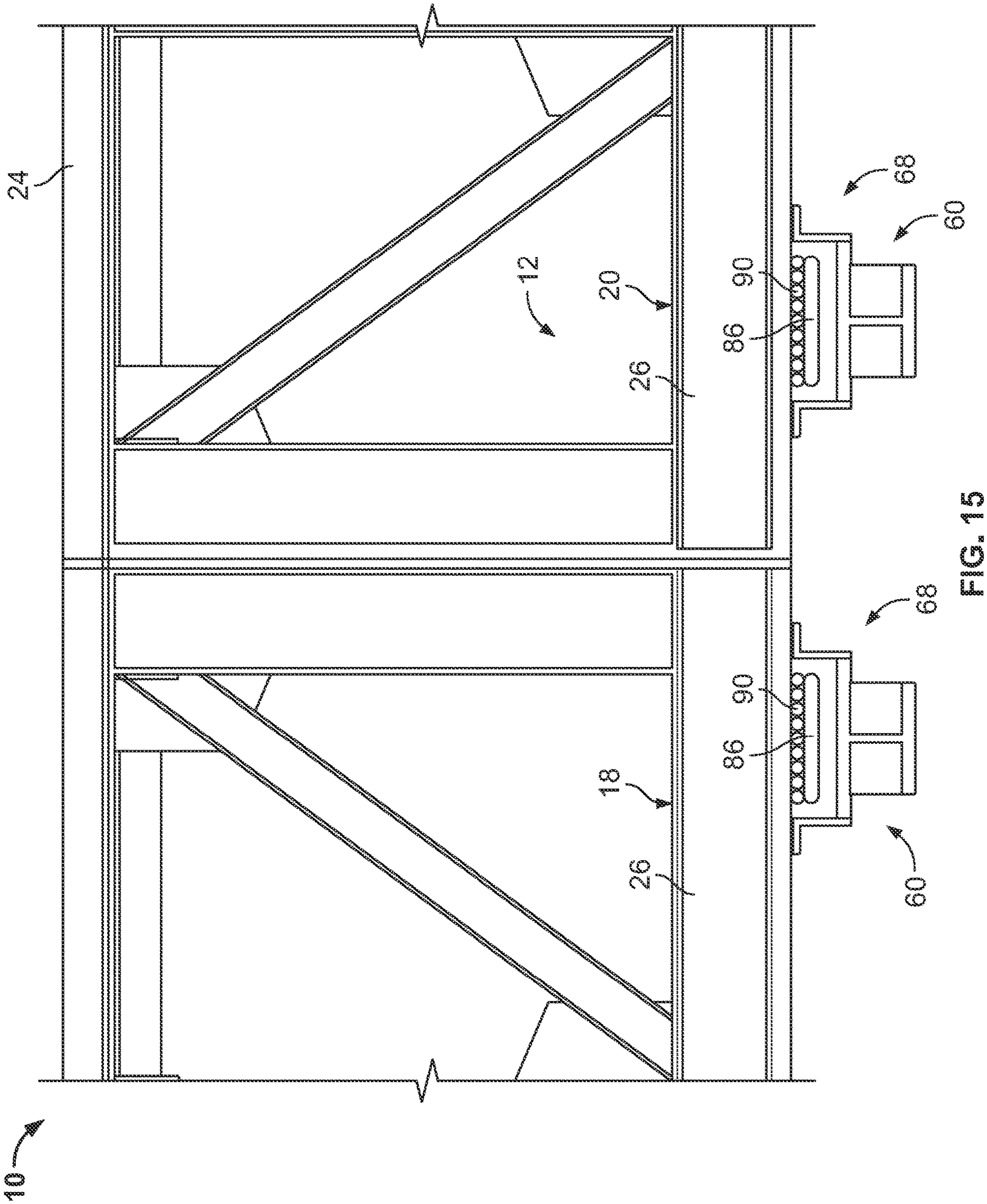
FIG. 15 is a cross-sectional view taken along line 15-15 in FIG. 11.

The mobile crane 10 is moveable between a transportation configuration (shown in FIGS. 1, 5, 7) and a work configuration (shown in FIGS. 2, 6, 8). The first and second truss assemblies 12 and 14 are moveably coupled to the first and second rail car end assemblies 16, 17, which allow the truss assemblies 12, 14 to selectively translate inwardly toward one another (to transition the mobile crane 10 from the work configuration to the transportation configuration) or outwardly away from one another (to transition the mobile crane 10 from the transportation configuration to the work configuration). In some aspects, the movable coupling between the first and second rail cars 16, 17 and the first and second truss assemblies 12, 14 can allow the truss assemblies 12, 14 to move relative to the rail cars 16, 17, which may remain stationary while the mobile crane 10 transitions between work and transportation configurations.

In some aspects, the first truss assembly 12 is similar to the second truss assembly 14. Accordingly, the following description of the first truss assembly 12 can be applied to the second truss assembly 14, which may include similar components that are identified in the figures using like reference numerals.

The first truss assembly 12 includes a main truss 18, a first truss extension 20 pivotally coupled to one end of the main truss 18, and a second truss extension 22 pivotally coupled to an opposing end of the main truss 18. Each of the main truss 18, the first truss extension 20, and the second truss extension 22 include an upper support beam 24, a lower support beam 26, and a plurality of interior support members 28 extending between the upper and lower support beams 24 and 26. As shown in the illustrative figures, the interior support members 28 may be oriented differently, depending upon their location within the truss assembly 12, 14. In some aspects, the plurality of interior support members 28 includes both vertical support members 28*a* and angled support members 28*b*. In some truss assemblies 12, 14, vertical support members 28*a* and angled support members 28*b*' alternate along the main truss 18. In some aspects, the angled support members 28*b*' extend upwardly and outwardly from the lower support beam 26 toward the nearest end of the main truss 18 and toward the upper support beam 24. The angled support members 28*b*' present in the first and second truss extensions 20, 22 may similarly angle upward and inward toward the nearest end of the main truss 18.

The pivotal coupling of the first and second truss extensions 20, 22 to the main truss 18 enables the first truss assembly 12 to define a variable longitudinal length, as desired. This can enable the first truss 12 to selectively define an extended longitudinal length $L_1$ when the mobile crane 10 is in the work configuration (shown in FIG. 8), and define a shortened longitudinal length $L_2$ when the mobile crane 10 is in the transportation configuration (shown in FIG. 7). In the transportation configuration, the first and second truss extensions 20, 22 are pivotally rotated inward toward the second truss assembly 14 so that the first and second truss extensions 20, 22 are arranged generally parallel with the main truss 18. Similarly, the first and second truss extensions 20, 22 coupled to the second truss assembly 14 are pivotally rotated inward toward the first truss assembly 12. The first and second truss extensions 20, 22 can be contained within an interior space 27 defined between the first and second truss assemblies 12, 14. In the work configuration, the first and second truss extensions 20, 22 are pivotally rotated outward such that the first and second truss extensions 20, 22 are generally aligned along a longitudinal axis X-X defined by the main truss 18. As previously discussed, the truss assemblies 12, 14 can be separated from one another to increase the size of the interior space 27, which then allows the truss extensions 20, 22 to be rotated outwardly from the interior space 27, one at a time. Thus, the selective pivotal rotation between the work and transportation configurations enables the mobile crane 10 to alter the longitudinal length defined by the first and second truss assemblies 12, 14 between the extended longitudinal length $L_1$ and the shortened longitudinal length $L_2$.

In some non-limiting examples, the first and second truss extensions 20, 22 may be manually rotated about a pivot 29 (e.g., a hinge or a pivot pin) between the transportation and work configurations. In some non-limiting examples, the first and second truss extensions 20, 22 may be electrically, hydraulically, or mechanically rotated about the pivot 29 between the transportation and work configurations. In some non-limiting examples, the first and second truss extensions 20, 22 may be locked in the transportation and/or work configurations via one or more locking mechanisms 31 (e.g., bolts, quick disconnects, linkages, keyed features, cam locks, braces, etc.). The locking mechanisms 31 may also be actuated manually, as well as electrically, hydraulically, or mechanically.

In one non-limiting example, the first and second truss extensions 20, 22 may be separated from the main truss 18 and may be carried into alignment with the main truss 18 via a mule cart (not shown) on another railcar. Once the mule cart transports the first and second truss extensions 20, 22 into alignment with the main truss 18, the first and second truss extensions 20, 22 may be locked into place via a manual or automated locking mechanism 31.

With continued reference to FIGS. 1-8, a plurality of upper gantry assemblies 30 are shown slidably supported by the upper support beams 24 of the main trusses 18 of the first and second truss assemblies 12, 14. In the illustrated non-limiting example, the mobile crane 10 includes three upper gantry assemblies 30*a*, 30*b*, 30*c* spaced apart from one another about the mobile crane 10. The gantry assemblies 30*a*, 30*b*, 30*c* can be spaced apart from one another approximately equally from one another on the truss assemblies 12, 14, or can vary. In other non-limiting examples, the mobile crane 10 may include more or less than three upper gantry assemblies 30, as desired. That is, the mobile crane 10 may be modular and may be configured on an application-by-application basis to include a desired number of upper gantry assemblies 30 as required by a specific application. In some aspects, a motor (not shown) is used to drive the upper gantry assemblies 30 about the upper support beams 24 of the main trusses 18.

With specific reference to FIGS. 1-4, 9, and 10, the upper gantry assemblies 30*a*, 30*b*, 30*c* are shown in detail. In some non-limiting examples, each of the upper gantry assemblies 30*a*, 30*b*, 30*c* are formed of similar components. For brevity, the following description of the upper gantry assembly 30*b* can also be applied to the upper gantry assemblies 30*a*, 30*c*, which each have similar components identified using like reference numerals. The upper gantry assembly 30*b* includes a first bridge beam 32 and a second bridge beam 34 each extending between the upper support beam 24 of the first truss assembly 12 and the upper support beam 24 of the second truss assembly 14. Opposing ends 33, 35 of the first and second bridge beams 32, 34 are slidably coupled to the upper support beams 24 of the first and second truss assemblies 12, 14. In some aspects, a guide track 37 is formed in the upper support beams 24 of the truss assemblies 12, 14 to guide and constrain the sliding (and motor-driven, in some examples) motion of the bridge beams 32, 34 relative to the truss assemblies 12, 14. In such embodiments, projections 39 may extend away from each of the ends 33, 35 of the bridge beams 32, 34 and into the guide tracks 37. In some non-limiting examples, the projections 39 are cylindrical in shape. The projections 39 may form a clearance fit with the walls of the guide tracks 37, which allows the projections 39 to both pivot and slide within the guide tracks 37. In this way, the first and second bridge beams 32, 34 are movable longitudinally along the upper support beams 24 of the first and second truss assemblies 12, 14, and can also rotate as the truss assemblies 12, 14 are moved toward or apart from one another to transition between transportation and work configurations. In some aspects, the first and second bridge beams 32, 34 are rotatable relative to the first and second truss assemblies 12, 14 through an angle of between about 5 degrees and about 90 degrees.

The upper gantry assemblies 30*a*, 30*b*, 30*c* can include a first hoist assembly 36 and a second hoist assembly 38. In some aspects, the first hoist assembly 36 and the second hoist assembly 38 are both slidably supported on the first and second bridge beams 32, 34. The first and second hoist assemblies 38 are moveable along a longitudinal direction defined by a channel 41 formed in the first and second bridge beams 32, 34, which can be approximately transverse to a longitudinal direction defined by the first and second truss assemblies 12, 14 when the mobile crane 10 is in a work configuration. The first hoist assembly 36 can be similar to the second hoist assembly 38, and both hoist assemblies 36, 38 can oppose one another. Therefore, the following description of the first hoist assembly 36 can similarly be considered to describe the second hoist assembly 38, with similar components identified using like reference numerals.

The first hoist assembly 36 includes a hoist support structure 40 and a hoist 42. The hoist support structure 40 is attached to the hoist 42 such that the hoist 42 extends from a central portion of the hoist support structure 40 and is arranged between the first and second bridge beams 32, 34. Opposing ends 44, 46 of the hoist support structure 40 are moveably and rotatably coupled to the first and second bridge beams 32, 34, respectively. That is, the ends 44, 46 of the hoist support structure 40 are coupled to the first and second bridge beams 32, 34 such that the rotational orientation between the ends 44, 46 and the first and second bridge beams 32, 34 may vary and such that the first hoist assembly 36 may move longitudinally along the first and second bridge beams 32, 34. The rotational coupling of the ends 44, 46 to the first and second bridge beams 32, 34 enables the hoist support structure 40 to maintain a substantially parallel relationship with the upper support beams 24 of the truss assemblies 12, 14. The moveable coupling of the ends 44, 46 to the first and second bridge beams 32, 34 enables the first hoist assembly 36 to be movable between the first and second truss assemblies 12, 14 in a direction transverse to the longitudinal direction defined by the first and second trusses 12, 14. In some non-limiting examples, the channel 41 formed in the first and second bridge beams 32, 34 receives a portion of the ends 44, 46 to constrain motion of the hoist assemblies 36, 38 relative to the truss assemblies 12, 14. For example, each end 44, 46 may include a cylindrical protrusion 43 extending away from the end 44, 46 into the channel 41, which can then allow rotational and translational motion within the channel 41 while also securing the hoist assemblies 36, 38 to the bridge beams 32, 34.

In the illustrative example, the hoist 42 includes a clasp 48 that is supported by and coupled to one or more support cables 50. The clasp 48 and support cables 50 hang down below the hoist support structure 40 and are moveable in a vertical direction toward and away from a ground or track 58 on which the mobile crane 10 is supported. In some non-limiting examples, the first and second hoist assemblies 36, 38 may be able to individually support and lift between 10 and 30 tons. In some non-limiting examples, the first and second hoist assemblies 36, 38 may be able to individually support and lift approximately 20 tons. The illustrated mobile crane 10 includes a total of six hoist assemblies, thus, the total lifting capacity of the mobile crane 10 is six times the individual lift capacities of the first and second hoist assemblies 36 and 38 individually. As described above, the mobile crane 10 may be designed with more or less than three upper gantry assemblies 30*a*, 30*b*, 30*c*. In this way, the mobile crane 10 may be modularly designed to support a desired load capacity by selecting a corresponding number of upper gantry assemblies 30.

The illustrated upper gantry assemblies 30*a*, 30*b*, 30*c* include two hoists 42. The use of two hoists 42 may eliminate the need for additional lifting straps, chains, or other lifting devices when lifting or supporting an object (e.g., a railroad track section) with the hoists 42. In addition, the use of two hoists 42 enables the mobile crane 10 to tilt an object (see FIG. 29) for easier installation and removal. Additionally, the use of two hoists 42 can also help balance a pile driver (not shown) or other equipment that might be used during a bridge building, replacement, or maintenance procedure.

As described above, the first and second truss assemblies 12 and 14 are movably coupled to the first and second rail car end assemblies 16, 17. Because the first rail car end assembly 16 can be similar to the second rail car end assembly 17, the following description of the first rail car end assembly 16 should be considered to describe the second rail car end assembly 17 as well, and similar components are identified using like reference numerals for both rail car end assemblies 16, 17. As illustrated in FIGS. 10-15, the first rail car end assembly 16 includes a rail car bogey 52 and a lateral extension assembly 54 supported on the rail car bogey 52. The rail car bogey 52 includes a plurality of wheels 56 spaced apart laterally in accordance with the design of a railroad track 58 upon which the rail car bogey 52 traverses.

The lateral extension assembly 54 includes a plurality of truss support beams 60 coupled to a truss support structure 62. The plurality of truss support beams 60 are movably coupled to the lower support beams 26 of the first and second truss assemblies 12, 14. In the illustrated non-limiting example, the lateral extension assembly 54 includes four truss support beams 60 with two truss support beams 60 coupled to the lower support beam 26 of the first truss assembly 12 and two truss support beams 60 coupled to the lower support beam 26 of the second truss assembly 14. In other non-limiting examples, the lateral extension assembly 54 may include more or less than four truss support beams 60. The truss support beams 60 extend from the truss support structure 62 to the lower support beams 26 of the respective first and second truss assemblies 12, 14. Each of the truss support beams 60 are slidably received within the truss support structure 62, which enables the first truss assembly 12 and/or the second truss assembly 14 to be selectively moved laterally between the transport configuration and the work configuration. As shown in FIGS. 16E and 16F, the lateral extension assembly 54 may include a mechanism (e.g., a hydraulic mechanism, a mechanical mechanism, an electrical mechanism, or a combination thereof) to facilitate the selective movement of the first truss assembly 12 and/or the second truss assembly 14 between the transportation and work configurations. For example, a hydraulic linkage assembly 55 coupled to the lower support beam 26 of the truss assemblies 12, 14 and coupled to the truss support structure 62 could be used to translate the truss assemblies 12, 14 longitudinally between the transportation configuration and the work configuration. In other examples, each of the truss support beams 60 could be coupled to a transmission shaft (not shown) configured to translate the truss support beams 60 between the transportation configuration and the work configuration.

Each of the plurality of truss support beams 60 can be similar, and the following description of one of the truss support beams 60 can apply to all of the truss support beams 60, albeit coupled to their respective one of the first and second truss assemblies 12, 14. With specific reference to FIGS. 14 and 15, the truss support beam 60 includes a proximal end 64 slidably received within a truss support slot 66 defined by the truss support structure 62, and a distal end 68 slidably coupled to the lower support beam 26 of the first truss assembly 12. The truss support beam 60 includes a first bearing cutout 70 within which a first proximal bearing pack 72 is arranged. The first proximal bearing pack 72 can be supported against a first bearing surface 74 of the truss support structure 62 via a first support plate 76. A second proximal bearing pack 78 is arranged within a second bearing cutout 80 defined by the truss support beam 60. The second proximal bearing pack 78 is supported by a second bearing surface 82 of the truss support structure 62 via a second support plate 84. The first proximal bearing pack 72 is arranged adjacent to the proximal end 64 and the second proximal bearing pack 78 is arranged between the first proximal bearing pack 72 and the distal end 68. The first and second bearing packs 72 and 78 enable smooth lateral movement of the proximal end 64 within the truss support slot 66 as the first truss assembly 12 moves laterally between the transport and work configurations. In some non-limiting examples, the bearing packs 72, 78 can include roller bearings.

The distal end 68 of the truss support beam 60 includes first and second bearing tracks 86, 88 that extend transverse to a longitudinal direction defined by the truss support beam 60. First and second distal bearing packs 90, 92 are arranged within the first and second bearing tracks 86, 88, respectively. A support beam clamp 94 is arranged to selectively secure the distal end 68 of the truss support beam 60 to an outside flange 96 of the lower support beam 26. That is, the support beam clamp 94 may be configured to selectively interlock the distal end 68 of the truss support beam 60 to the lower support beam 26 of the first truss assembly 12. The support beam clamp 94 may selectively interlock with the outside flange 96, for example, via one or more removable bolts, or via any other removably interlocking mechanism.

When the support beam clamp 94 is unlocked from the outside flange 96, the truss support beam 60 is able to translate longitudinally along the lower support beam 26 (e.g., by pushing or pulling the first rail car end assembly 16). The first and second bearing packs 90, 92 enable the truss support beam 60 to smoothly translate longitudinally along the lower support beam 26 of the first truss assembly 12. When the support beam clamp 94 is interlocked to the outside flange 96, the truss support beam 60 is held in place and inhibited from displacing longitudinally along the lower support beam 26. The selective longitudinal translation achieved via the lateral extension assembly 54 enables the mobile crane 10 to define a variable longitudinal length between the first and second rail car end assemblies 16, 17. This aspect of the mobile crane 10 further adds to the modularity thereof by enabling an operational lift size (i.e., the distance between the first and second rail car end assemblies 16 and 17) to be selectively varied, as desired. In one non-limiting example, the longitudinal length defined by the first and second truss extensions 20, 22 may define a maximum value for the operation lift size.

Figure 16A:
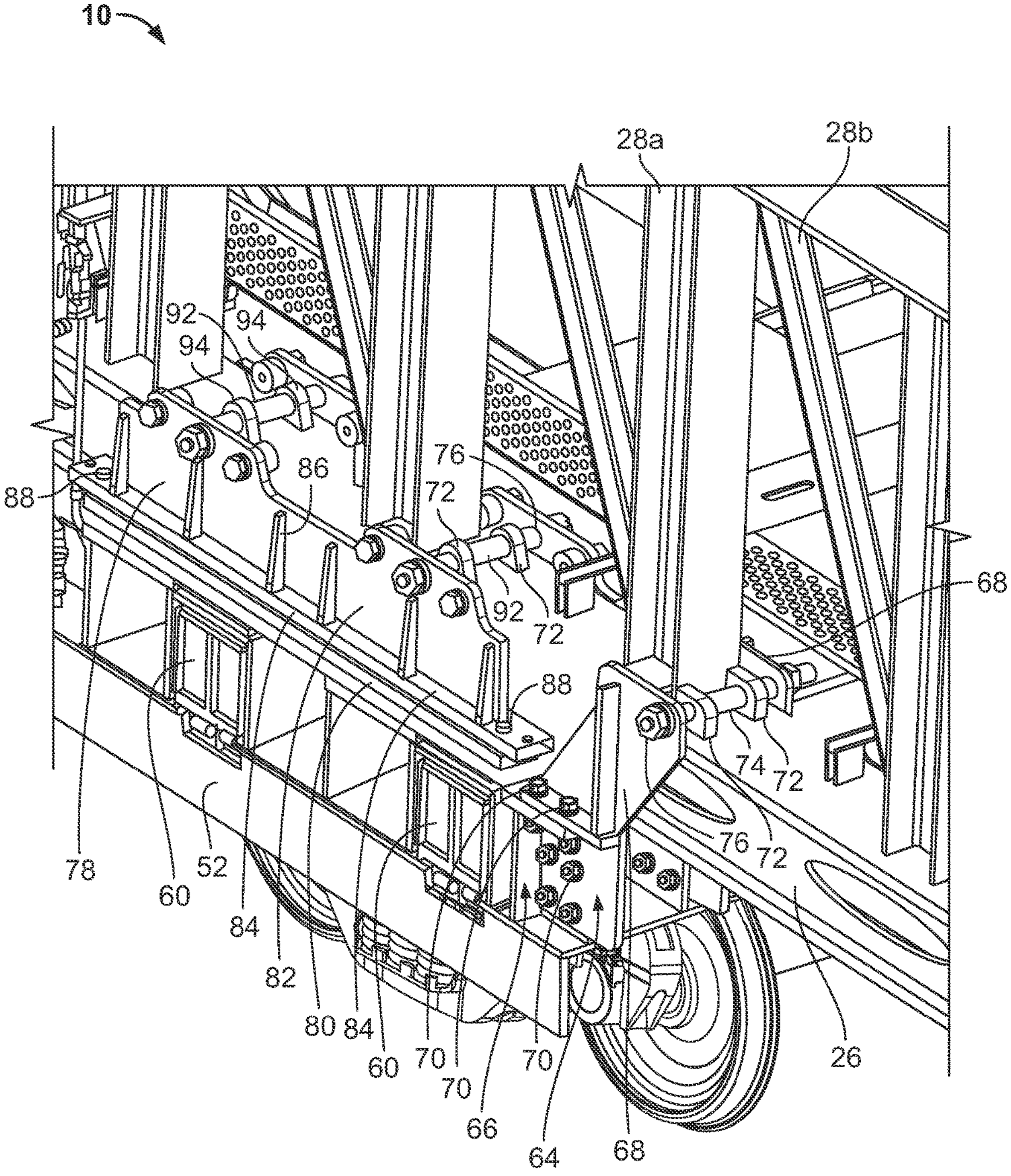
FIG. 16A is a partial perspective view of a thrust block of the mobile crane of FIG. 1.
Figure 16B:
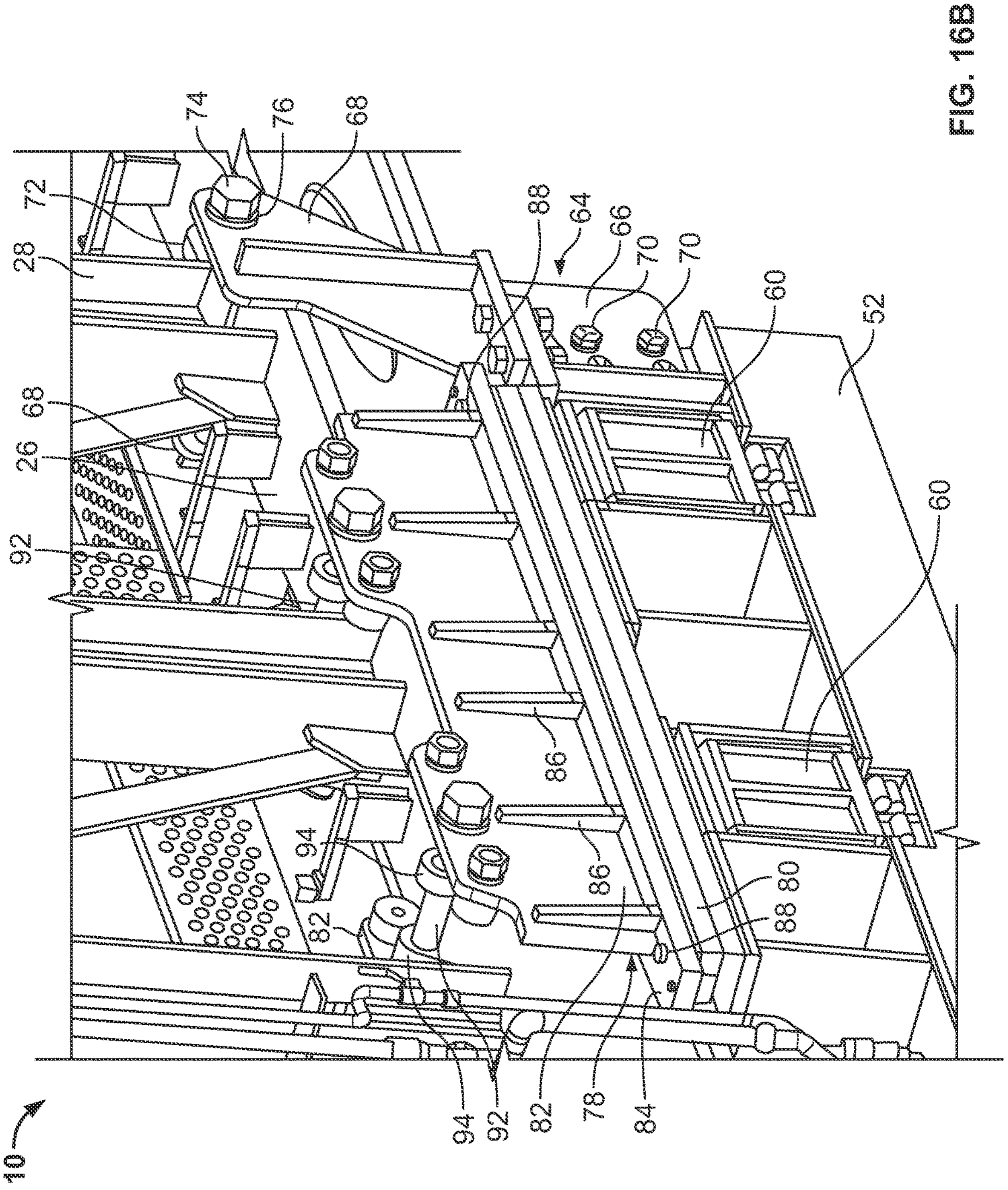
FIG. 16B is a partial perspective view of the thrust block of the mobile crane of FIG. 1.
Figure 16C:
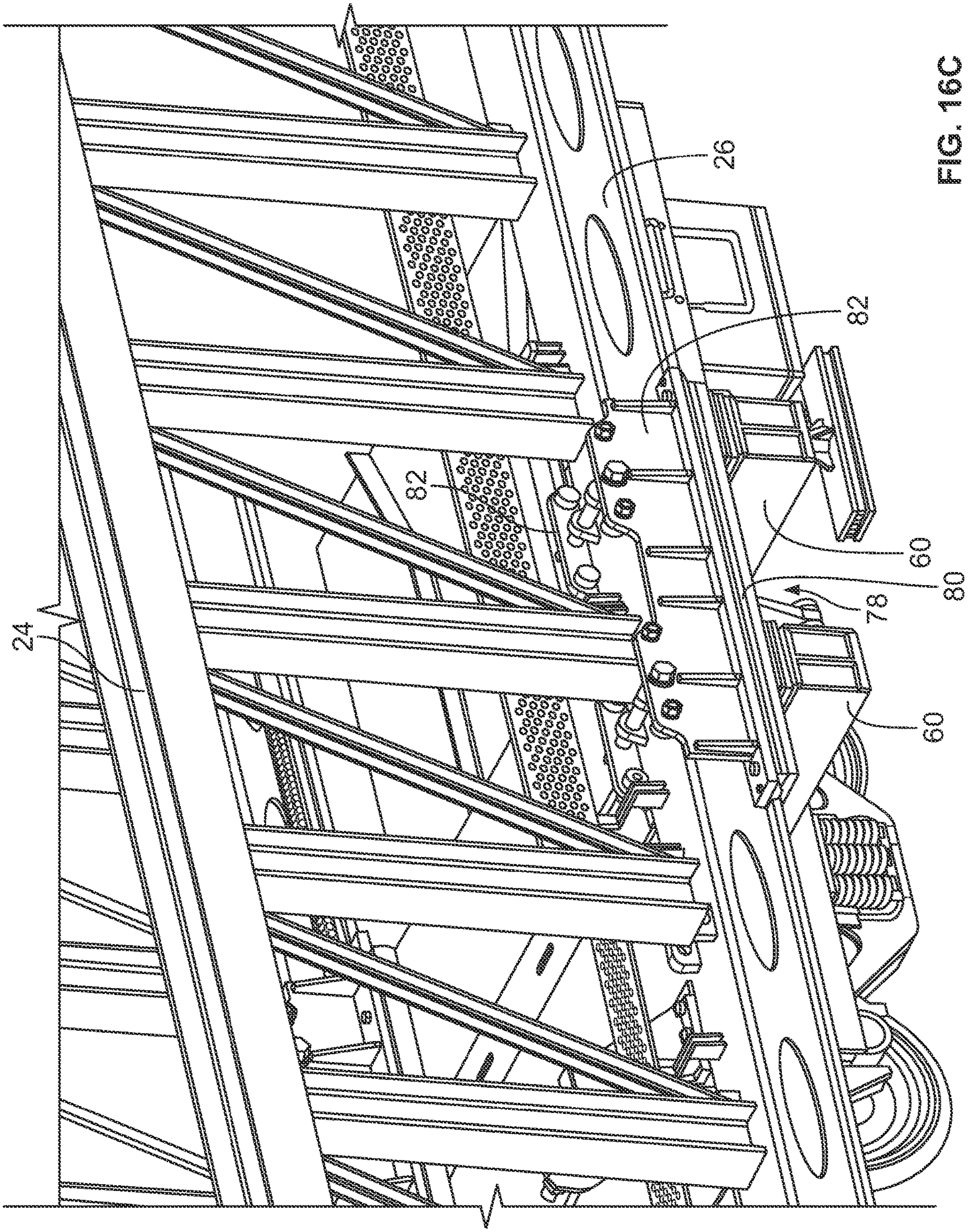
FIG. 16C is a perspective view of the thrust bracket of the mobile crane of FIG. 1.
Figure 16D:
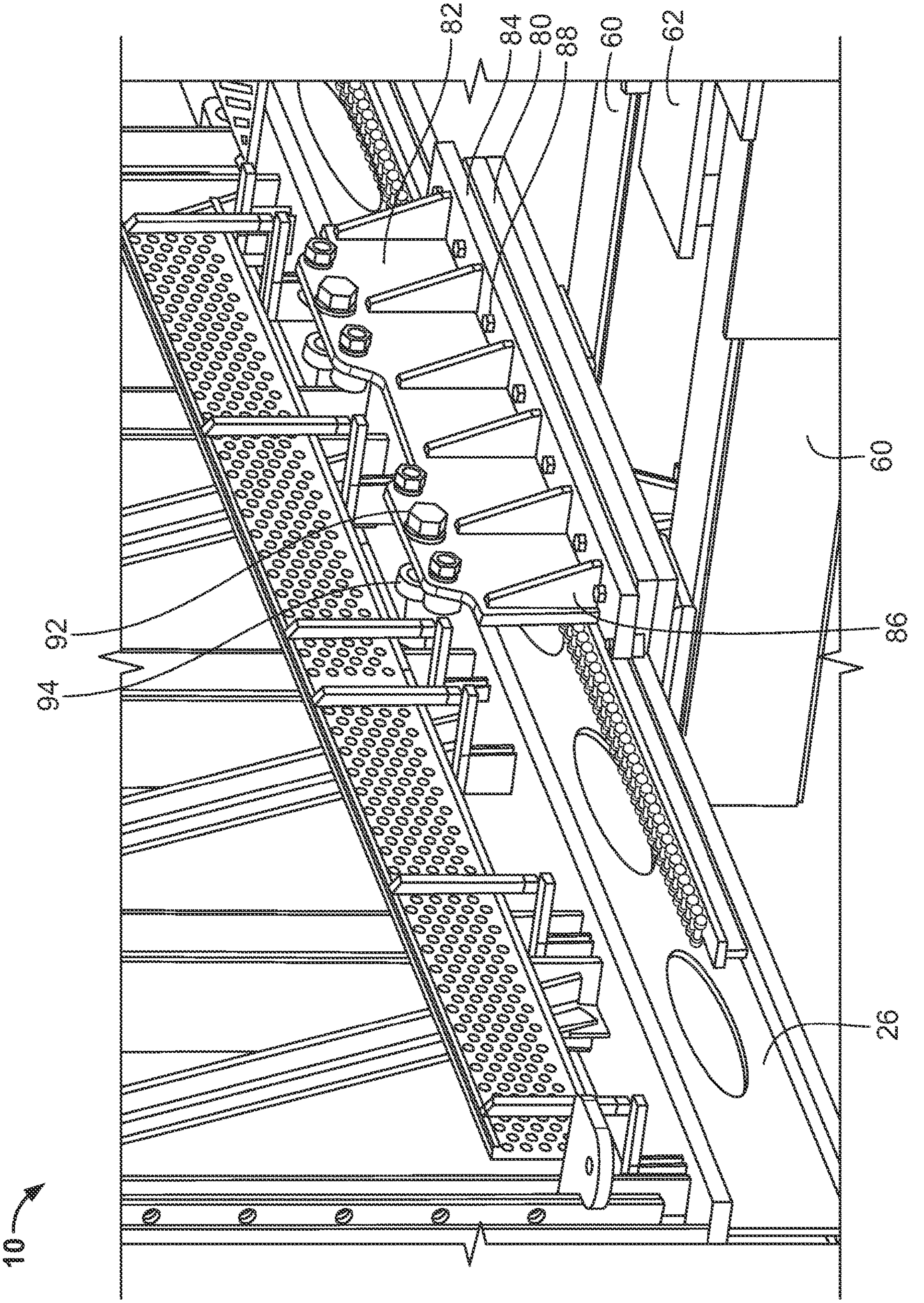
FIG. 16D is a perspective view of the thrust bracket of the mobile crane of FIG. 1, take between the truss assemblies.
Figure 16E:
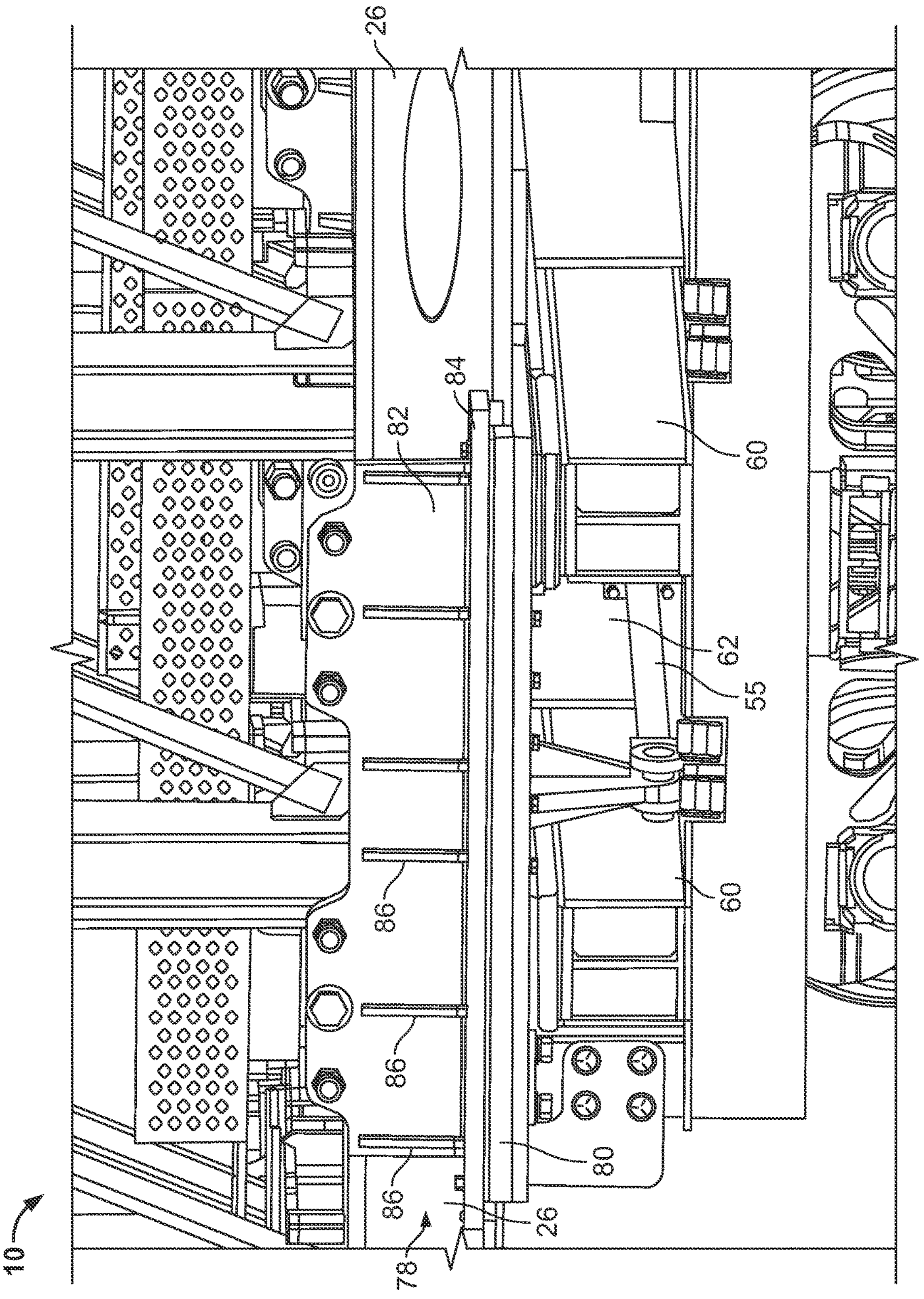
FIG. 16E is a perspective view of a hydraulic mechanism in the rail car end assembly of FIG. 10.
Figure 16F:
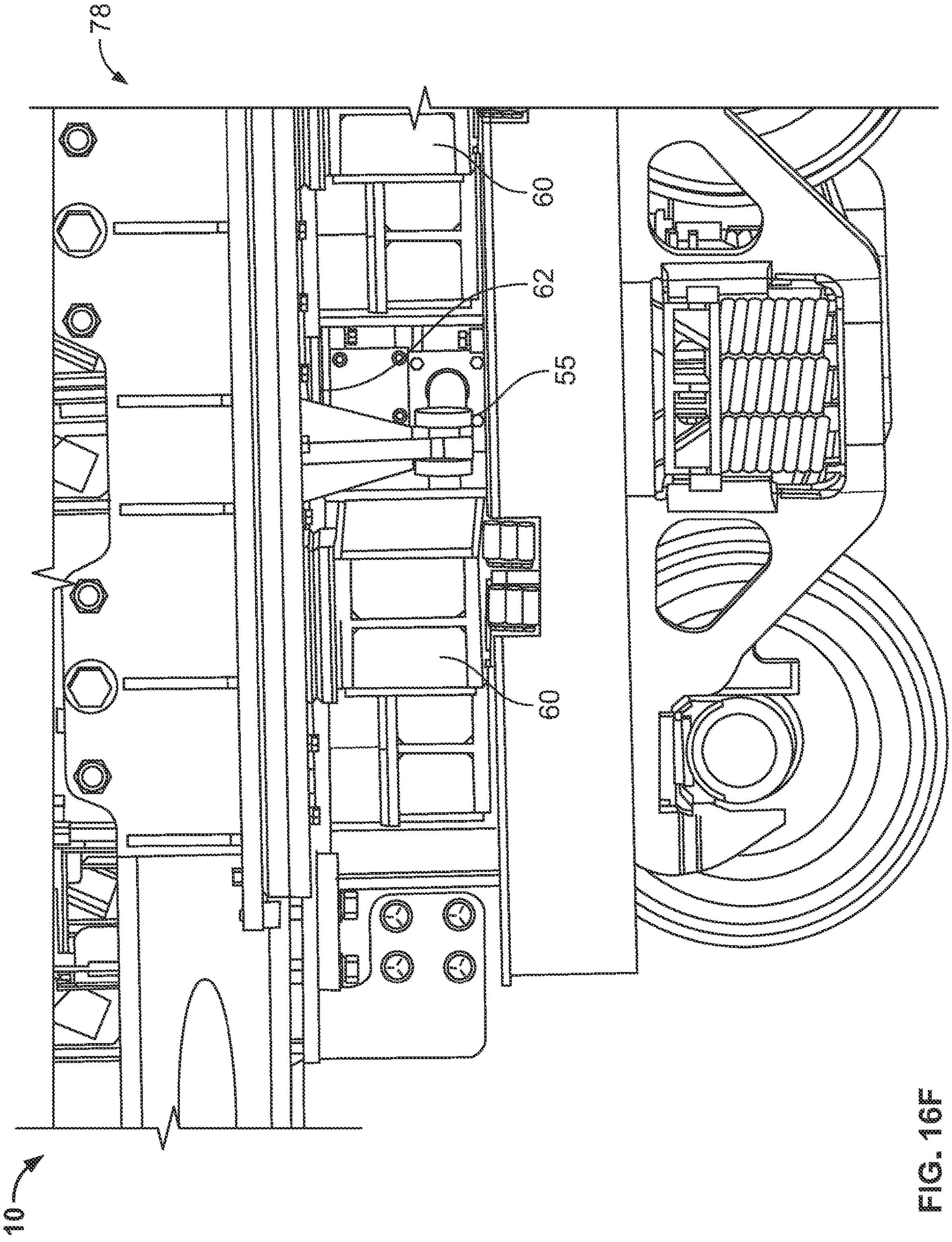
FIG. 16F is a second perspective view of the hydraulic mechanism of FIG. 16E.
Figure 17:
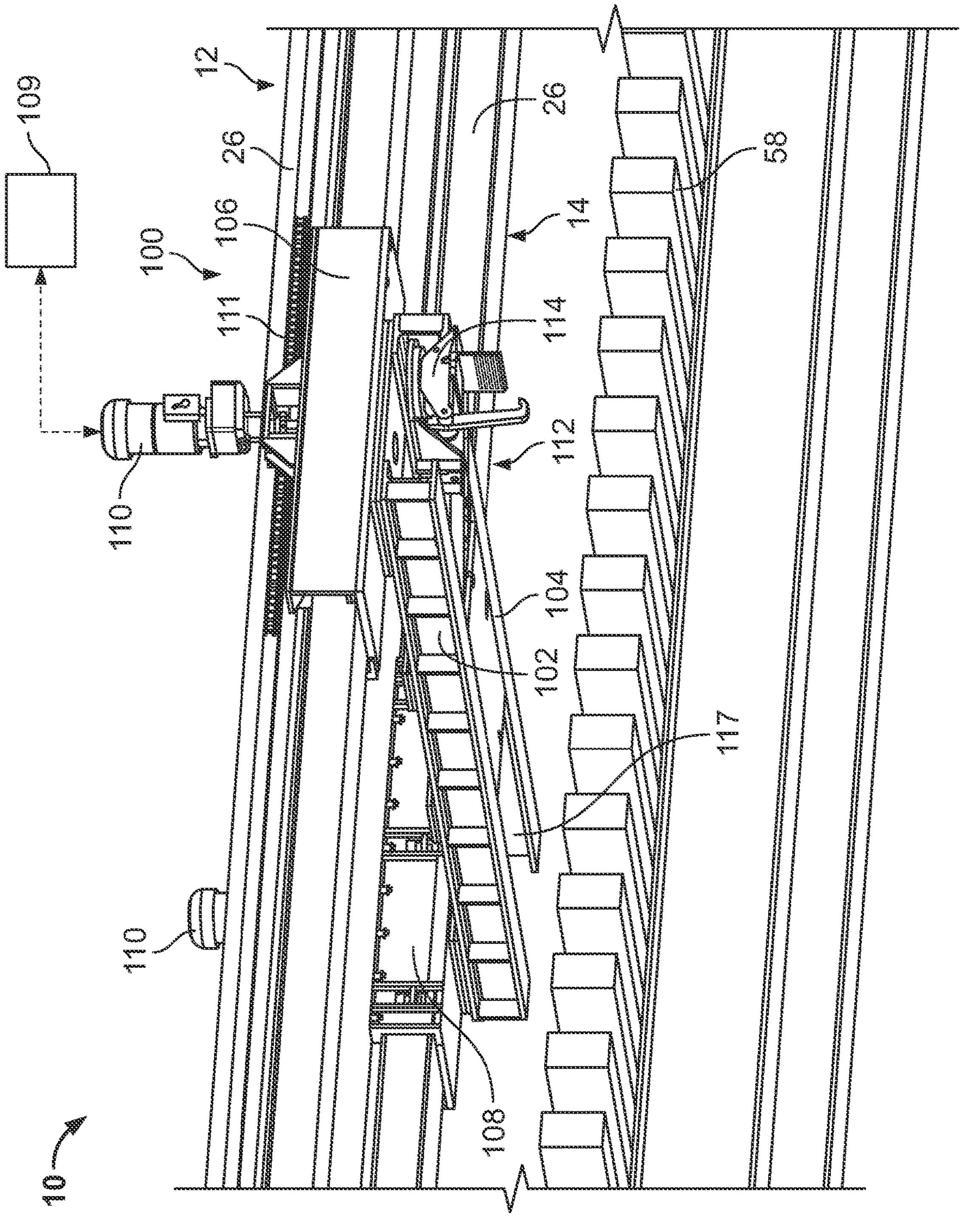
FIG. 17 is a bottom, back, right, perspective view of a lower gantry assembly of the mobile crane of FIG. 1 with a gantry support in a first position and a tie grapple clamp in a first grapple position.
Figure 18:
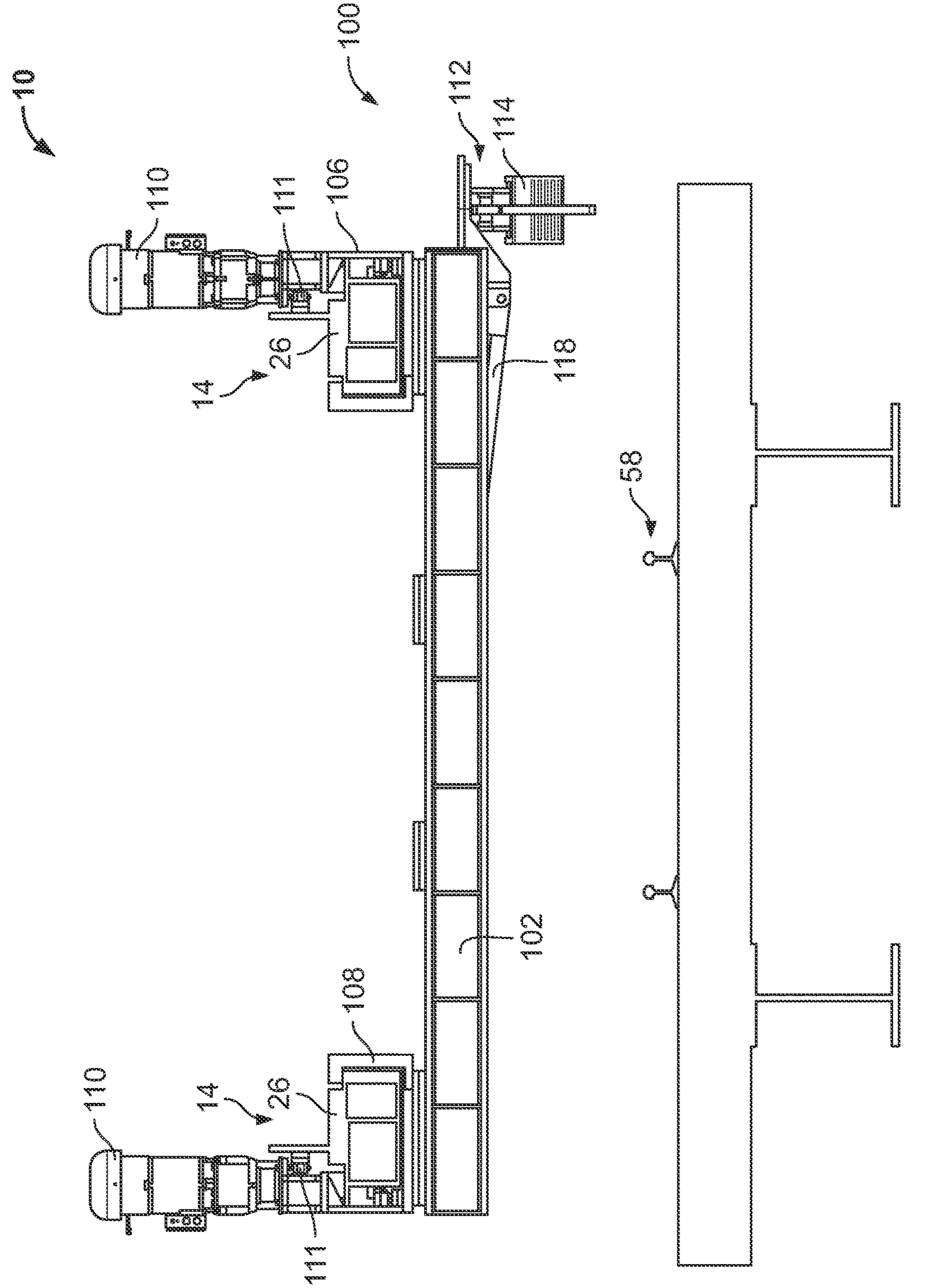
FIG. 18 is a right side view of the lower gantry assembly of FIG. 17 with the gantry support in the first position and the tie grapple clamp in the first grapple position.
Figure 19:
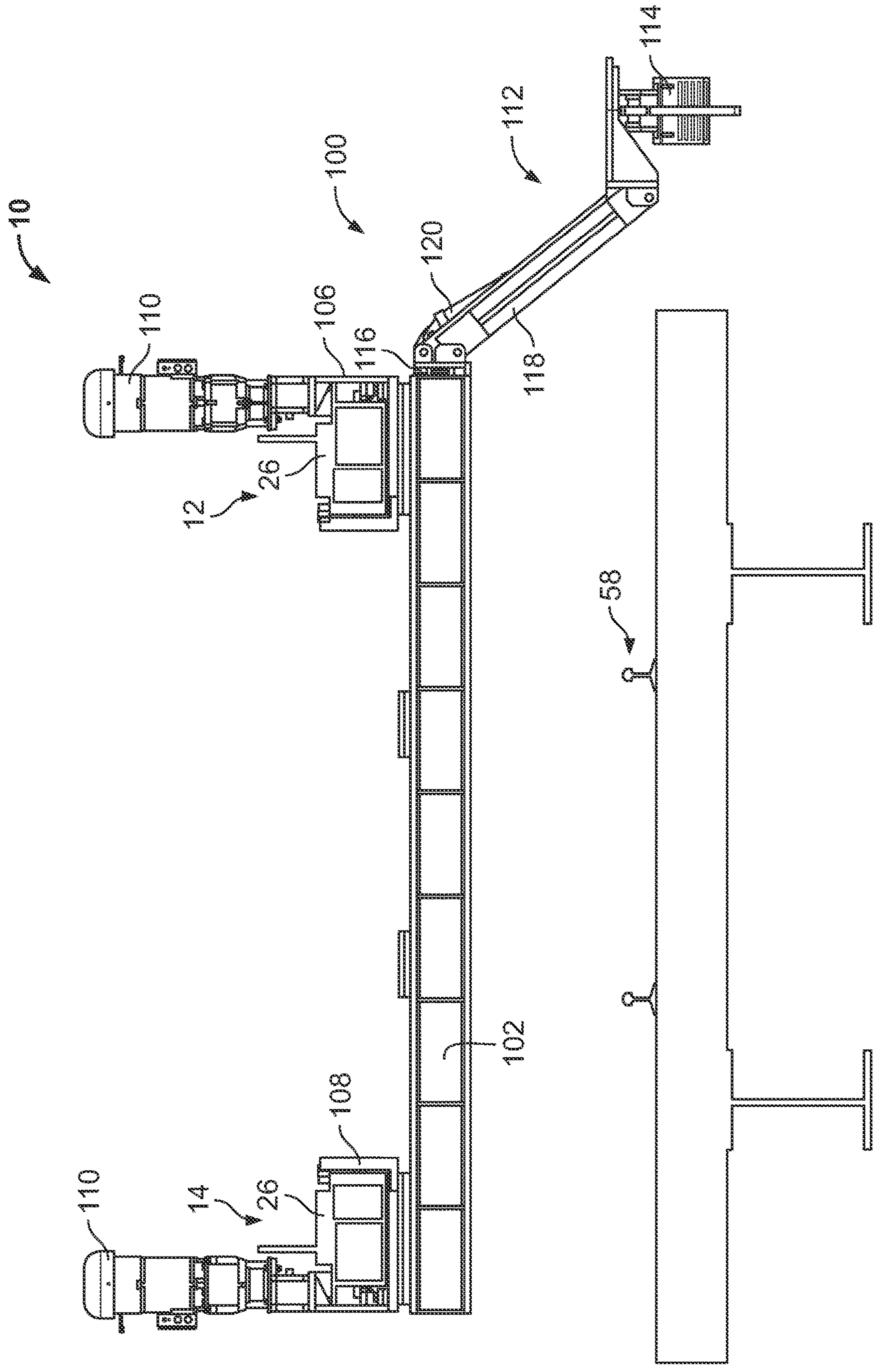
FIG. 19 is a right side view of the lower gantry assembly of FIG. 17 with the gantry support in a second position and the tie grapple clamp in a second grapple position.
Figure 20:
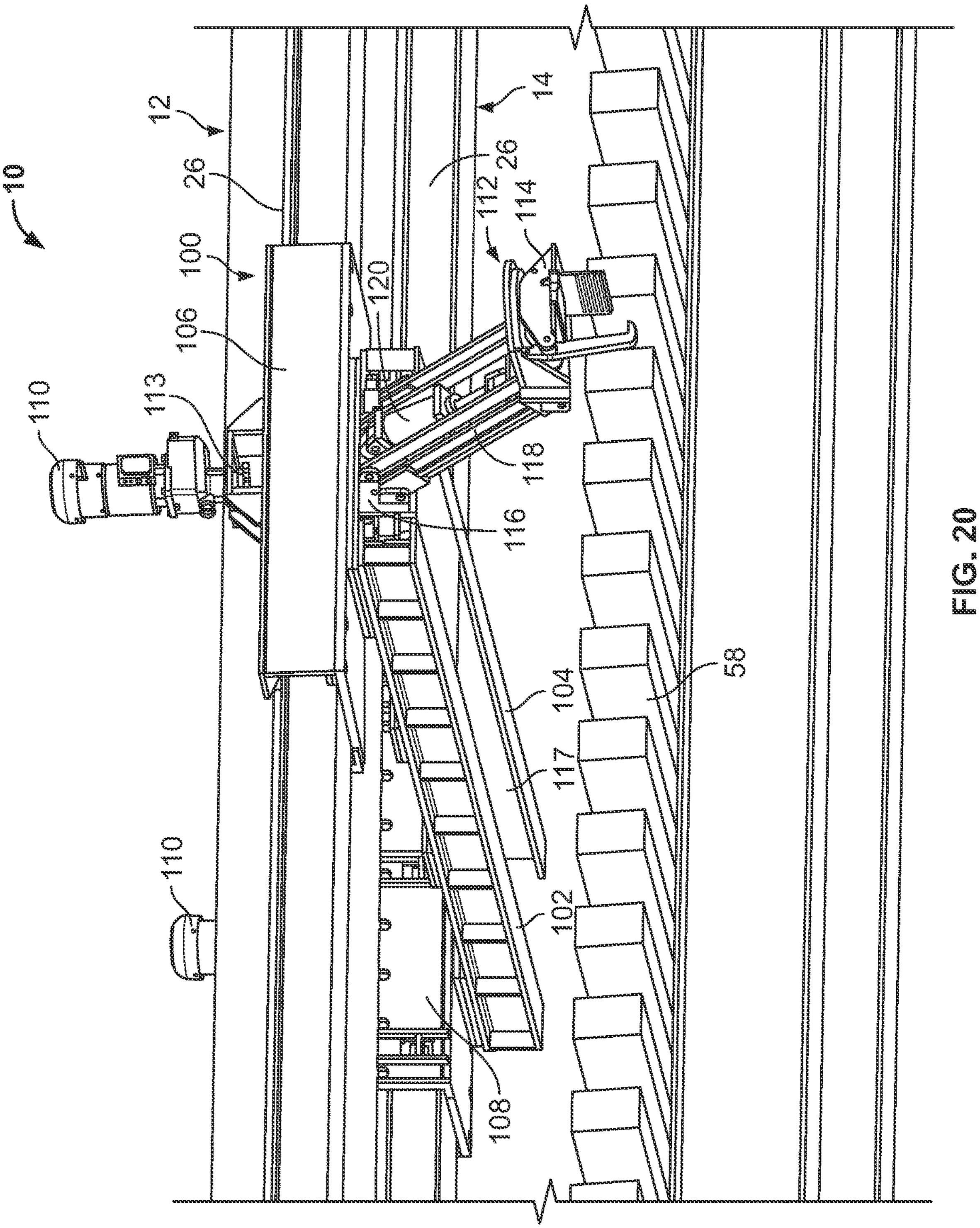
FIG. 20 is a bottom, back, right, perspective view of the lower gantry assembly of FIG. 17 with the gantry support in the second position and the tie grapple clamp in the second grapple position.
Figure 21:
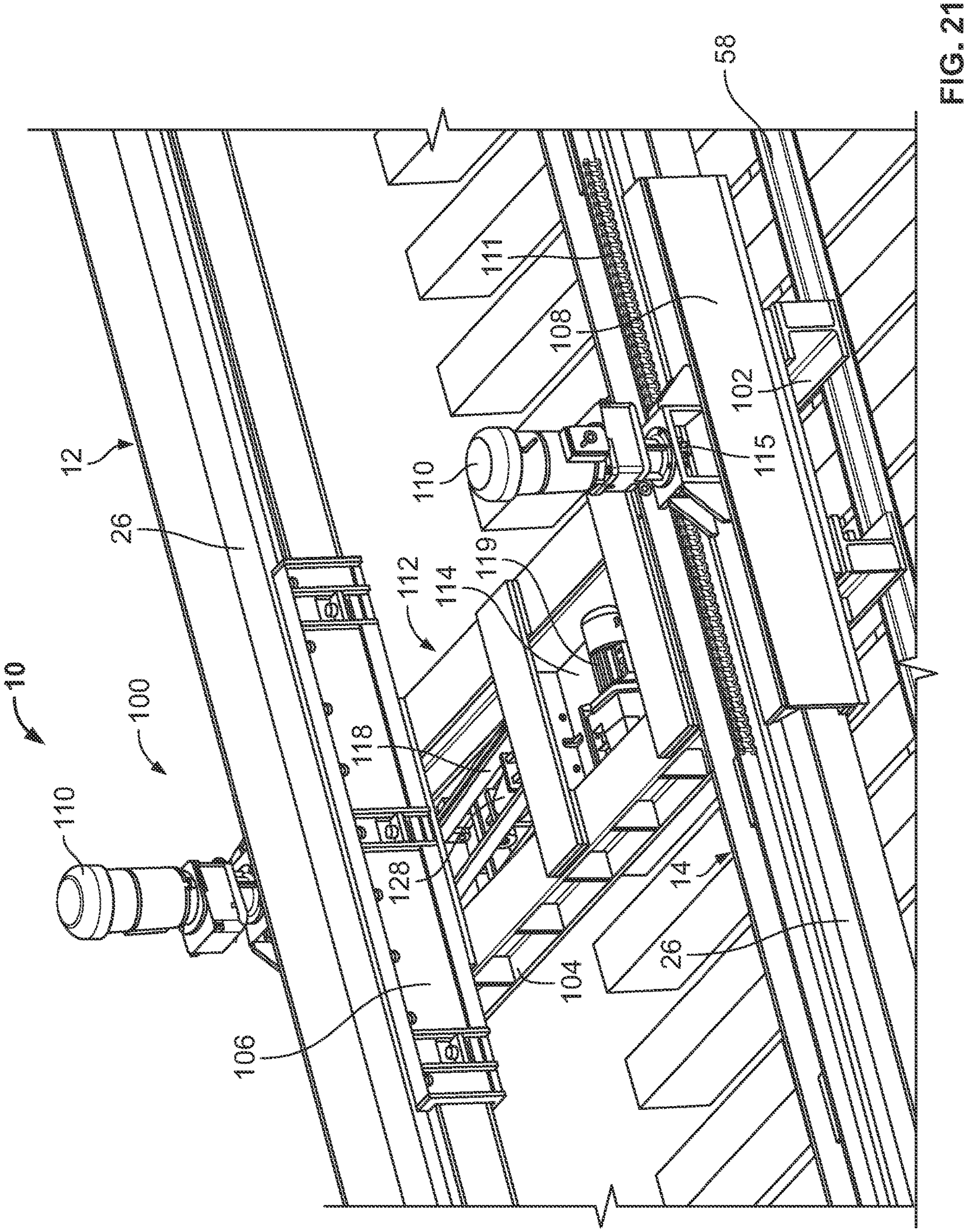
FIG. 21 is a top, front, left perspective view of the lower gantry assembly of FIG. 17 with the gantry support in the first position and the tie grapple clamp in the first grapple position.
Figure 22:
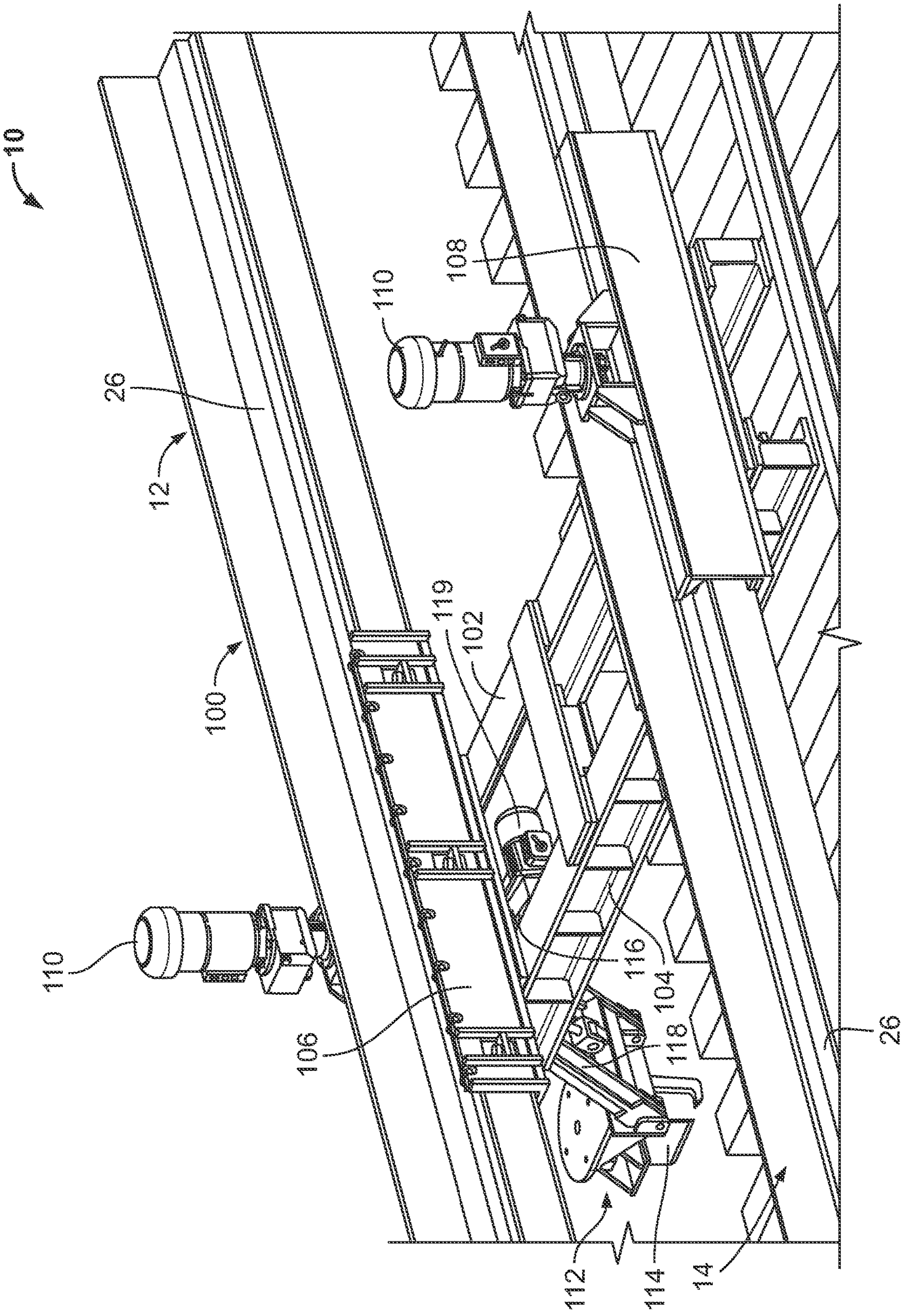
FIG. 22 is a top, front, left perspective view of the lower gantry assembly of FIG. 17 with the gantry support in the second position and the tie grapple clamp in the second grapple position.

Turning to FIGS. 16A-16E, the truss support structure 62 further includes a thrust block 64 that is configured to transfer train loads from the first and second truss assemblies 12 and 14 to the rail car bogey 52. The thrust block 64 is configured to be engaged (i.e., transfer train loads from the first and second truss assemblies 12, 14 to the rail car bogey 52) when the mobile crane 10 is in the transport configuration, as shown in FIG. 16A. The thrust block 64 can be received around a portion of the lower support beam 26, and can engage an interior support member 28 of the main truss 18. The thrust block 64 can include a base 66 coupled to the truss support structure 62. In some aspects, the base 66 is rigidly coupled to the truss support structure 62. The base 66 can contact the truss support structure 62 along multiple locations to distribute stress throughout the truss support structure 62. Braces 68 can be received upon and removably coupled to a portion of the base 66, via bolts 70, for example. In some aspects, the braces 68 straddle the lower support beam 26, and can engage a vertical interior support member 28*a*. In some embodiments, lugs 72 are coupled to the lower support beam 26 and the interior support member 28 to locate the braces 68. A bolt 74 can extend through the lugs 70 and apertures 76 formed through the brace 68 to align each brace 68 properly with the interior support member 28, base 66, and lower support beam 26. When coupled together, the rigid structure of the base 66 and braces 68 prevents longitudinal or lateral movement of the main truss 18, and transfers loading from the truss assemblies 12, 14 through to the rail car bogey 52. In this way, the mobile crane 10 is configured to act as a rail car during transport with the first and second truss assemblies 12, 14 acting as rail car sills.

As the mobile crane 10 transitions to the work configuration (i.e., the truss support beams 60 laterally translate outward), the thrust block 64 is configured to disengage. The braces 68 can be uncoupled from the base 66 and removed from the lower support beam 26 and the interior support member 28, which once again allows the truss assemblies 12, 14 to translate laterally relative to the truss support structure 62.

In some non-limiting examples, the mobile crane 10 may further include one or more additional thrust brackets 78 that are configured to engage (i.e., transfer train loads from the first and second truss assemblies 12, 14 to the rail car bogey 52) when the mobile crane 10 is in the work configuration. The thrust brackets 78 can include thrust plates 80 positioned on opposite sides of the lower support beam 26. The thrust plate 80 can be coupled to a distal end of one or more truss support beams 60, so that the thrust plate 80 travels with the truss support beams 60 as they extend outwardly away from the truss support structure 62. A wall 82 can be removably coupled to each thrust plate 80 and can extend upward around the lower support beam 26. In some aspects, the walls 82 oppose one another, and include a flange 84 that can be bolted to the thrust plates 80. In some embodiments, ribs 86 extend upward from the flange 84 to add structural support to the wall 82. The walls 82 can be coupled to the thrust plates 80 using fasteners 88, for example. In some embodiments, a plurality of apertures 90 are formed through the walls 82 to align the walls 82 with one another. Fasteners 92 can extend through the apertures 90 of each wall 82 to couple the walls 82 to one another. In some embodiments, lugs 94 extend upwardly from the lower support beam 26 and can also be used to locate and strengthen the coupling between the walls 82. For example, the lugs 94 may be used to identify the proper position of the rail car end assembly 16, 17 relative to the truss assembly 12, 14 when a fastener 92 can extend through apertures 90 in both walls and through apertures in the lugs 94 simultaneously. When the truss assembly 12, 14 is subjected to a longitudinal force or a tipping force, the truss assembly 12, 14 can transfer this force through the walls 82 and through the thrust plate 80, and through to the rail car bogey 52. In this way, the mobile crane 10 may be configured to act as a rail car and travel along a railroad track 58 in either the work or transport configurations.

With reference to FIGS. 17-22, a lower gantry assembly 100 is shown in detail. In some aspects, the mobile crane 10 includes one or more lower gantry assemblies 100 coupled to and slidably supported by the lower support beams 26 of the main trusses 18 in the first and second truss assemblies 12, 14. Although one lower gantry assembly 100 is illustrated in FIGS. 17-22, it should be understood that the mobile crane 10 may be modular and may be configured on an application-by-application basis to include a desired number of lower gantry assemblies 100 as required by a specific application or as desired.

In some non-limiting examples, the lower gantry assembly 100 includes a first gantry support beam 102 and a second gantry support beam 104 each extending between the lower support beams 26 of the first and second truss assemblies 12, 14. Opposing ends of the first and second gantry support beams 102, 104 are coupled to first and second trolleys 106, 108. For example, the opposing ends of the first and second gantry support beams 102, 104 can be mechanically fastened to the first and second trolleys 106, 108. Because the first and second trolleys 106, 108 can be formed of similar components, the following description of the first trolley 106 should also be considered a description of the second trolley 108.

The first trolley 106 can be slidably coupled to the lower support beam 26 of the first truss assembly 12. In some non-limiting examples, the first trolley 106 extends around a portion of the lower support beam 26, and is configured to move longitudinally along the lower support beam 26. In the illustrated non-limiting example, a motor 110 is coupled to the first trolley 106, which can be used to drive the trolley 106 along the lower support beam 26. The motor 110 can be placed in electrical communication with a controller 109, which can selectively actuate the motor 110 to perform various tasks when provided with local or remote commands. The motor 110 can be coupled to a chain 111 that displaces the first trolley 106 longitudinally along the lower support beam 26 in response to rotation of a drive shaft 113 of the motor 110. For example, the chain 111 can interact with the motor 110 to form a rack-and-pinion-style connection. In these aspects, the chain 111 can be rigidly coupled to the lower support beam 26 and can act as the rack that mates with a gear 115 coupled to the drive shaft 113 of the motor 110. Rotation of the drive shaft 113 and gear 115 mated with the chain 111 causes the gear 115 to travel linearly along the chain 111, thereby moving the motor 110 and first trolley 106 along the path defined by the chain, which is oriented approximately parallel to the longitudinal axis X-X of the main truss 18 in the first truss assembly 12. In this way, the motor 110 is configured to displace the first trolley 106, and thereby the lower gantry assembly 100, longitudinally along the lower support beam 26 in a desired direction. In other embodiments, the motor 110 can be replaced with a hydraulic system that can effectively translate the lower gantry system 100 about the truss assemblies 12, 14 as well.

The illustrated lower gantry assembly 100 includes a tie grapple assembly 112. It should be appreciated that a tie grapple assembly 112 is but one non-limiting example of a tool that may be coupled to the lower gantry assembly 100. The tie grapple assembly 112 includes a tie grapple clamp 114 coupled to a grapple support 116 via a linkage 118. The grapple support 116 is slidably coupled between the first and second gantry support beams 102, 104 such that the tie grapple assembly 112 is moveable between a first position (shown in FIGS. 17, 18, and 21) and a second position (shown in FIGS. 19, 20, and 22) within a channel 117 formed by the gantry support beams 102, 104. When moving between the first and the second positions, the grapple support 116 translates along the first and second gantry support beams 102, 104 in a direction transverse to the longitudinal axis X-X defined by the main trusses 18 of the first and second truss assemblies 12, 14. In this way, the grapple support 116 is configured to move the tie grapple assembly 112 outward away from the interior space 27 between the first and second truss assemblies 12, 14. In the illustrated non-limiting example, a motor 119 is coupled to the grapple support 116 to facilitate the movement (e.g., by driving the tie grapple assembly 112) between the first and second positions. In some aspects, the motor 119 can also be placed in electrical communication with the controller 109, which can similarly provide local or remote commands that can be executed by the motor 119.

The linkage 118 is pivotally coupled to the grapple support 116 and the tie grapple clamp 114. The pivotal connection between the grapple support 116 and the tie grapple clamp 114 enables the tie grapple clamp 114 to move along a vertical direction between a first grapple position (shown in FIGS. 17, 18, and 21) where the tie grapple clamp 114 is arranged adjacent to the first and second grapple support beams 102, 104, and a second grapple position (shown in FIGS. 19, 20, and 22) where the tie grapple clamp 114 is arranged adjacent to the railroad track 58. In the illustrated non-limiting example, an actuator 120 is coupled between the tie grapple clamp 114 and the grapple support 116 to facilitate the movement between the first and second grapple positions. The actuator 120 may be in the form of a piston-cylinder actuator that may be driven pneumatically, hydraulically, or electrically. In some aspects, the actuator 120 can also be placed in electrical communication with the controller 109, which can provide local or remote commands that can be executed by the actuator 120. In some aspects, an operator can provide electrical instructions to the actuator 120 to transition the tie grapple clamp 114 between the first grapple position and the second grapple position.

In operation, the lower gantry assembly 100 may be used in conjunction with one or more of the upper gantry assemblies 30*a*, 30*b*, 30*c*. For example, the lower gantry assembly 100 and one or more upper gantry assemblies 30*a*, 30*b*, 30*c* can both be used to replace railroad ties along a railroad track 58. The upper gantry assemblies 30*a*, 30*b*, 30*c* may be used to lift the railroad track 58 while the lower gantry assembly 100 maneuvers to remove an old railroad tie and install a new railroad tie. Since the mobile crane 10 is operational as a rail car, the mobile crane 10 may sequentially replace railroad ties and move along the railroad track, thereby increasing productivity and reducing the time required to perform the railroad tie replacement operation. As will be appreciated by one of skill in the art, the modularity defined by the mobile crane 10 enables the mobile crane 10 to be tailored to specific applications by varying the number and configuration of the upper and lower gantry assemblies 30*a*, 30*b*, 30*c* and 100.

Figure 23:
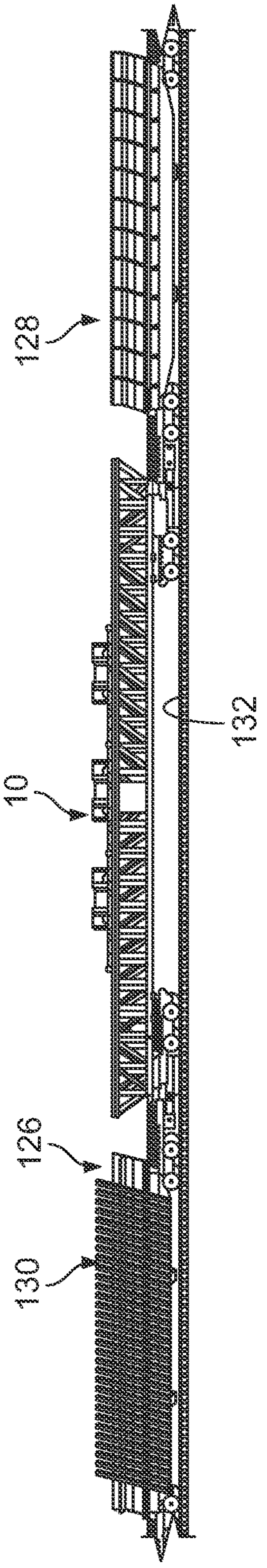
FIG. 23 is a front view of the mobile crane of FIG. 1 transporting new railroad track panels with a front and rear tilt car to a work area.
Figure 24:
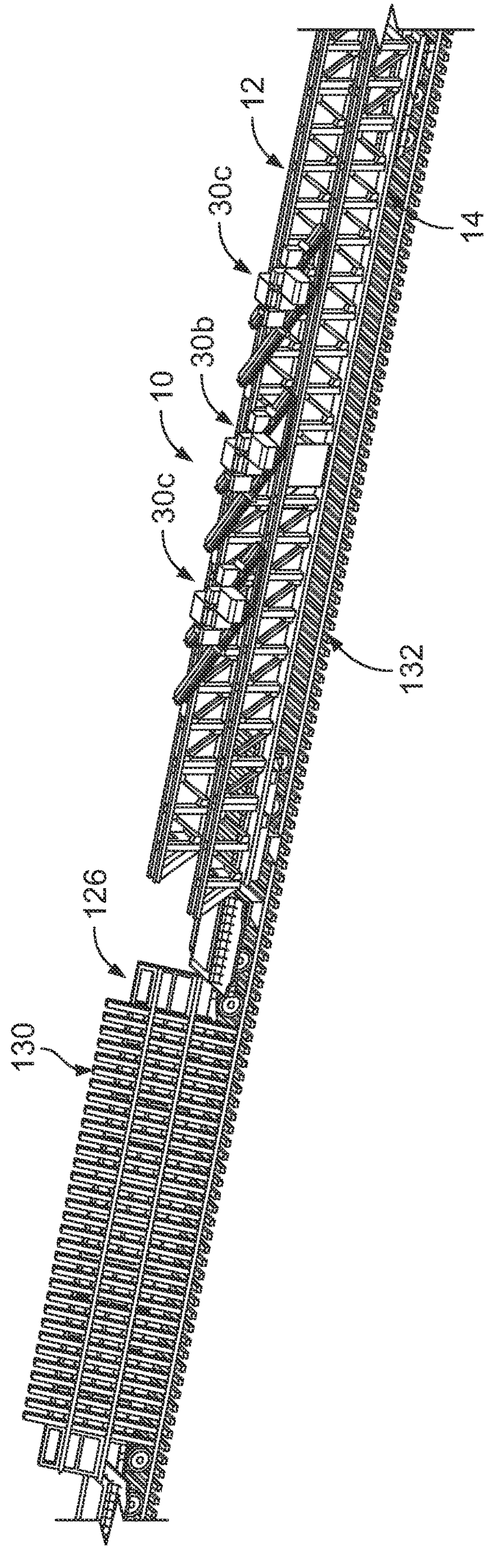
FIG. 24 is a top, front, right perspective view of the mobile crane of FIG. 23.

One non-limiting example of installing new railroad track panels using the mobile crane 10 is shown and described with reference to FIGS. 23-29. As illustrated in FIGS. 23 and 24, the mobile crane 10 may be in the transportation configuration initially, which allows the mobile crane 10 to be transported to a work area. In some examples of the disclosed method, the mobile crane 10 can be transported (in the transportation configuration, for example) as a rail car traveling between two tilt cars 126, 128. The front tilt car 126 may be preloaded with a plurality of new railroad track/switch panels 130 for installation on a railroad track 132. The rear tilt car 128 may be configured to receive old railroad track/switch panels, once removed by the mobile crane 10. It should be understood that although only one front tilt car 126 and one rear tilt car 128 are illustrated, the mobile crane 10 may be transported to a work area with a plurality of front tilt cars 126 and/or a plurality of rear work cars 128.

Figure 25:
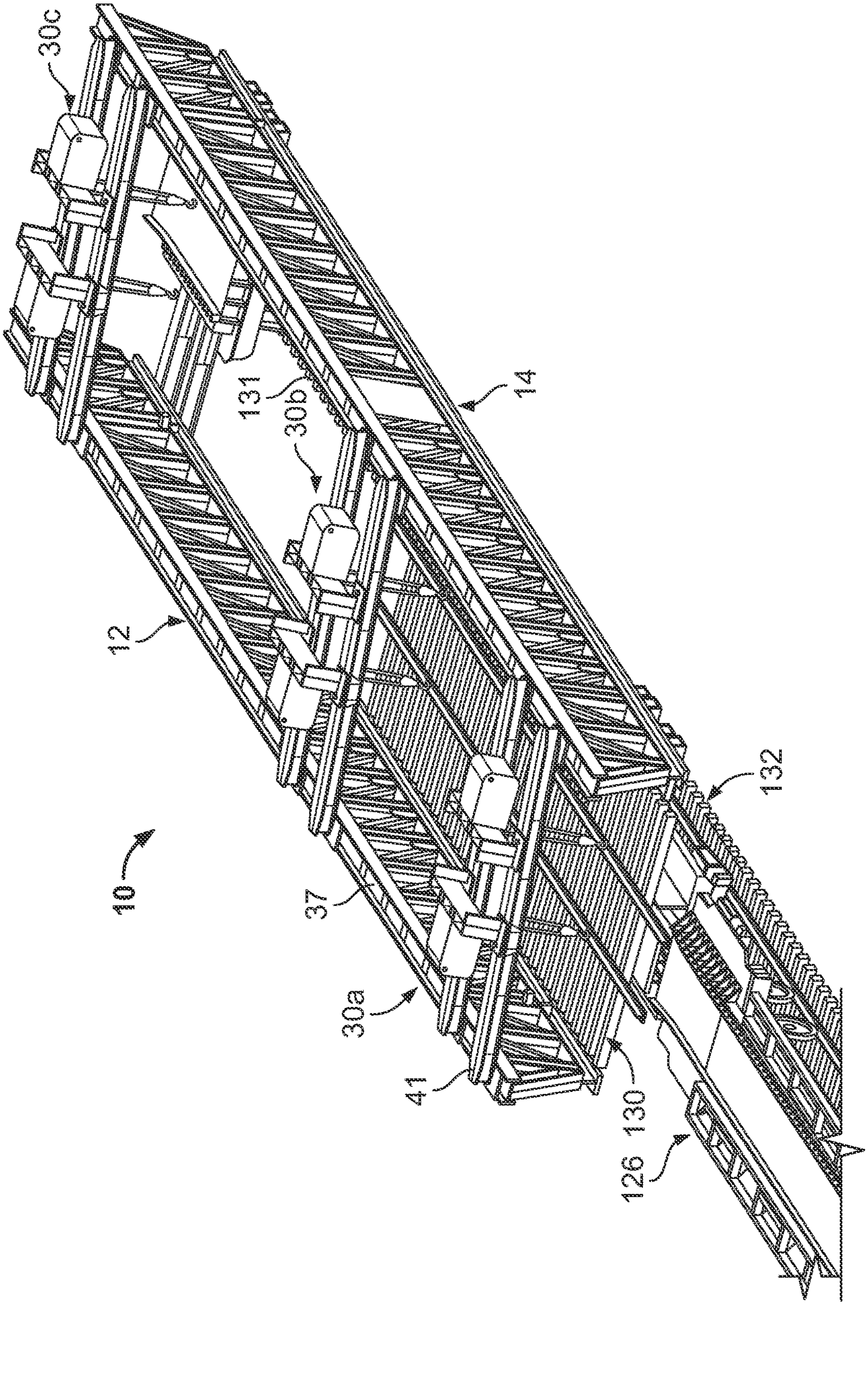
FIG. 25 is a top, front, left perspective view of the mobile crane of FIG. 23 lifting a new railroad track panel.
Figure 26:
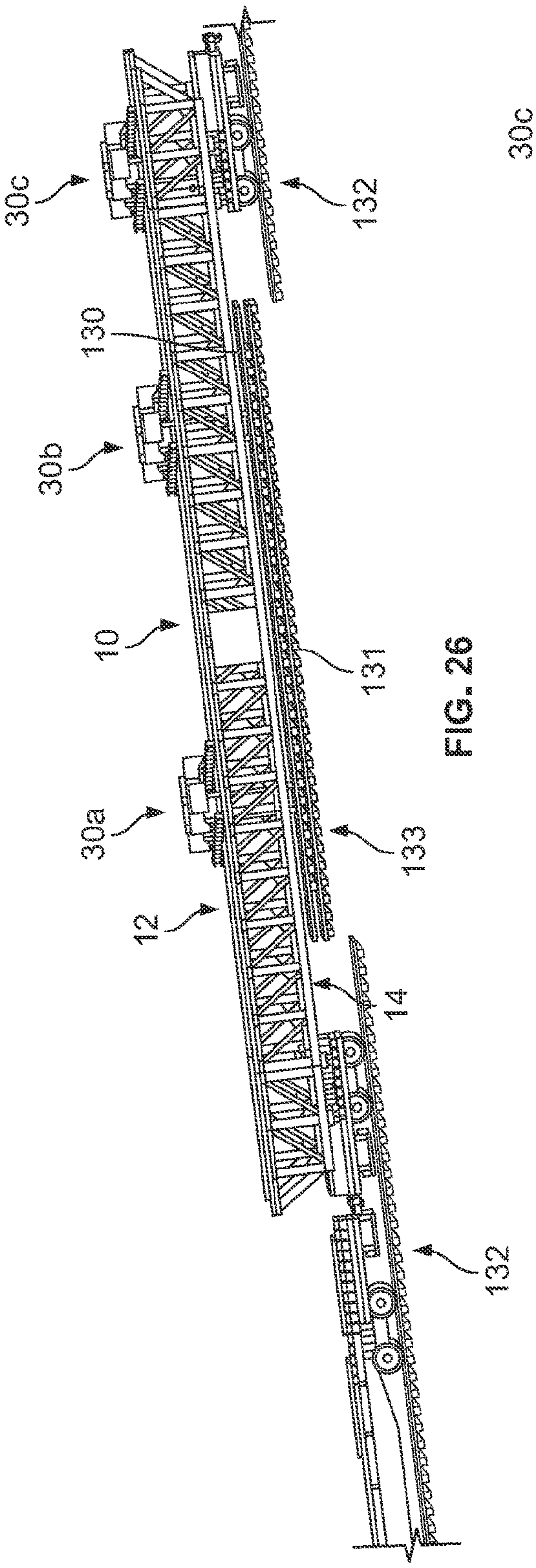
FIG. 26 is a front view of the mobile crane of FIG. 23 lifting a new railroad track panel and an old railroad track panel.
Figure 27:
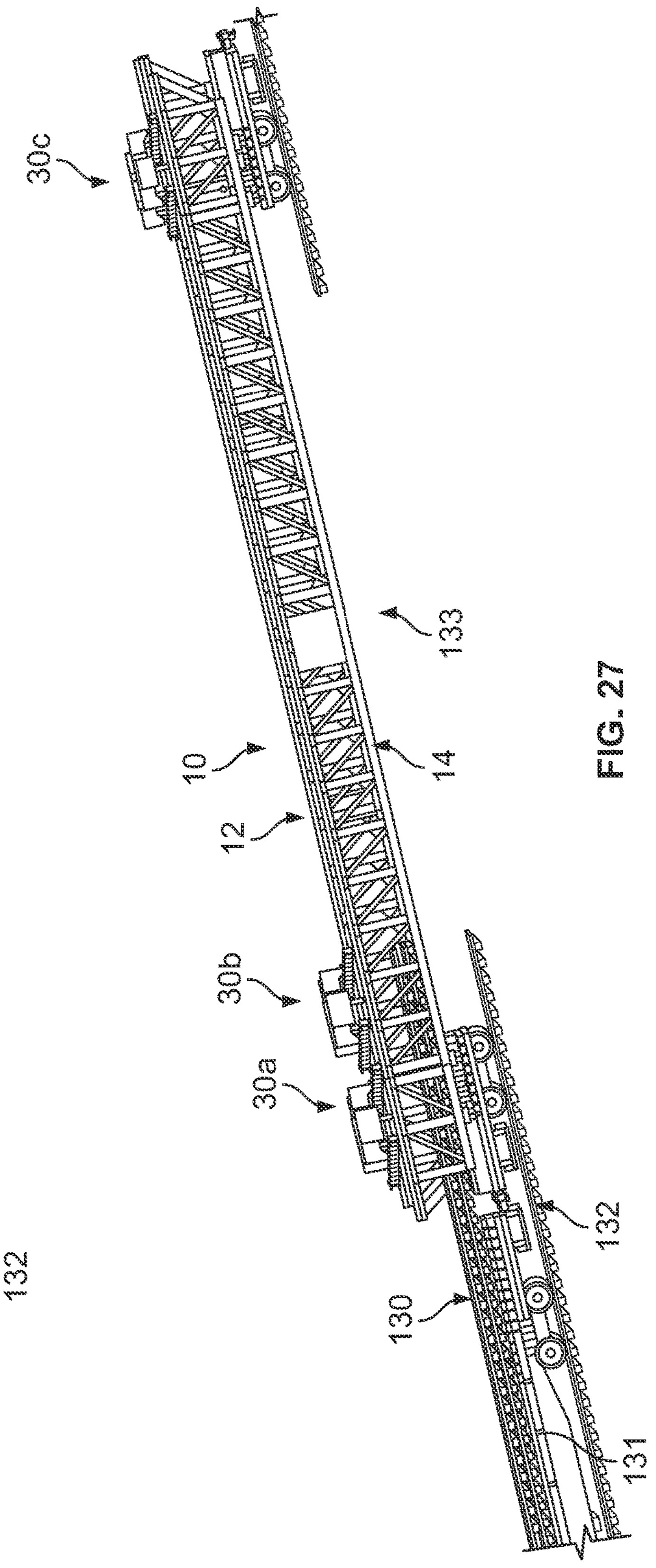
FIG. 27 is a front view of the mobile crane of FIG. 23 placing the new and old railroad track panels onto the rear tilt car.
Figure 28:
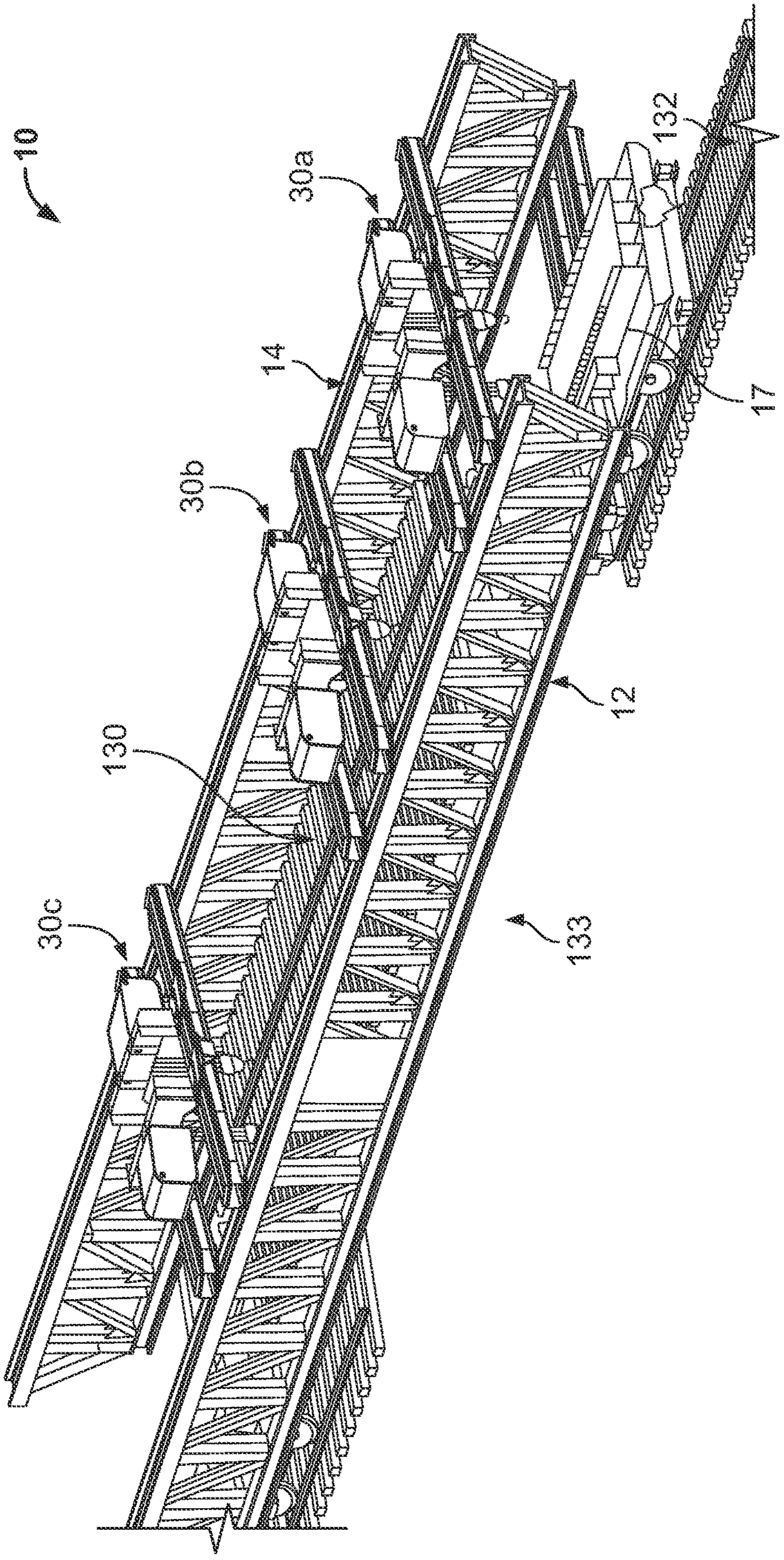
FIG. 28 is a top, front, right perspective view of the mobile crane of FIG. 23 installing the new railroad track panel.
Figure 29:
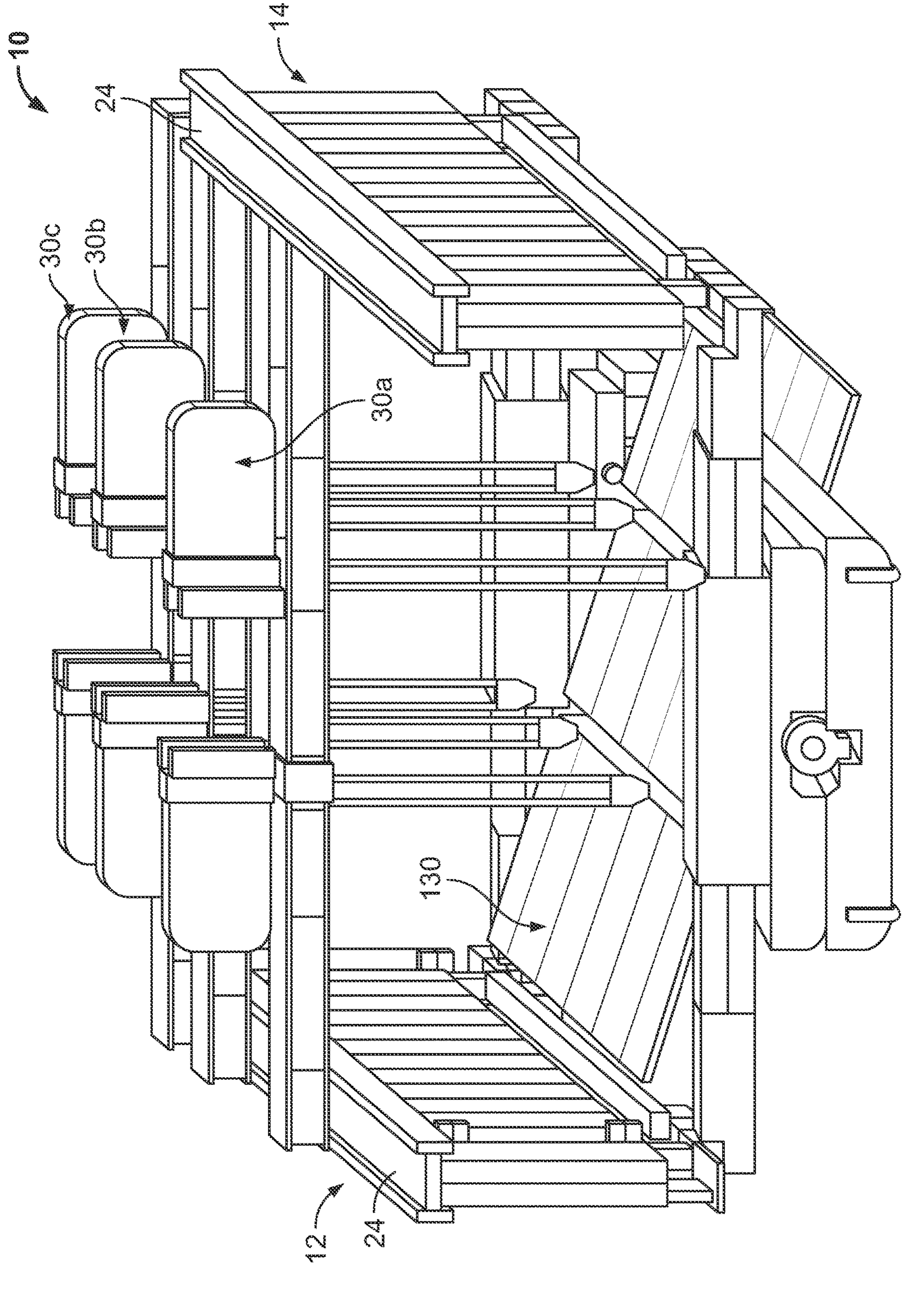
FIG. 29 is a right perspective view of the mobile crane of FIG. 28 tilting the new railroad track panel during installation.

Once the mobile crane 10 reaches the work area, the mobile crane 10 may transition to the work configuration and one or more of the upper gantry assemblies 30*a*, 30*b*, 30*c* may be used to lift a new railroad track panel 130 off of the front tilt car 126, as shown in FIG. 25. In some examples, four hoists 42 are used to support the new railroad track panel 130 and the upper gantry assemblies 30*a*, 30*b*, 30*c* may be moved longitudinally along the first and second truss assemblies 12 and 14 until the new railroad track panel 130 is aligned over the old railroad track panel 131. The new railroad track panel 130 can then be lowered over the old railroad track panel 131, and the hoists 42 can be removed from the new railroad track panel 130. The hoists 42 can then be positioned underneath the old railroad track panel 131, where they may then be used to lift both the new and old railroad track panels simultaneously, as shown in FIG. 26, to create a rail gap 133 within the railroad track. The upper gantry assemblies 30*a*, 30*b*, 30*c* may be displaced along the first and second truss assemblies 12, 14 toward the rear tilt car 128, as shown in FIG. 27, where the hoists 42 can be removed. With the old and new railroad track panels 131, 130 on the rear tilt car 128, the new railroad track panel 130 may be rolled off the old railroad track panel 131 and then the new railroad track panel 130 may be lifted again via the hoists 42 of the upper gantry assemblies 30*a*, 30*b*, 30*c*, as shown in FIG. 28. From this position, the new railroad track panel 130 may be lowered/tilted into place and installed, as shown in FIG. 29. Once installation of the new railroad track panel 130 is completed, the mobile crane 10 can be returned to the transportation configuration, and can be moved away from the job site. The design and configuration of the mobile crane 10 enables new railroad track panels to be delivered and installed at a work area in limited time and space.

In addition to replacing an entire railroad track panel 131, the mobile crane 10 can also be used to exchange bridge ties, as illustrated in FIGS. 30-33. In some aspects, a combination of the upper gantry assemblies 30*a*, 30*b*, 30*c* and the lower gantry assembly 100 is used during a bridge tie exchange process. Although the following description is provided to demonstrate a bridge tie exchange process, one of ordinary skill in the art will understand that the design and properties of the mobile crane 10 and the lower gantry assembly 100 may also be used to perform a railroad tie exchange process.

Figure 30:
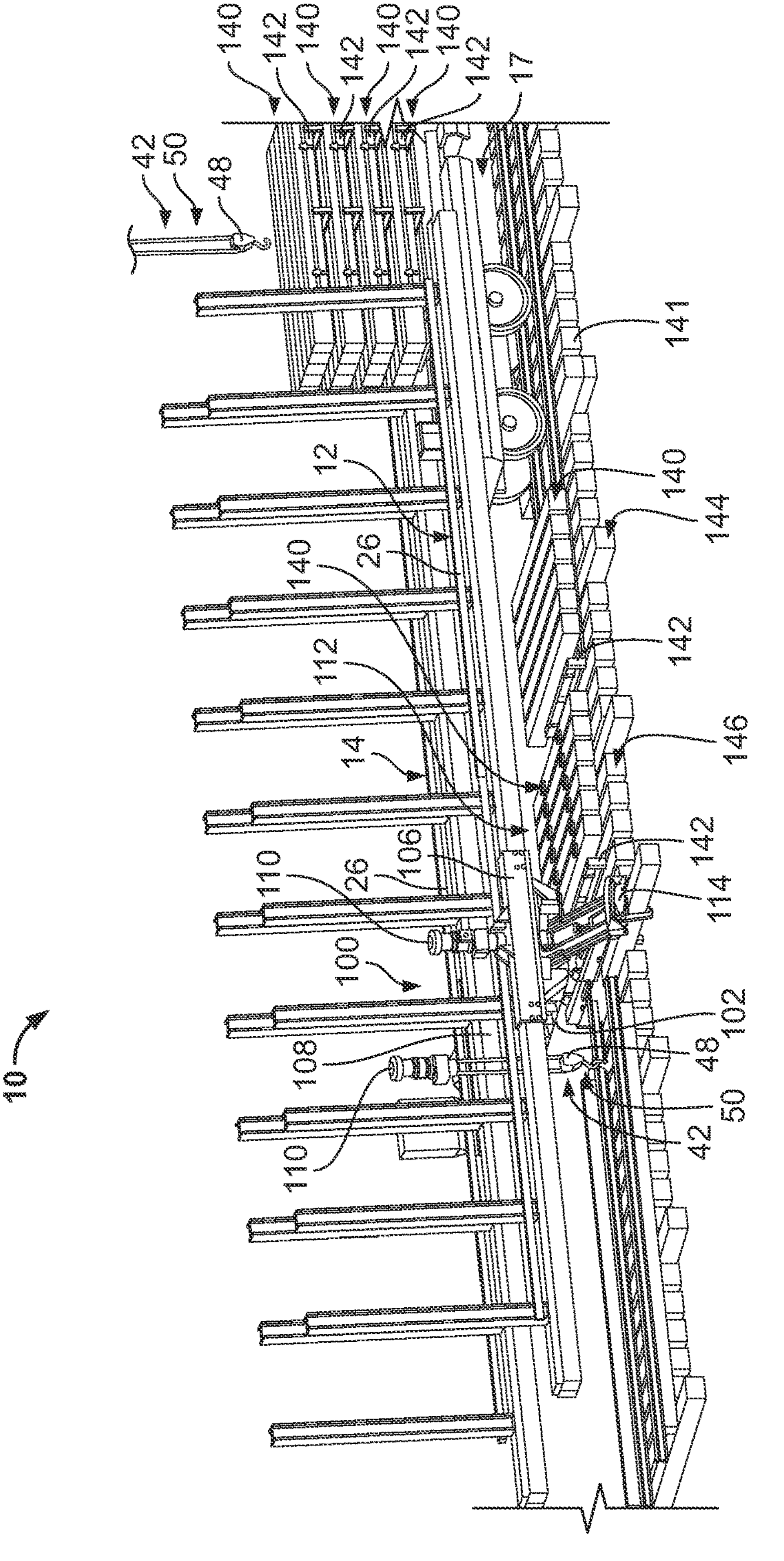
FIG. 30 is a partial top, back, right perspective view of the mobile crane of FIG. 1, including the lower gantry assembly of FIG. 17, during a bridge tie exchange process.
Figure 31:
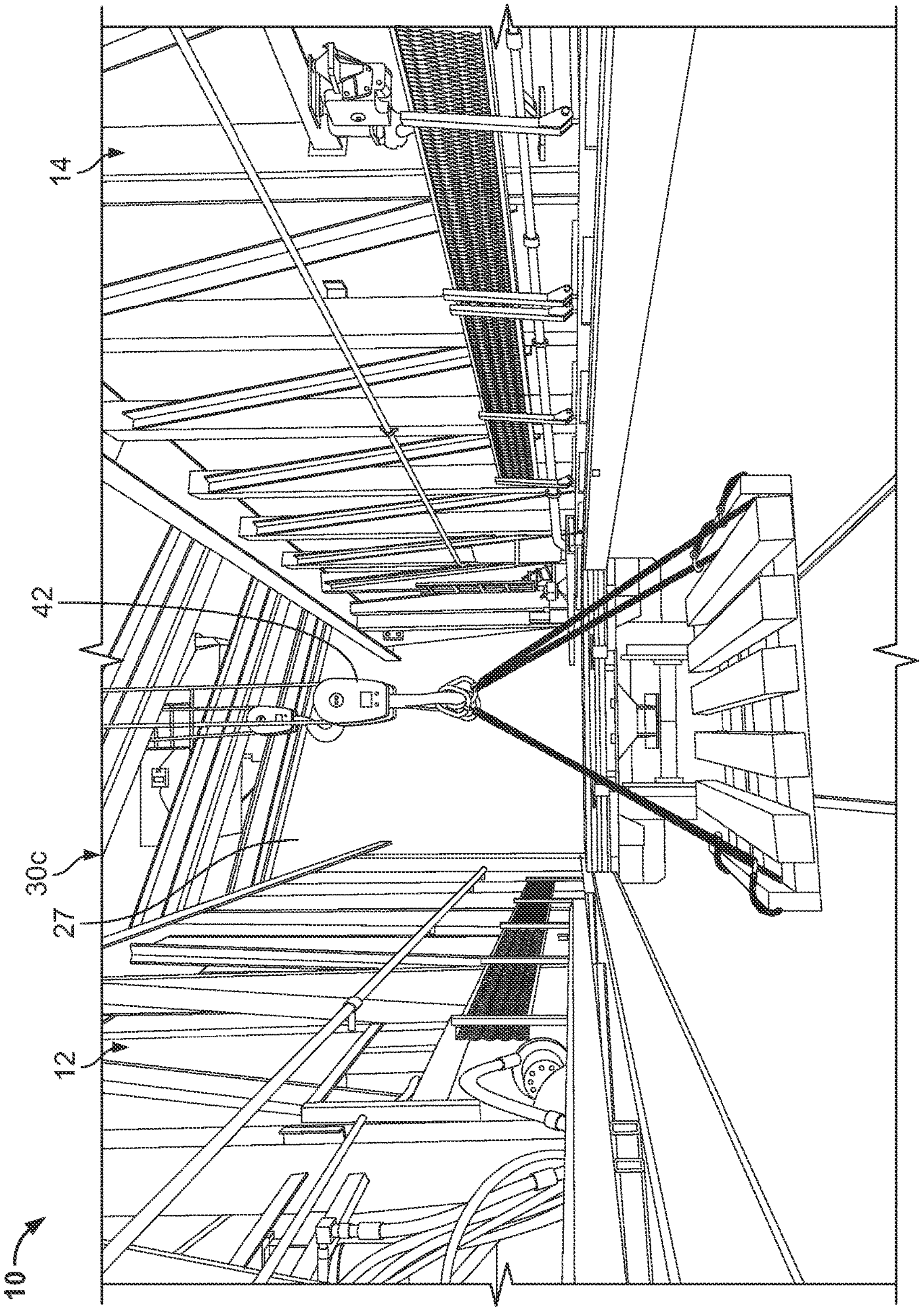
FIG. 31 is an inside view of the mobile crane of FIG. 1, including the lower gantry assembly of FIG. 17, during a bridge tie exchange process with a hoist supporting a rack of bridge ties.
Figure 32:
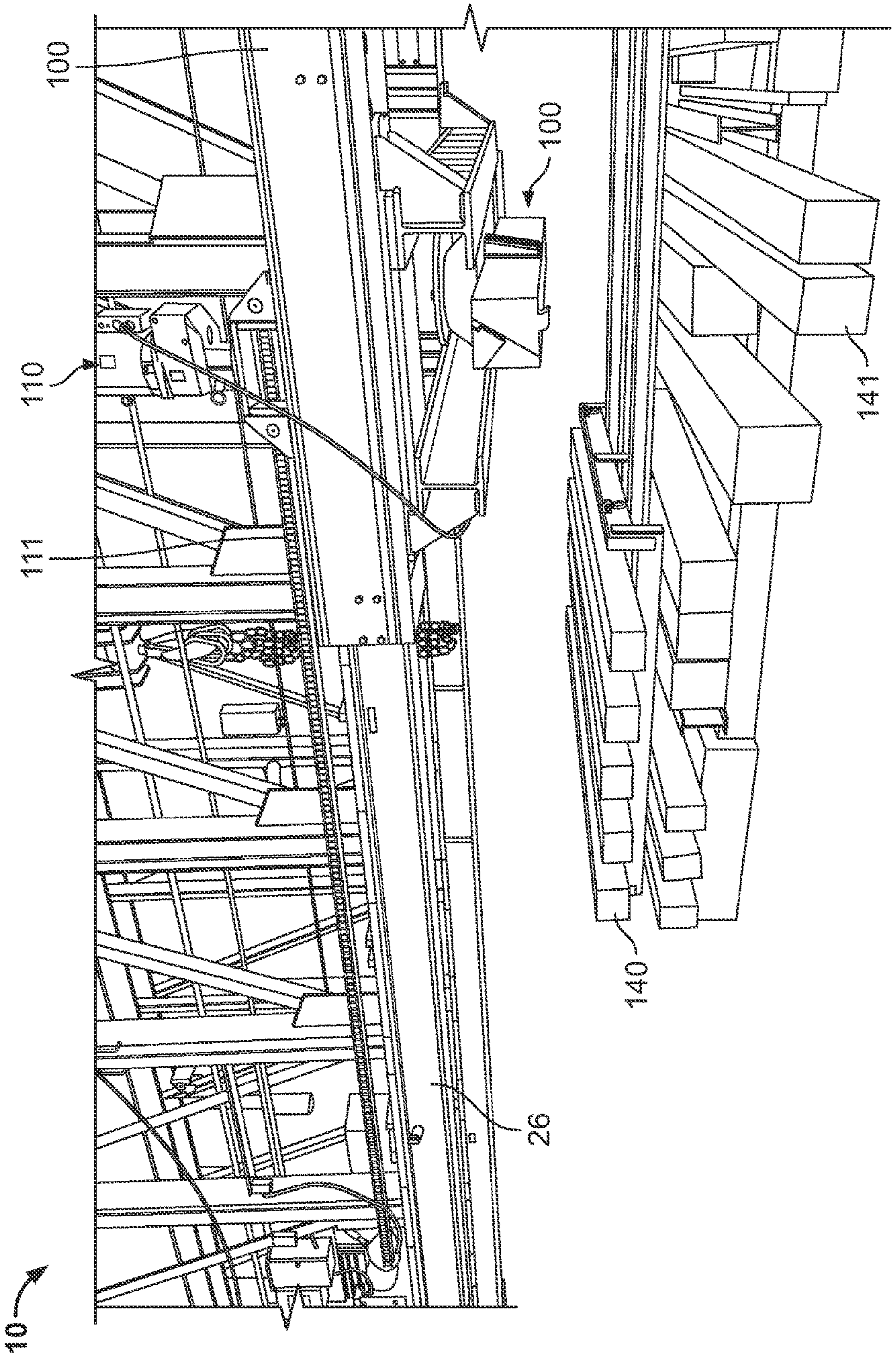
FIG. 32 is a partial, bottom, front, right perspective view of the mobile crane of FIG. 1, including the lower gantry assembly of FIG. 17, during a bridge tie exchange process.
Figure 33:
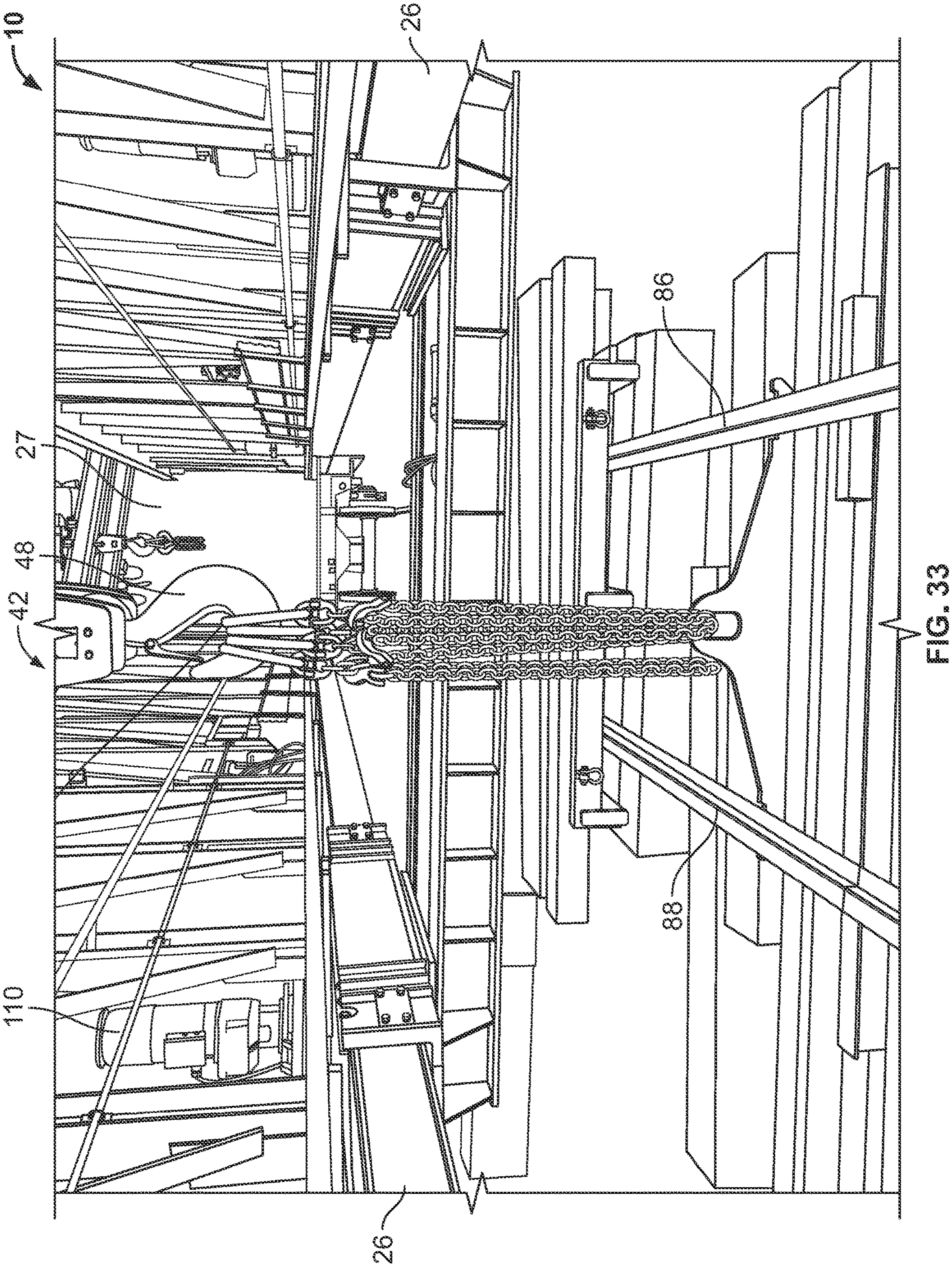
FIG. 33 is an inside view of the mobile crane of FIG. 1 including the lower gantry assembly of FIG. 17 during a bridge tie exchange process.

As shown in FIG. 30, the second rail car end assembly 17 may support a plurality of new bridge ties 140 stacked upon racks 142. As will be described, the design and properties of the mobile crane 10 enable an assembly line to be created that facilitates the preparation and installation of new bridge ties 140 and the removal of the old bridge ties 141.

The plurality of racked bridge ties 140 may be provided to the second rail car end assembly 17, for example, by a mule cart (not shown). It should be appreciated that although the bridge tie exchange process is described with the new racked bridge ties 140 on the second rail car end assembly 17, the symmetry defined by the mobile crane 10 enables the process to start with the new racked bridge ties 140 provided by a mule cart to the first rail car end assembly 16.

Once the racked bridge ties 140 are provided to the second rail car end assembly 17, one of the hoists 42 may be used to lift one rack 142 from the stack of new bridge ties 140 and move it to a drill and lag plate area 144, by translating one of the upper gantry assemblies 30*a*, 30*b*, 30*c* along truss assemblies 12, 14. The drill and lag plate area 144 may be arranged between the first and second rail car end assemblies 16, 17, as the design of the mobile crane 10 enables work to flow throughout the interior space 27.

In the drill and lag plate area 144, a user may drill any necessary holes for the lag bolts or plate ties that are required for assembling the plurality of new bridge ties 140 to the bridge and tracks 86 and 88. Once the rack 142 of the plurality of new bridge ties 140 has been sufficiently prepped in the drill and lag plate area 144, the rack 142 of the plurality of new bridge ties 140 may be moved via one of the hoists 42 to a plate tie area 146. The plate tie area 146 may be arranged downstream (i.e., toward the first rail car end assembly 16) of the drill and lag plate area 144. Once in the plate tie area 146, one or more plated ties (e.g., e-clips, baseplates, fast clips, tension clamps, etc.) may be installed onto each of the plurality of new bridge ties 140 in the rack 142, thereby completing the preparation for the plurality of new bridge ties 140 for installation.

With the rack 142 of new bridge ties 140 prepped at the plate tie area 146, the lower gantry assembly 100 may be used to remove an old bridge tie 141. The lower gantry assembly 100 can first be moved along the lower support beam 26 toward the old bridge tie 141 to be removed. Once the lower gantry assembly 100 is positioned above the old bridge tie 141, the actuator 120 can be actuated to transition the tie grapple assembly 112 from the first grapple position to the second grapple position, where the tie grapple clamp 114 can engage the old bridge tie 141. The motor 119 can be actuated to move the tie grapple assembly 112 outward, thereby removing the old bridge tie 141 from beneath the tracks 86, 88. The removed old bridge tie 141 may be placed on the rack 142 and one of the plurality of new bridge ties 140 on the rack 142 may be grabbed by the tie grapple clamp 114 and installed under the tracks 86, 88.

As is known in the art, the tracks 86, 88 should be lifted slightly to facilitate the removal and installation of bridge ties. The mobile crane 10 is equipped to both support and move the racks 142 of new bridge ties 140, as necessary, using one of the hoists 42, and lift and support the tracks 86, 88 during bridge tie exchange using another one of the hoists 42. Once all of the new bridge ties 140 on the rack 142 have been installed and the rack 142 is full of old bridge ties, the rack 142 may be moved via one of the hoists 42 to the first rail car end assembly 16, where a mule cart (not shown) can transport it to a desired location. The above-described process may be repeated, as necessary, until all of the required new bridge ties 140 are installed. It should be appreciated that the above-described process does not need to be carried out in discrete steps and, for example, may include one or more steps performed simultaneously.

This bridge tie exchange process facilitated by the design and properties of the mobile crane 10 significantly improves the efficiency at which bridge ties may be exchanged. For example, the mobile crane 10 may facilitate 25 or more bridge ties to be replaced in an hour. Further, since the mobile crane 10 may be modular and may be configured on an application-by-application basis to include a desired number of upper gantry assemblies 30*a*, 30*b*, 30*c* and a desired number of lower gantry assemblies 100, the bridge tie exchange process may be streamlined. For example, one rack 142 of the plurality of new bridge ties 140 may be prepped at the drill and lag plate area 144 while, substantially simultaneously, another rack 142 of the plurality of new bridge ties 140 are prepped at the plate tie area 146 and/or the old bridge ties may be removed from the tracks 86, 88. Thus, the design and properties of the mobile crane 10 streamline the bridge tie exchange process thereby enabling an end user to more efficiently and more timely remove old bridge ties and install new bridge ties.

Figure 34:
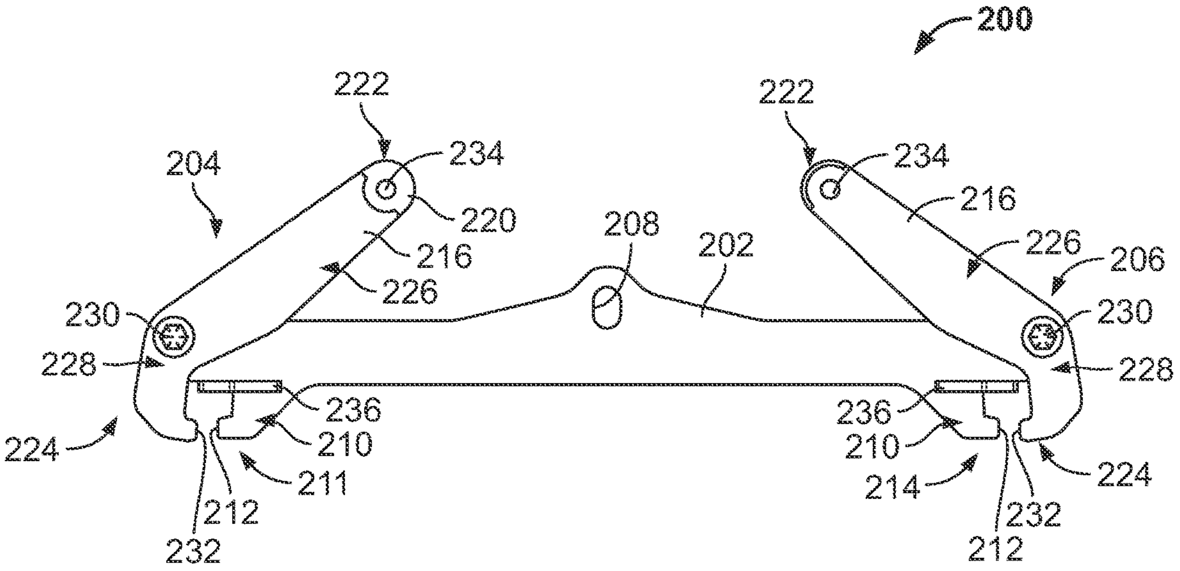
FIG. 34 is a front view of a rail support structure according to one aspect of the present disclosure.

FIG. 34 illustrates a rail support structure 200 according to one aspect of the present disclosure. The rail support structure 200 may be utilized, for example, by the mobile crane 10 to selectively provide support to or lift rails 86, 88 on a track (e.g., railroad tracks or bridge tracks). Generally, the rail support structure 200 may be selectively engaged with a pair of tracks 86, 88 and may be selectively movable between an unlocked and a locked position. Movement between the unlocked and the locked positions may be governed, for example, by operation of one or more of the hoists 42 of the mobile crane 10. For example, the hoist 42 may be selectively coupled to at least a portion of the rail support structure 200 and, when at least a portion of the rail support structure 200 is lifted, the rail support structure 200 may lock to a pair of rails 86, 88 on a track. Once in the locked position, the rail support structure 200 may be lifted, via the hoist 42, for example, to enable a tie replacement procedure to take place. It should be appreciated that the rail support structure 200 is not limited to use only with the mobile crane 10 and, in other non-limiting examples, may be utilized with another crane or hoist structure.

Figure 35:
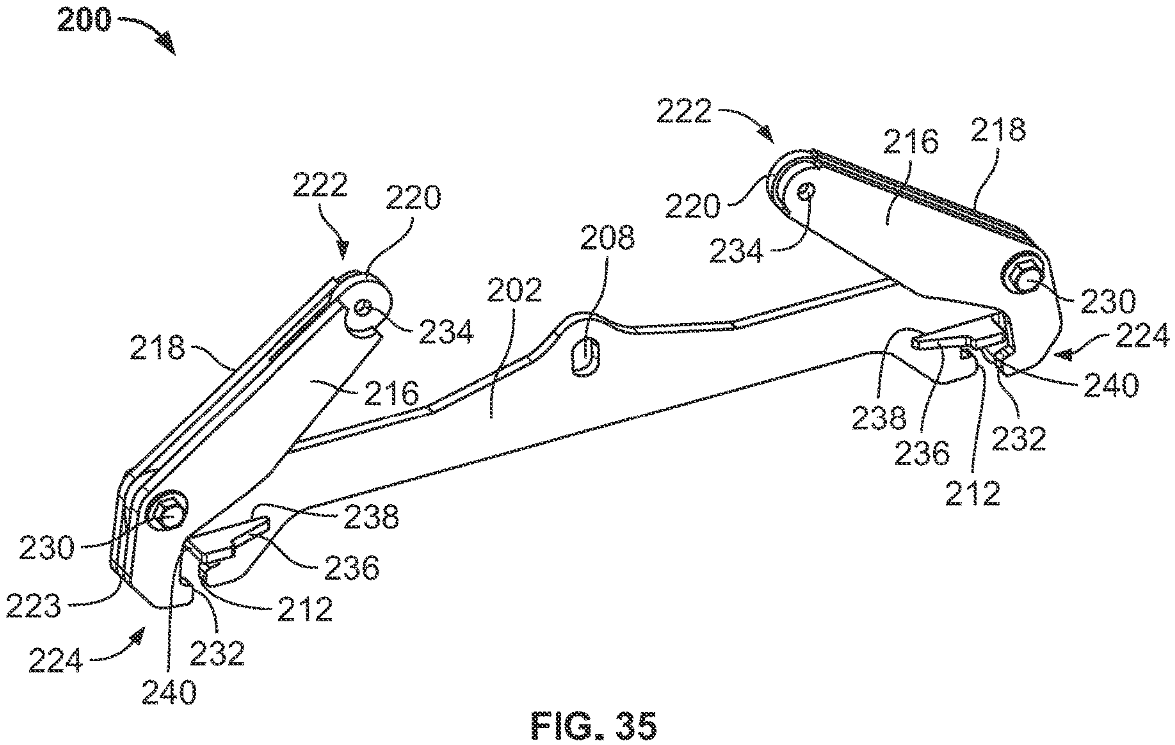
FIG. 35 is a top, front, left perspective view of the rail support structure of FIG. 34.
Figure 36:
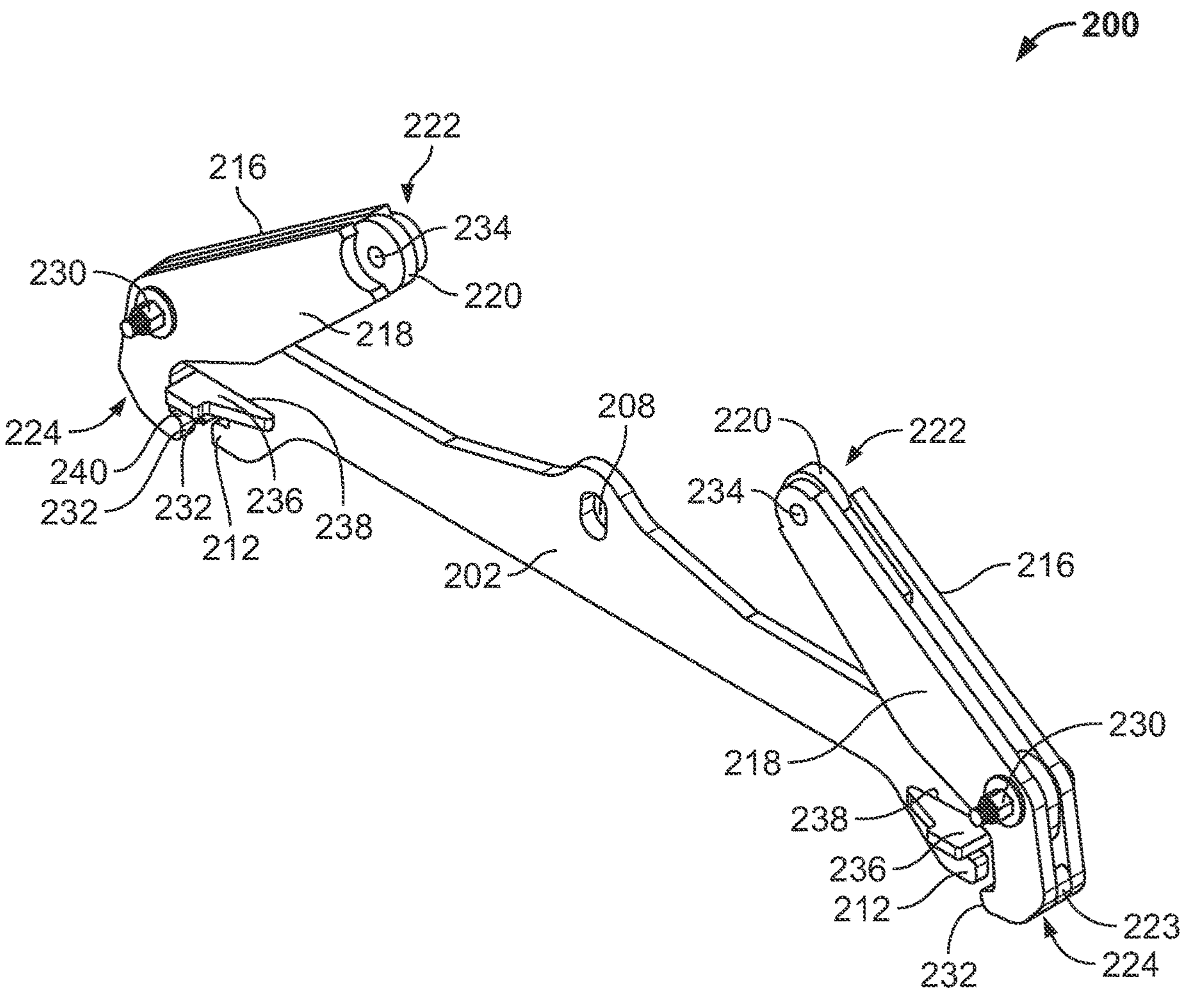
FIG. 36 is a top, back, left perspective view of the rail support structure of FIG. 34.

With specific reference to FIGS. 34-36, the illustrated rail support structure 200 includes a main beam 202, a first clamp 204, and a second clamp 206. The main beam 202 may include a positioning aperture 208 arranged generally along a centerline of the main beam 202. In some non-limiting examples, the positioning aperture 208 may be coupled to one of the hoists 42 and, when the rail support structure 200 is unlocked, be leveraged to translate the rail support structure 200 along a pair of rails. Alternatively or additionally, the positioning aperture 208 may provide another location at which one of the hoists 42 may be coupled to provide support or lift a pair of rails. In some aspects, the positioning aperture 208 is defined by an elongated shape.

The main beam 202 includes a pair of main rail portions 210 arranged at opposing ends thereof. That is, one of the main rail portions 210 is arranged adjacent to a first end 211 of the main beam 202 and another of the main rail portions 210 is arranged adjacent to a second end 214 of the main beam 202 opposite to the first end 211. The main rail portions 210 may be formed integrally with the main beam 202 and may extend downward (from the perspective of FIG. 34) to a main rail finger 212 arranged at a distal end thereof. The main rail fingers 212 are dimensioned to be at least partially received by and engage a respective rail. For example, when the rail support structure 200 is installed between a pair of rails, the main rail fingers 212 may be received within a web of a respective rail (i.e., an inner surface of a rail between a head and a foot of the rail). The main beam 202 may be designed such that a distance between the main rail fingers 212 corresponds with a distance between a pair of rails between which the main beam 202 may be installed. A profile defined by the main rail fingers 212 may be configured to conform to a corresponding profile defined by the web of the rail. That is, a shape defined by the ends of the main rail fingers 212 may be designed to conform to a variety of different rail profiles, as desired. For example, the main beam 202 may be designed to engage standard gauge rail or four foot six inch track gauge.

The first clamp 204 is pivotally coupled to the first end 212 of the main beam 202, and the second clamp 206 is pivotally coupled to the second end 214 of the main beam 202. In general, the first clamp 204 and the second clamp 206 may include similar components. Therefore, the following description of the first clamp 204 also applies to the second clamp 206, with similar components identified using like reference numerals. The first clamp 204 includes a first clamp beam 216 and a second clamp beam 218 that are spaced apart by a primary spacer 220 at a lifting end 222 of the first clamp 204 and a secondary spacer 223 at a clamping end 224 of the first clamp 204. The first and second clamp beams 216 and 218 each include a lever portion 226 and a rail clamp portion 228. The lever portions 226 extend from the lifting end 222 to a pivot aperture in a direction generally laterally inward toward the positioning aperture 208. The pivot apertures in the first and second clamp beams 216 and 218 may be arranged at a junction between the lever portion 226 and the rail clamp portion 228. A fastening element 230 may extend through the pivot aperture in the first and second clamp beams 216 and 218 and the main beam 202 to pivotally couple the first clamp 204 to the main beam 202. In the illustrated non-limiting example, the fastening element 230 may be in the form of a bolt and nut.

The rail clamp portions 228 of the first and second clamp beams 216, 218 may extend between the pivot apertures and the clamping end 224. Each of the rail clamp portions 228 includes a clamp rail finger 232 arranged at the clamping end 224. The clamp rail fingers 232 may be spaced apart, via the primary and secondary spacers 220 and 223, such that a corresponding one of the main rail fingers 212 may be generally aligned between the clamp rail fingers 232. The clamp rail fingers 232 are dimensioned to be at least partially received by and selectively engage a respective rail. For example, when the rail support structure 200 is installed between a pair of rails, the clamp rail fingers 232 may be received within a web of a respective rail (i.e., an outer surface of a rail between a head and a foot of the rail). A profile defined by the clamp rail fingers 232 may be similar to the profile of the main rail fingers 212. That is, the profile defined by the clamp rail fingers 232 may be configured to conform to a corresponding profile defined by the web of the rail. A shape defined by the ends of the clamp rail fingers 232 may be designed to conform to a variety of different rail profiles, as desired.

A lifting aperture 234 may extend through the lifting end 222 of the first clamp 204 (e.g., through the first and second clamp beams 216, 218 and the primary spacer 220). The lifting apertures 234 may enable the rail support structure 200 to be selectively coupled to, for example, one or more hoists 42 of the mobile crane 10. Generally, in operation, the hoist 42 may be coupled to the lifting apertures 234, for example via a chain and linkage mechanism, and the hoist 42 may raise and lower the lifting ends 222 of the first and second clamps 204, 206. Due to the pivotal coupling between the first and second clamps 204, 206 to the main beam 202, the raising and lowering of the lifting ends 222 may cause the clamping ends 224 (and, in particular, the rail clamp fingers 232) to engage and disengage a pair of rails to transition the rail support structure 200 between the locked position and the unlocked position.

A pair of anti-tipping plates 236 may be provided to structurally support the rail support structure 200 and generally inhibit the rail support structure 200 from tipping over when installed onto a pair of rails. Specifically, the anti-tipping plates 236 may provide structural support in a direction parallel to the rails to prevent the rail support structure 200 from tipping onto the rails. In the illustrated non-limiting example, the anti-tipping plates 236 each include a slot 238 to enable the anti-tipping plates 236 to slide onto at least a portion of a corresponding one of the main rail portions 210 of the main beam 202. When installed, the anti-tipping plates 236 may be spaced from the main rail fingers 212 to enable a rail to be arranged therebetween, with the anti-tipping plate 236 engaged with a top of the rail. The anti-tipping plates 236 each include a support surface 240 that, when installed, extends in a direction parallel to and along the rails to provide structural support to the rail support structure 200.

Figure 37:
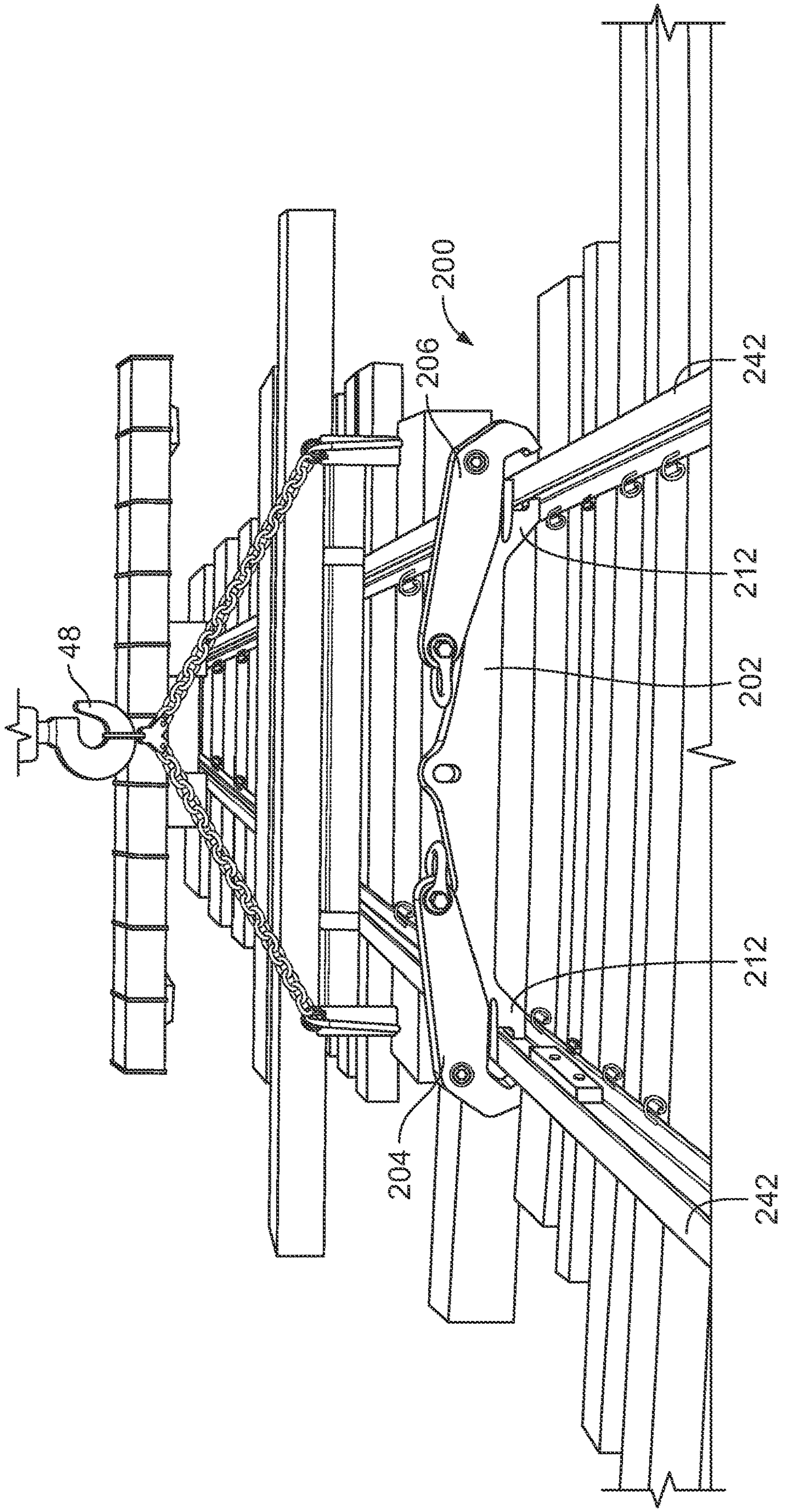
FIG. 37 is a front view of the rail support structure of FIG. 34 installed on a track and in an unlocked position.

One non-limiting example of operation of the rail support structure 200 will be described with reference to FIGS. 34-39. In some non-limiting examples, the rail support structure 200 may be used in combination with the mobile crane 10 to lift a pair of rails to perform a process that requires or improves from the rails being lifted (e.g., replacing railroad/bridge ties). For example, as illustrated in FIG. 37, the rail support structure 200 may initially be installed between a pair of rails 242. To install the rail support structure 200 between the rails 242, the rail support structure 200 may initially be arranged between the rails 242 at an angle and then turned to be arranged substantially perpendicular to the rails 242. Once arranged substantially perpendicular to the rails 242, the main rail fingers 212 may be at least partially received within and engaged with an inner surface of the rails 242 (e.g., the inner web). In this state, the rail support structure 200 may be unlocked from the rails 242 and the rail support structure 200 may be translated along the rails 242 to a desired location therealong.

Figure 38:
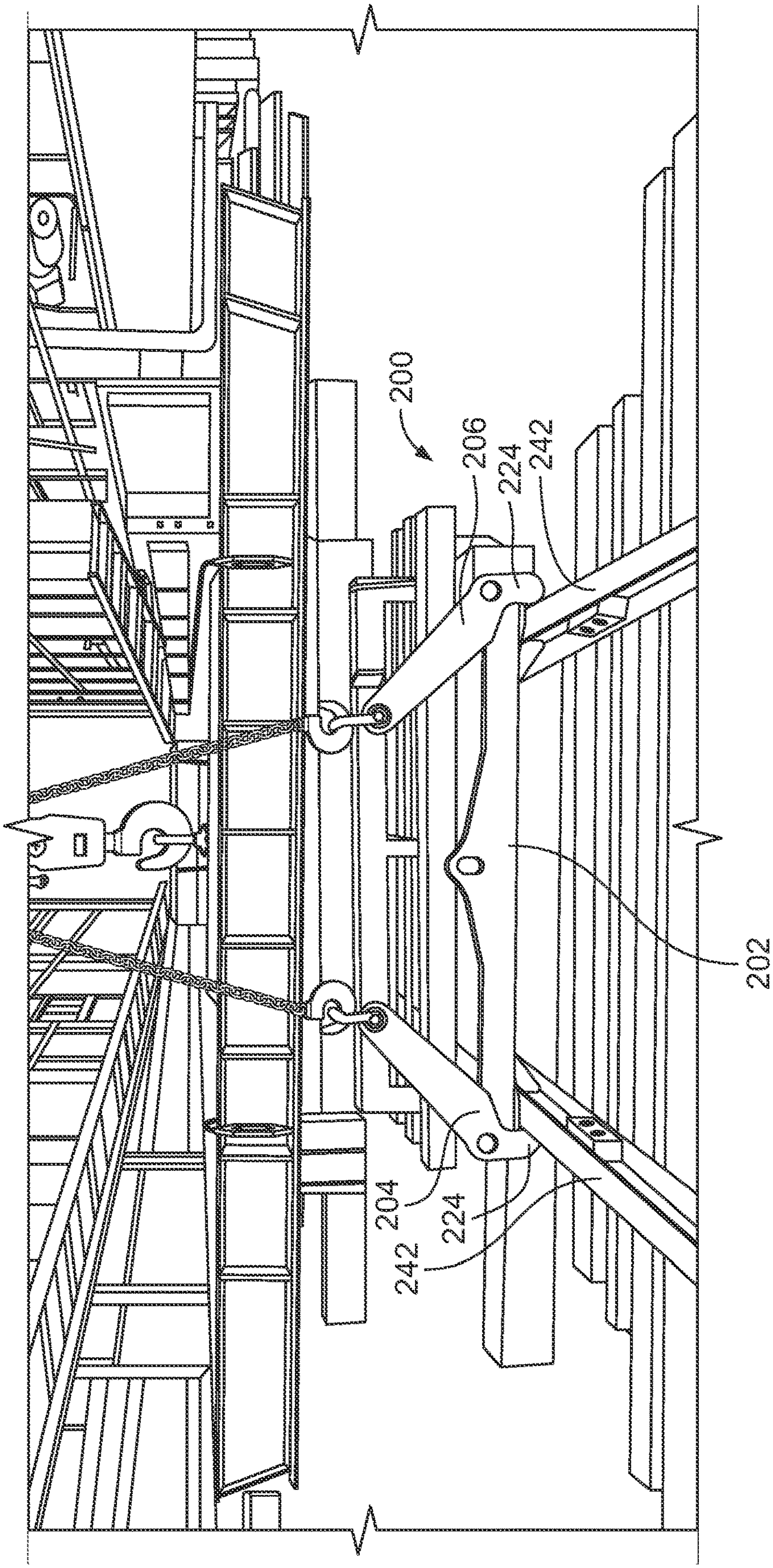
FIG. 38 is a front view of the rail support structure of FIG. 34 installed on a track and in a locked position during a tie exchange process, with a tie in a first position.

Once the rail support structure 200 is arranged at a desired location along the rails 242, one or more of the hoists 42 of the mobile crane 10 may be coupled to the rail support structure 200 via the lifting apertures 234. To transition the rail support structure 200 from the unlocked position, where it may be translated along the rails 242, to the locked position, where it is locked to the rails 242 and may support and/or lift the rails 242, the hoist 42 may lift the lifting ends 222 of the first and second clamps 204, 206, as illustrated in FIG. 38. Due to the pivotal coupling of the first and second clamps 204, 206 to the main beam 202, the lifting of the lifting ends 222 may pivot the clamping ends 224 into engagement with an outer surface of the rails 242. Specifically, the clamp rail fingers 232 may be pivotally forced into engagement with the rails 242. Thus, with the lifting ends 222 lifted up by the hoist 42, the main rail fingers 212 and the clamp rail fingers 232 may be tightened to opposing sides of each rail 242 thereby enabling the rail support structure 200 to support and/or lift the rails 242, as desired. The pivotal motion of the first and second clamps 204, 206 relative to the main beam 202 allows the rail support structure 200 to gauge the rails 242 to the standardized gauging of the rails 242 it is used on.

Figure 39:
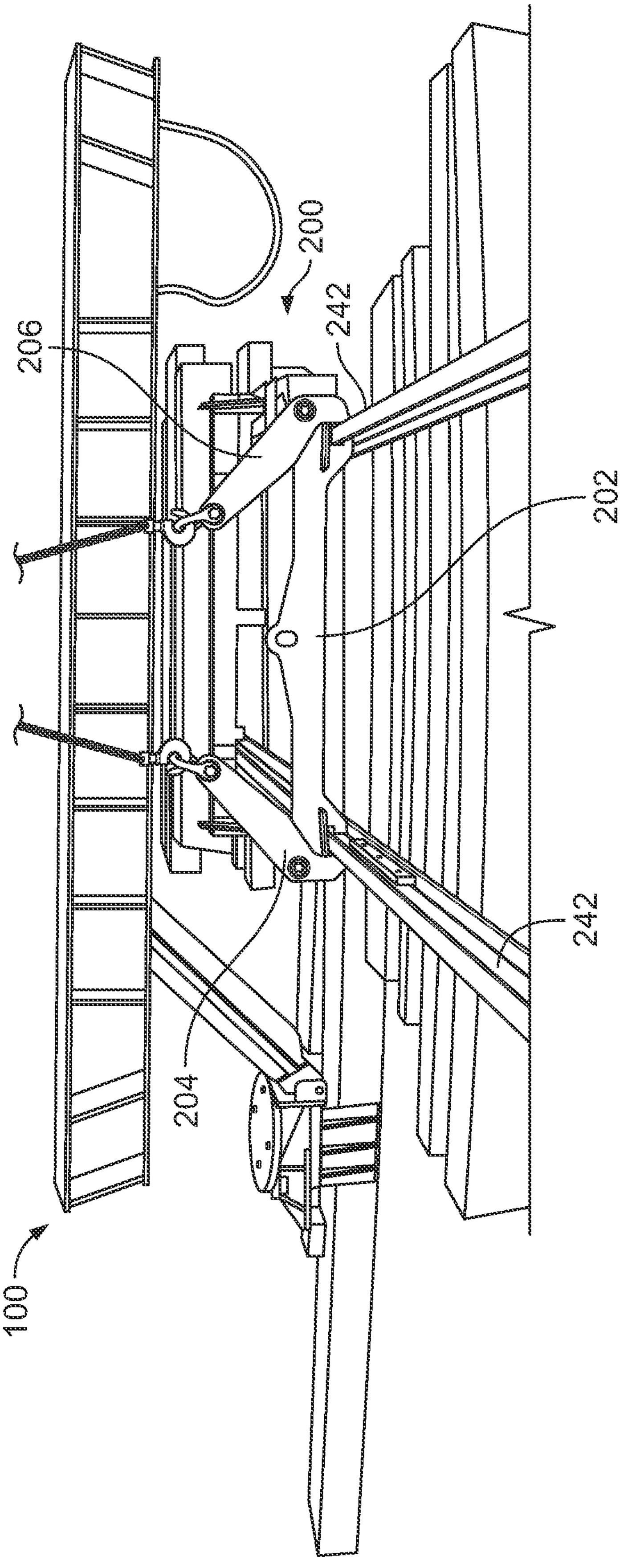
FIG. 39 is a front view of the rail support structure of FIG. 34 installed on a track and in a locked position during a tie exchange process with a tie in a second position.

With the rail support structure 200 in the locked position, the hoist 42 may control the amount of support/lift that is provided to the rails 242, so that various processes that require or improve when the rails 242 are lifted may take place. For example, as illustrated in FIGS. 38 and 39, the rail support structure 200 may lift the rails 242 and simultaneously one or more of the lower gantry assemblies 100 of the mobile crane 10 may be used to replace ties arranged under the rails 242.

Conventional cranes induce several inefficiencies during a new bridge installation, a bridge replacement, or a track replacing procedure on a bridge. For example, conventional cranes require the use of multiple short track panels and a corresponding number of trips to and from the bridge to install/replace the track panels. In addition, the storage of an old bridge or track panel after removal and the storage of a new bridge or track panel prior to installation occurs, for example, at the side of the track, which requires these components to be moved back and forth in multiple trips, thereby increasing track occupancy/closure.

The mobile crane described herein overcomes these deficiencies, for example, due to the length defined by the mobile crane 10, which enables the mobile crane 10 to be used for all of the necessary operations that occur during a bridge installation/replacement. For example, the mobile crane 10 may be attached to one or more flat cars (as opposed or in addition to the tilt cars 126 and 128) that can be used for panel construction, staging, transport, installation and removal. In some non-limiting examples, the flat cars (not shown) may be approximately 89 feet in length with a 75 ton load capacity. During a bridge installation/replacement, a new bridge and new track panels may be delivered to a bridge site on one or more flat cars that are attached to the mobile crane 10. The mobile crane 10 can be used to remove an existing bridge and existing track panels and transfer them to a flat car arranged on one side of the mobile crane 10. The thru-crane abilities of the mobile crane 10 allow the new bridge and track panels to be inserted from a flat car arranged on an opposite side of the mobile crane 10 and into and through the mobile crane 10 where they can be manipulated by one or more of the upper gantry assemblies 30*a*, 30*b*, 30*c*, and installed. Thus, the design and properties of the mobile crane 10 allow the mobile crane 10 to be used for delivering new panels, removing old panels, disposing old panels, exchanging bridge ties, exchanging railroad ties, and installing new panels, among other things.

Additionally, the mobile crane 10 is a modular assembly, and several mobile cranes 10 can be part of the same assembly. For example, several mobile cranes 10 can be joined end-to-end in a modular fashion to increase work capacity. This assembly can increase work capacity around a bridge. Additionally, multiple extensions 20, 22 can be coupled to the same truss assembly 12, 14. In such cases, the truss assembly 12, 14 can extend over adjacent railcars (e.g., tilt cars 126, 128 or a standard railcar), which may allow a greater working range for the gantry assemblies 30*a*, 30*b*, 30*c*. This may aid in performing the methods of replacing a bridge panel provided herein, for example, by allowing one or more upper gantry assemblies 30*a*, 30*b*, 30*c* to slide over the tilt cars 126, 128, where they can be coupled to a new railroad track panel 130 resting on the tilt car 126.

In conventional bridge assemblies, there is a transition point that exists between the bridge and the ground. That is, the bridge, which can be formed of a concrete material that rests on another concrete mount, can define one hardness and the ground can be much softer. The hardness of the material on which the tracks are mounted can define a track modulus. Thus, in conventional bridge assemblies, the track that spans over a bridge can define a step change in track modulus at the transition points between the bridge and the ground. As a train or another track riding machine travels over these transition points, the train suspension can be subjected to a shock that causes the suspension to continually oscillate long after the bridge is passed. The shock that the train is subjected to at these transition points also subjects the bridge track to an additional impact load, which is additive to the weight of the train. Thus, current bridge designs must account for an impact factor that is a direct result of the step change in track modulus at the transition points.

In general, the present disclosure provides an approach slab that can be installed on opposite ends of a bridge to dampen the step change in track modulus between the bridge and the ground. For example, an approach slab can be a pre-fabricated component that may define a track modulus that is harder than the ground but softer than the bridge to provide a smooth transition in track modulus between the ground and the bridge. In some non-limiting examples, the approach slab can include ballast retaining features to substantially prevent ballast from shifting away from beneath the tracks and/or from beneath the approach slab.

Figure 40:
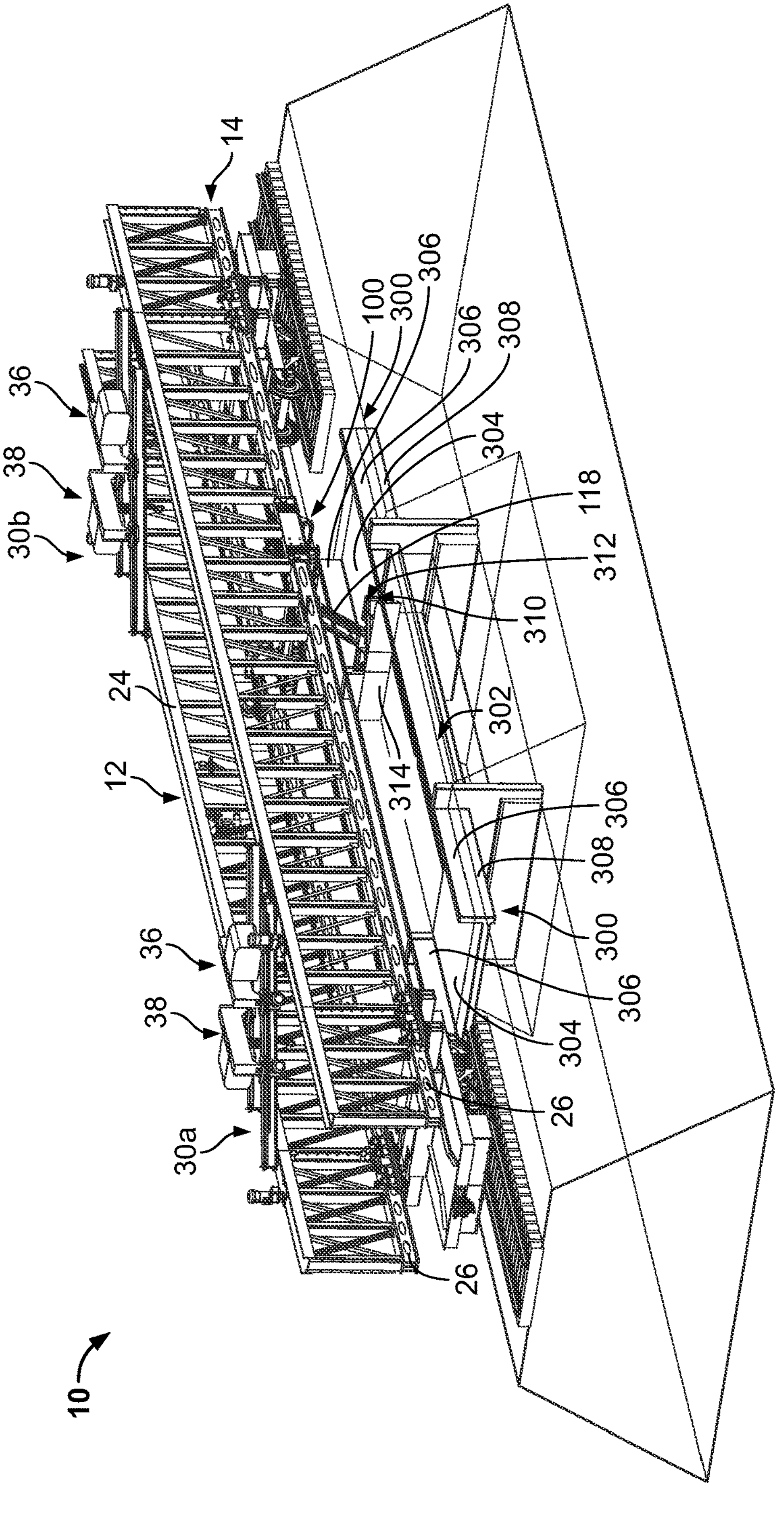
FIG. 40 is a top, front, left, perspective view of the mobile crane of FIG. 1 including the lower gantry with a regulator attachment during an approach slab installation on a bridge according to one aspect of the present disclosure.

FIG. 40 illustrates a non-limiting example of the mobile crane 10 implemented in a bridge installation/replacing application using approach slabs 300. In the illustrated non-limiting example, two approach slabs 300 are installed at opposing ends of a bridge 302. In some non-limiting examples, the approach slabs 300 may be manufactured using a casing process and can be pre-cast prior to installation. By pre-casting the approach slabs 300, the time required to install the approach slabs can be significantly reduced.

Each of the approach slabs 300 includes a track surface 304, a pair of ballast retaining flanges 306, and a pair of ground retaining flanges 308. The track surface 304 is configured to be filled with ballast and support a track panel that may be installed thereon. The pair of ballast retaining flanges 306 extend upwardly (from the perspective of FIG. 40) from laterally opposing ends of the approach slab 300. In general, the ballast retaining flanges 306 provide a stop to laterally retain the ballast under the tracks and between the ballast retaining flanges 306. Laterally retaining the ballast under the tracks can reduce the frequency of bridge maintenance required to replace the ballast that shifts out from under the tracks, which occurs in conventional bridge designs.

The pair of ground retaining flanges 308 extend downwardly (from the perspective of FIG. 40), in an opposite direction to the ballast retaining flanges 306, from the laterally opposing ends of the approach slab 300. In general, the ground retaining flanges 308 provide a stop to laterally retain the ballast or ground under the approach slab 300 and between the ground retaining flanges 308. Preventing the ballast or ground under the approach slab 300 from shifting, similar to the ballast retaining flanges 306, can reduce the frequency of bridge maintenance required to replace shifted ballast.

In the illustrated non-limiting example, the lower gantry assembly 100 of the mobile crane 10 includes a regulator 310 coupled thereto. In general, the modularity of the lower gantry assembly 100 enables one or more attachments used during a railroad or bridge installation, replacement, and/or maintenance processes to be coupled thereto. The regulator 310 may be implemented during a bridge installation/replacement process as illustrated in FIG. 40. The regulator 310 includes a support beam structure 312 that is coupled to the linkage 118 of the lower gantry assembly 100 at one end thereof. The support beam structure 312 is coupled to a regulator plate 314 at an opposing end thereof. The regulator plate 314 can perform multiple tasks during a bridge installation/replacement process. For example, because the lower gantry assembly 100 can translate longitudinally along the lower support beam 26 in a desired direction, the regulator plate 314 can be used to excavate ballast on the bridge 302 and/or approach slabs 300 that is too high after removal of existing track or ties. Alternatively or additionally, the regulator plate 314 can be used to remove existing ballast and make room for the installation of the approach slabs 300. In this manner, the regulator plate 314 can act as a plow to level any ballast or earth that may be present on the bridge 302 or approach slabs 300.

Generally, during a bridge installation/replacing process, the mobile crane 10 can be used to remove bridge track panels and/or the bridge. In some non-limiting examples, one of the upper gantry assemblies 30*a*, 30*b*, etc., may be used to lift the track on the bridge, and another of the upper gantry assemblies 30*a*, 30*b*, etc., and/or the lower gantry assembly 100 may be used to remove the bridge ties and/or bridge track panels. Once the desired bridge components are removed, areas adjacent to the ends of the bridge 302 can be excavated to make room for the approach slabs 300 to be installed. For example, the regulator 310 may be used to remove ballast adjacent to the ends of the bridge and/or an excavator may be used to dig out enough ground/ballast to make room for the approach slabs 300. In some non-limiting examples, grout may be put down into the excavated area prior to installation of the approach slab 300. In some non-limiting examples, the approach slabs 300 may be grouted after installation and settling into the ground/ballast.

Once a space has been excavated for the approach slab 300, the mobile crane 10 may be used, for example, with one or more of the hoist assemblies 36, 38 of the upper gantry assemblies 30*a*, 30*b*, etc., to move the approach slab 300 into place and lower it down into the excavated space. As described herein, the approach slabs 300 can be pre-cast parts, which streamlines installation and reduces track occupancy/closure. With the approach slabs 300 installed on opposing ends of the bridge 302, ballast can be filled in between the ballast retaining flanges 306 and, if necessary, along the bridge 302, and then bridge ties or bridge track panel(s) can be installed thereon.

The approach slabs 300 are designed to provide a track modulus that is between the track modulus defined on the ground and on the bridge 302. In some non-limiting examples, the approach slabs 300 are designed to provide a track modulus that is halfway between the track modulus on the ground and on the bridge. In this way, the approach slabs 300 provide a smooth transition in track modulus from the ground to the bridge and remove the drastic step change in track modulus in conventional bridges. By providing a smooth transition in track modulus, the approach slabs 300 reduce the shock subjected to a train's suspension and thereby reduce the impact load imparted on the bridge 302 as a train travels over the bridge 302. Reducing the impact load can extend the life of existing bridges and provide longer lifetimes for newly installed bridges, when compared to convention bridge designs.

Figure 41:
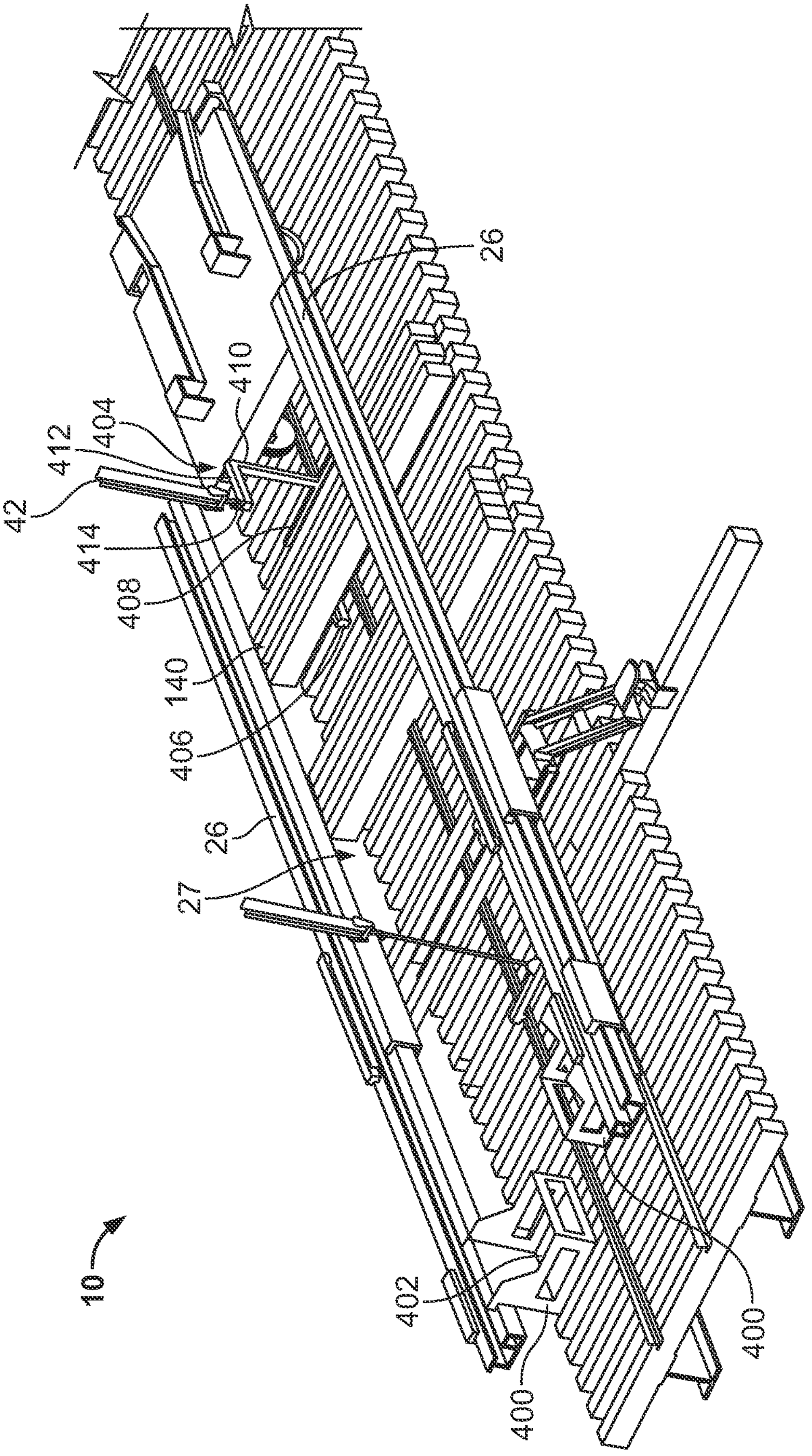
FIG. 41 is a partial top, back, right perspective view of the mobile crane of FIG. 1, during a tie exchange process.
Figure 42:
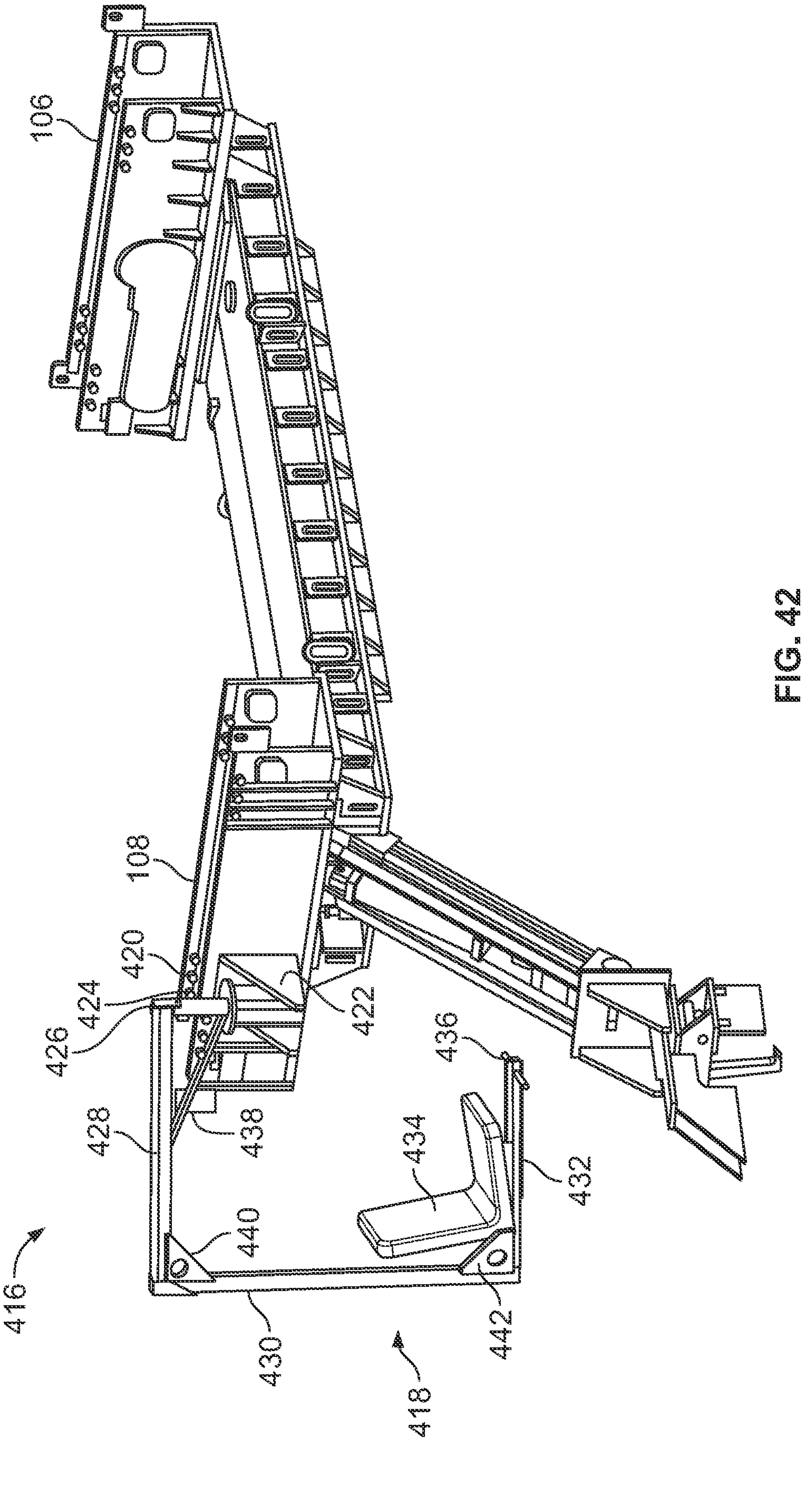
FIG. 42 is a perspective view of an operator seat assembly coupled to the lower gantry assembly of FIG. 17.

Referring now to FIGS. 41 and 42, additional features that may be present on the mobile crane 10 are described. In some embodiments, one or more operator carts 400 can be coupled to the lower support beams 26 of the truss assemblies 12, 14. The operator carts 400, like the lower gantry assembly 100, can extend around a portion of the lower support beams 26 and may slide along the lower support beams 26 to a desired location within the mobile crane 10. The operator carts 400 may each include a partially enclosed platform 402, which can extend into the interior space 27 to allow a user to securely work within the mobile crane 10.

In some bridge tie exchange processes, a plurality of bridge ties 140 may advantageously be transported simultaneously. Accordingly, a multi-tie grapple tool 404 can be coupled to the hoist 42, which can then suspend several bridge ties 140 simultaneously. The multi-tie grapple tool 404 can have two or more arms 406 extending outward from a frame 408 that is sized to extend above a bridge tie 140 when the bridge tie is loaded onto the arms 406. A neck 410 extends upward from the frame 408, toward a coupling arm 412. The coupling arm 412 can include an aperture 414 or a mounting feature that can receive a hoist 42, which can lift and balance the multi-tie grapple tool 404.

In some aspects, an operator seat assembly 416 can be coupled to the lower gantry assembly 100. The operator seat assembly 416 can extend outwardly away from the lower gantry assembly 100 to allow a worker to safely access and work on a bridge outside of the truss assemblies 12, 14. The operator seat assembly 416 can be rotatable relative to the lower gantry assembly 100 to allow a user additional maneuverability.

The operator seat assembly 416 can include a seat support 418 and a mounting feature 420 that can be rigidly or removably coupled to the first or second trolley 106, 108. The mounting feature 420 can include an outer housing 422 that partially surrounds a coupling 424. A first arm 426 of the seat support 418 can be received within the coupling 424, which may allow rotation of the seat support 418 relative to the coupling 424. The first arm 426 can extend toward a second arm 428, which extends approximately perpendicularly away from the first arm 426. A third arm 430 extends approximately perpendicularly away from the second arm 428 and approximately parallel to the first arm 426. A fourth arm 432 extends away from the third arm 430 approximately parallel to the second arm 428. In some aspects, a seat 434 is rigidly coupled to the fourth arm 432 to seat an operator. A leg rest 436 can extend through the fourth arm 432 to support the legs of an operator. In some aspects, a plurality of braces 438, 440, 442 are used to fortify the outer structure of the seat support 418. The seat support 418 can comprise metal or other rigid materials.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A rail support structure for supporting rails, the rail support structure comprising:

a main beam having a positioning aperture formed therethrough, the positioning aperture arranged along a centerline of the main beam;

a first clamp pivotally coupled to a first end of the main beam, the first clamp rotatable relative to the main beam about a pivot between an unlocked position and a locked position; and a second clamp pivotally coupled to a second end of the main beam opposite the first end, the second clamp being rotatable relative to the main beam about a second pivot between an unlocked position and a locked position, wherein the first clamp rotates to the locked position by rotating about the pivot in a first direction and the second clamp rotates to the locked position by rotating about the second pivot in a second direction opposite to the first direction, and wherein a main rail finger is formed at a distal end of the main beam, the main rail finger extending arcuately downward from the main beam to engage a rail inside surface.

2. The rail support structure of claim 1, wherein the first clamp includes a clamp rail finger formed at a distal end of the first clamp, the clamp rail finger extending toward the main rail finger.

3. The rail support structure of claim 2, wherein the clamp rail finger rotates toward the main rail finger to move from the unlocked position to the locked position.

4. The rail support structure of claim 2, wherein an anti-tipping plate is received around a portion of the main rail finger.

5. The rail support structure of claim 1, wherein the first clamp includes a first clamp beam and a second clamp beam, the first clamp beam positioned on a first side of the main beam and the second clamp beam positioned on a second side of the main beam opposite the first side.

6. The rail support structure of claim 5, wherein the first clamp beam and second clamp beam are both pivotally coupled to the main beam by a fastener extending through the first clamp beam, main beam, and second clamp beam; and wherein a spacer is positioned between the first clamp beam and the second clamp beam.

7. A crane apparatus comprising:

a first truss assembly comprising a first main truss having a longitudinal axis, the first main truss being coupled to a first end assembly at a first end of the first main truss; and a second truss assembly comprising a second main truss spaced apart from and extending approximately parallel to the longitudinal axis, the second main truss being coupled to the first end assembly at a first end of the second main truss, the first main truss and the second main truss spaced apart from one another to define an interior space, wherein the first end assembly includes a lateral extension assembly coupled to the first main truss and the second main truss, the lateral extension assembly configured to move the first truss assembly and the second truss assembly perpendicular to the longitudinal axis, and wherein a thrust bracket is removably coupled to the first main truss and the lateral extension assembly.

8. The crane apparatus of claim 7, wherein the thrust bracket includes a thrust plate mounted beneath the first main truss and a wall extending upwardly from the thrust plate, the wall being removably coupled to the wall and the first main truss.

9. The crane apparatus of claim 8, wherein the thrust bracket further comprises a second wall extending upwardly from the thrust plate, the second wall and first wall together straddling the first main truss.

10. The crane apparatus of claim 9, wherein a fastener extends through the first wall and the second wall to couple the first wall and second wall together.

11. The crane apparatus of claim 10, wherein a lug is formed on the first main truss, and the fastener extends through the first wall, the lug, and the second wall to secure the thrust bracket to the first main truss.

12. The crane apparatus of claim 10, wherein the first end assembly is a rail car end assembly.

13. A crane apparatus comprising:

a first truss assembly comprising a first main truss having a longitudinal axis, the first main truss being coupled to a support beam of a lateral support assembly;

a second truss assembly comprising a second main truss spaced apart from and extending approximately parallel to the longitudinal axis, the second main truss being coupled to a second support beam of the lateral support assembly, the first main truss and the second main truss spaced apart from one another to define an interior space; and a thrust block removably coupled to the lateral support assembly and engaging the first main truss and the lateral support assembly to restrict lateral movement of the support beam perpendicular to the longitudinal axis.

14. The crane apparatus of claim 13, wherein the thrust block includes a base coupled the lateral support assembly and at least one brace received upon and removably coupled to the base.

15. The crane apparatus of claim 14, wherein the base is rigidly coupled to the lateral support assembly.

16. The crane apparatus of claim 14, wherein the at least one brace is removably coupled to the base with a fastener.

17. The crane apparatus of claim 14, wherein the at least one brace includes a first brace and a second brace positioned opposite the first brace, the second brace and the first brace removably coupled to one another by a fastener.

18. The crane apparatus of claim 17, wherein the first brace and the second brace each engage a vertical truss and a lower support beam of the first truss assembly.

19. The crane apparatus of claim 18, wherein the fastener coupling the first brace to the second brace extends through at least one lug formed on the lower support beam of the first truss assembly.

* * * * *